US006493203B1

(12) United States Patent
Ito et al.

(10) Patent No.: US 6,493,203 B1
(45) Date of Patent: Dec. 10, 2002

(54) PHASE CONTROL SWITCH APPARATUS

(75) Inventors: Hiroki Ito, Tokyo (JP); Masaki Hiratsuka, Tokyo (JP); Haruhiko Kohyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 95 days.

(21) Appl. No.: 09/717,017

(22) Filed: Nov. 22, 2000

(30) Foreign Application Priority Data

Nov. 25, 1999 (JP) ........................................... 11-334059
Jun. 2, 2000 (JP) ....................................... 2000-166190

(51) Int. Cl.$^7$ .......................... H01H 47/00; H02H 3/26; H02H 3/18
(52) U.S. Cl. ........................... 361/159; 361/76; 361/85; 361/79; 361/35; 361/38; 361/93.1
(58) Field of Search ...................... 361/76, 79, 85–87, 361/93.2, 152, 159, 143, 35–38; 323/212

(56) References Cited

U.S. PATENT DOCUMENTS

| | | | | |
|---|---|---|---|---|
| 4,453,190 A | * | 6/1984 | Kletsel et al. ................ | 361/30 |
| 4,922,363 A | * | 5/1990 | Long et al. .................. | 361/146 |
| 5,563,459 A | * | 10/1996 | Kurosawa et al. .......... | 194/261 |
| 5,796,565 A | * | 8/1998 | Verkhovskiy ................ | 361/29 |
| 6,172,863 B1 | * | 1/2001 | Ito et al. ..................... | 323/908 |

OTHER PUBLICATIONS

CIGRE 1988 Session, 13–02 (No date).
CIGRE 1990 Session, 13–201 (No date).
"Synchronous Energizing of Shunt Reactors and Shunt Capacitors", CIGRE 1988 Session 13–12, p. 6, chapter 9 Future Applications (No date).
"Application of Metal–Oxide Varistors on an 800 KV Circuit–Breaker Used for Shunt Reactor Switching", CIGRE 1988 Session, 13–16, p. 9, 5.2 Reignitions last paragraph (No date).

* cited by examiner

*Primary Examiner*—Kim Huynh
(74) *Attorney, Agent, or Firm*—Sughrue Mion, PLLC

(57) ABSTRACT

A phase control switch apparatus incorporating a phase-based break/make controller (80A, 80B, 80C) for protecting a reactive load such as a transformer (10) from transient surge phenomena taking place upon power-supply breaking/making operation. The phase control switch apparatus includes a reference phase detecting unit (82) for predicting phases of the phase-voltage and phases-current waveforms upon closing and opening of the breaker contacts, a residual magnetic flux detecting unit (83) for predicting residual fluxes in each phase of the transformer (10) on the basis of time points at which the breaker contacts of the individual phases were opened in the preceding breaking operation and polarities of the phase-currents immediately before the breakage, an operation control unit (81) for predicting optimal closing time points for the individual phases at which the transient surge can be suppressed to a minimum on the basis of the predicted residual fluxes

36 Claims, 24 Drawing Sheets

FIG. 1
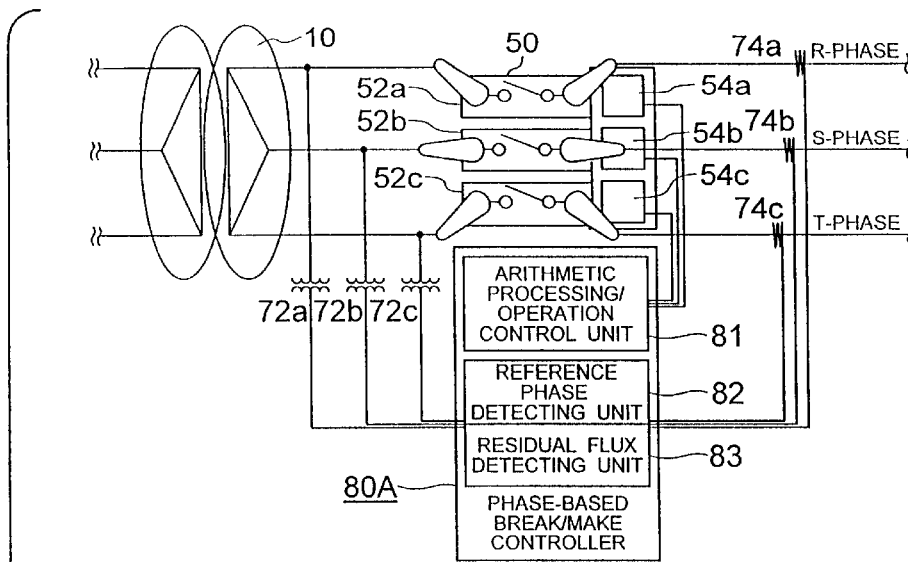
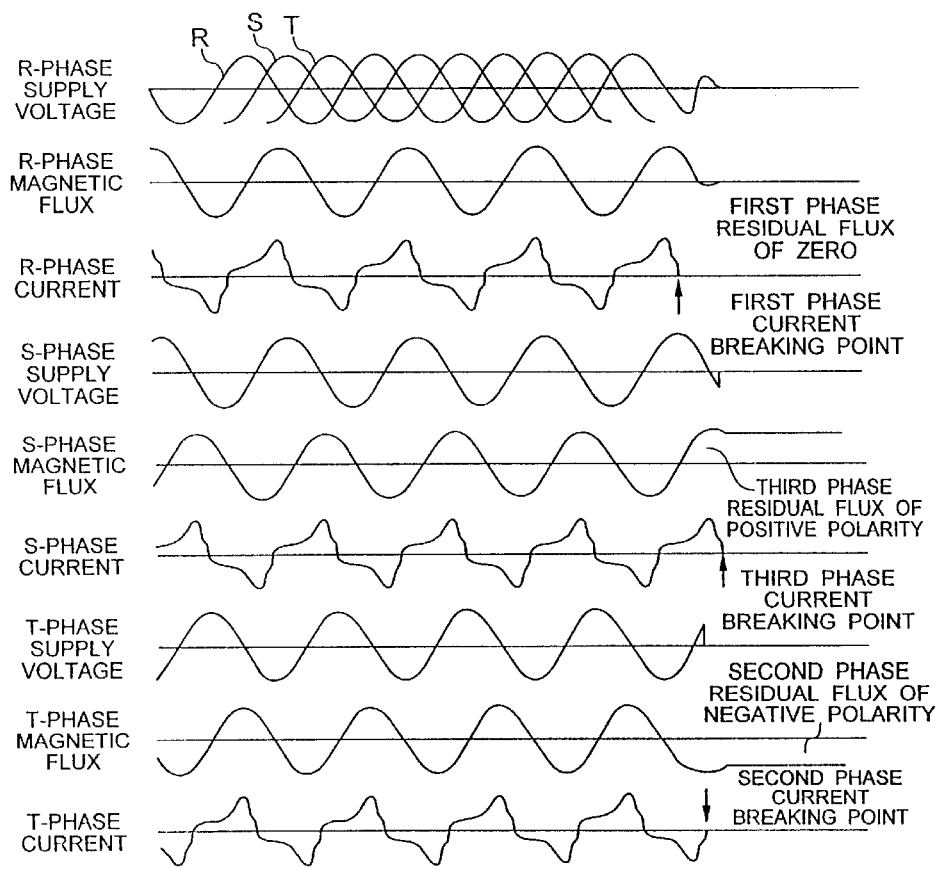

FIG. 6

TABLE 1: CLOSING (MAKING) PHASE ANGLES FOR TRANSFORMER OF Δ-CONNECTION HAVING RESIDUAL FLUXES

WHERE (1) R-PHASE RESIDUAL FLUX REPRESENTS R-S INTER-PHASE RESIDUAL FLUX,
(2) S-PHASE RESIDUAL FLUX REPRESENTS S-T INTER-PHASE RESIDUAL FLUX, AND
(3) T-PHASE RESIDUAL FLUX REPRESENTS T-R INTER-PHASE RESIDUAL FLUX.

| CLOSING SEQUENCE | PHASE OF ZERO RESIDUAL FLUX (0%) | PHASE OF NEGATIVE RESIDUAL FLUX (-k%) | PHASE OF POSITIVE RESIDUAL FLUX (k%) |
|---|---|---|---|
| (1) PHASE OF POSITIVE RESIDUAL FLUX ↓ (2) PHASE OF NEGATIVE RESIDUAL FLUX ↓ (3) PHASE OF ZERO RESIDUAL FLUX | (3) $(89+3k/20) \pm 30°$ AFTER $(363/360 - 169k/3600)$ CYCLES FROM CLOSING OF SECOND PHASE | (2) $(-154+46k/25)° \pm 30°$ (2) $\theta \pm 30°$, $\theta = 30° - \cos^{-1}(k/100)$ | (1) GIVEN ELECTRICAL ANGLE SIMULTANEOUS WITH OR BEFORE CLOSING OF SECOND PHASE, i.e., CLOSED FIRST |
| (1) PHASE OF NEGATIVE RESIDUAL FLUX ↓ (2) PHASE OF POSITIVE RESIDUAL FLUX ↓ (3) PHASE OF ZERO RESIDUAL FLUX | (3) $(89+3k/20) \pm 30°$ AFTER $(363/360 - 169k/3600)$ CYCLES FROM CLOSING OF SECOND PHASE | (1) GIVEN ELECTRICAL ANGLE SIMULTANEOUS WITH OR BEFORE CLOSING OF SECOND PHASE, i.e., CLOSED FIRST | (2) $(-34+46k/25)° \pm 30°$ (2) $\theta \pm 30°$, $\theta = 150° - \cos^{-1}(k/100)$ |
| (1) PHASE OF POSITIVE RESIDUAL FLUX ↓ (2) PHASE OF ZERO RESIDUAL FLUX ↓ (3) PHASE OF NEGATIVE RESIDUAL FLUX | (2) $60 \pm 30°$ | (3) $(274+7k/20) \pm 30°$ AFTER $(7k/7200 - 26/360)$ CYCLES FROM CLOSING OF SECOND PHASE | (1) GIVEN ELECTRICAL ANGLE SIMULTANEOUS WITH OR BEFORE CLOSING OF SECOND PHASE, i.e., CLOSED FIRST |
| (1) PHASE OF ZERO RESIDUAL FLUX ↓ (2) PHASE OF POSITIVE RESIDUAL FLUX ↓ (3) PHASE OF NEGATIVE RESIDUAL FLUX | (1) GIVEN ELECTRICAL ANGLE SIMULTANEOUS WITH OR BEFORE CLOSING OF SECOND PHASE, i.e., CLOSED FIRST | (3) $(274+7k/20) \pm 30°$ AFTER $(7k/7200 - 26/360)$ CYCLES FROM CLOSING OF SECOND PHASE | (2) $300 \pm 30°$ |
| (1) PHASE OF ZERO RESIDUAL FLUX ↓ (2) PHASE OF NEGATIVE RESIDUAL FLUX ↓ (3) PHASE OF POSITIVE RESIDUAL FLUX | (1) GIVEN ELECTRICAL ANGLE SIMULTANEOUS WITH OR BEFORE CLOSING OF SECOND PHASE, i.e., CLOSED FIRST | (2) $(146+46k/25)° \pm 30°$ (2) $\theta \pm 30°$, $\theta = 330° - \cos^{-1}(k/100)$ | (3) $(375+195k/100) \pm 30°$ AFTER $(132/360 - 134k/3600)$ CYCLES FROM CLOSING OF SECOND PHASE |
| (1) PHASE OF NEGATIVE RESIDUAL FLUX ↓ (2) PHASE OF ZERO RESIDUAL FLUX ↓ (3) PHASE OF POSITIVE RESIDUAL FLUX | (2) $(26+46k/25)° \pm 30°$ (2) $\theta \pm 30°$, $\theta = 210° - \cos^{-1}(k/100)$ | (1) GIVEN ELECTRICAL ANGLE SIMULTANEOUS WITH OR BEFORE CLOSING OF SECOND PHASE, i.e., CLOSED FIRST | (3) $(375+195k/100) \pm 30°$ AFTER $(132/360 - 134k/3600)$ CYCLES FROM CLOSING OF SECOND PHASE |
| SIMULTANEOUS CLOSING OF THREE PHASES | $270° \pm 30°$, $90° \pm 30°$ | $30° \pm 30°$, $210° \pm 30°$ | $150° \pm 30°$, $330° \pm 30°$ |

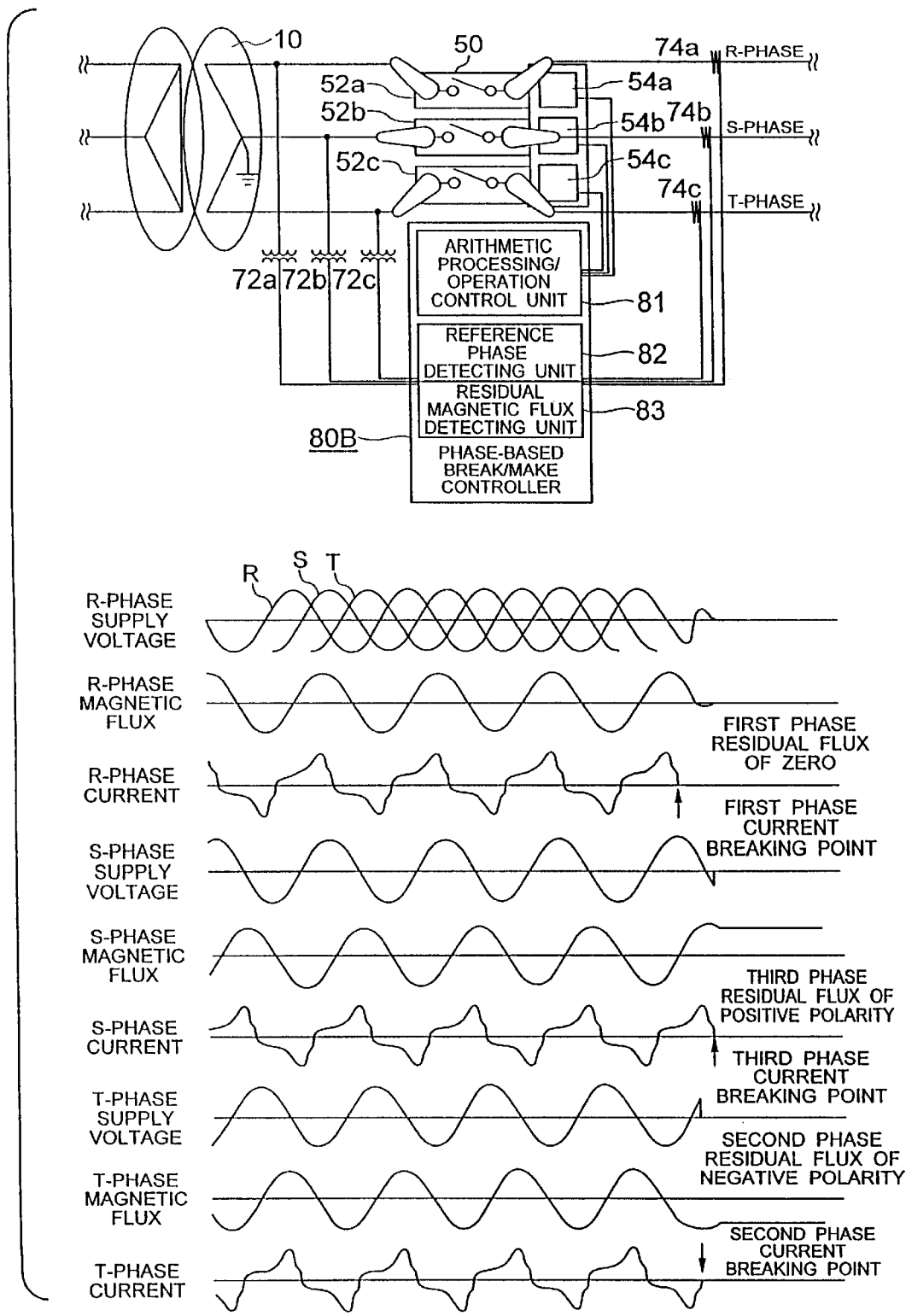

FIG. 12

TABLE 2: CLOSING (MAKING) PHASE ANGLES FOR TRANSFORMER OF Y-CONNECTION HAVING NEUTRAL POINT GROUNDED DIRECTLY

| CLOSING SEQUENCE | PHASE OF ZERO RESIDUAL FLUX (0%) | PHASE OF NEGATIVE RESIDUAL FLUX (-k%) | PHASE OF POSITIVE RESIDUAL FLUX (k%) |
|---|---|---|---|
| (1) PHASE OF ZERO RESIDUAL FLUX ↓ (2) PHASE OF POSITIVE RESIDUAL FLUX ↓ (3) PHASE OF NEGATIVE RESIDUAL FLUX | (1) 90°±30°, 270°±30° (VOLTAGE PEAK) (1) θ±30°, cosθ=0 | (3) GIVEN ELECTRICAL ANGLE AFTER (1/4+k/900) CYCLES FROM CLOSING OF FIRST PHASE AND HENCE LATER THAN SECOND PHASE CLOSING TIME POINT | (2) (60+39k/100)°±30° AFTER (1/4+k/900) CYCLES FROM CLOSING OF FIRST PHASE |
| (1) PHASE OF ZERO RESIDUAL FLUX ↓ (2) PHASE OF NEGATIVE RESIDUAL FLUX ↓ (3) PHASE OF POSITIVE RESIDUAL FLUX | (1) 90°±30°, 270°±30° (VOLTAGE PEAK) (1) θ±30°, cosθ=0 | (2) (300+39k/100)°±30° (120+39k/100)°±30° AFTER (1/4+k/900) CYCLES FROM CLOSING OF FIRST PHASE | (3) GIVEN ELECTRICAL ANGLE AFTER (1/4+k/900) CYCLES FROM CLOSING OF FIRST PHASE AND HENCE LATER THAN SECOND PHASE CLOSING TIME POINT |
| (1) PHASE OF NEGATIVE RESIDUAL FLUX ↓ (2) PHASE OF POSITIVE RESIDUAL FLUX ↓ (3) PHASE OF ZERO RESIDUAL FLUX | (3) GIVEN ELECTRICAL ANGLE AFTER (-1/60+k/900) CYCLES FROM CLOSING OF FIRST PHASE AND HENCE LATER THAN SECOND PHASE CLOSING TIME POINT | (1) 0°±30°, 180°±30° (VOLTAGE ZERO, k=100%) (1)37, 143, 217, 323°±30° (k=80%) (1) θ±30°, cosθ=-k/100 (RESIDUAL FLUX OF k%) | (2) (114+39k/100)±30° (2) θ±30°, cosθ=-k/100 AFTER (1/60+k/900) CYCLES FROM CLOSING OF FIRST PHASE |
| (1) PHASE OF NEGATIVE RESIDUAL FLUX ↓ (2) PHASE OF ZERO RESIDUAL FLUX ↓ (3) PHASE OF POSITIVE RESIDUAL FLUX | (2) (234+39k/100)±30° (44+39k/100)±30° (2) θ±30°, cos(θ-π/3)=-k/100 AFTER (1/60+k/900) CYCLES FROM CLOSING OF FIRST PHASE | (1) 0°±30°, 180°±30° (VOLTAGE ZERO, k=100%) (1)37, 143, 217, 323°±30° (k=80%) (1) θ±30°, cosθ=-k/100 (RESIDUAL FLUX OF k%) | (3) GIVEN ELECTRICAL ANGLE AFTER (-1/60+k/900) CYCLES FROM CLOSING OF FIRST PHASE AND HENCE LATER THAN SECOND PHASE CLOSING TIME POINT |
| (1) PHASE OF POSITIVE RESIDUAL FLUX ↓ (2) PHASE OF ZERO RESIDUAL FLUX ↓ (3) PHASE OF NEGATIVE RESIDUAL FLUX | (2) (125+10k/100)±30° AFTER (20/39+k/3600) CYCLES FROM CLOSING OF FIRST PHASE | (3) GIVEN ELECTRICAL ANGLE AFTER (20/39+k/3600) CYCLES FROM CLOSING OF FIRST PHASE AND HENCE LATER THAN SECOND PHASE CLOSING TIME POINT | (1) 180°±30°, 0°±30° (VOLTAGE ZERO, k=100%) (1)37, 143, 217, 323°±30° (k=80%) (1) θ=30°, cos(π-θ)=-k/100 (RESIDUAL FLUX OF k%) |
| (1) PHASE OF POSITIVE RESIDUAL FLUX ↓ (2) PHASE OF NEGATIVE RESIDUAL FLUX ↓ (3) PHASE OF ZERO RESIDUAL FLUX | (3) GIVEN ELECTRICAL ANGLE AFTER (20/39+k/3600) CYCLES FROM CLOSING OF FIRST PHASE AND HENCE LATER THAN SECOND PHASE CLOSING TIME POINT | (2) (245+10k/100)±30° AFTER (20/39+k/3600) CYCLES FROM CLOSING OF FIRST PHASE | (1) 180°±30°, 0°±30° (VOLTAGE ZERO, k=100%) (1)37, 143, 217, 323°±30° (k=80%) (1) θ±30°, cos(π-θ)=k/100 (RESIDUAL FLUX OF k%) |
| SIMULTANEOUS CLOSING OF THREE PHASES | 270°±30°, 90°±30° | 30°±30°, 210°±30° | 150°±30°, 330°±30° |

FIG. 13
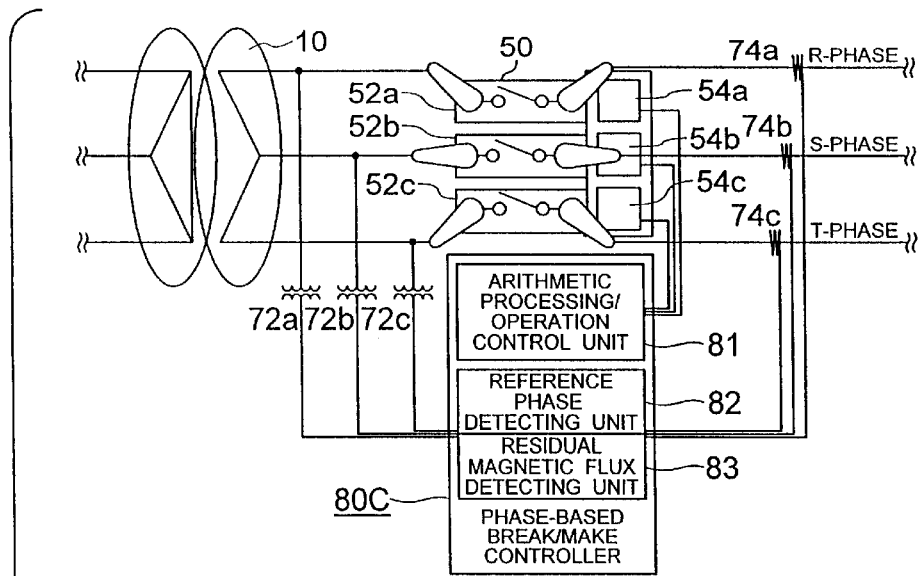
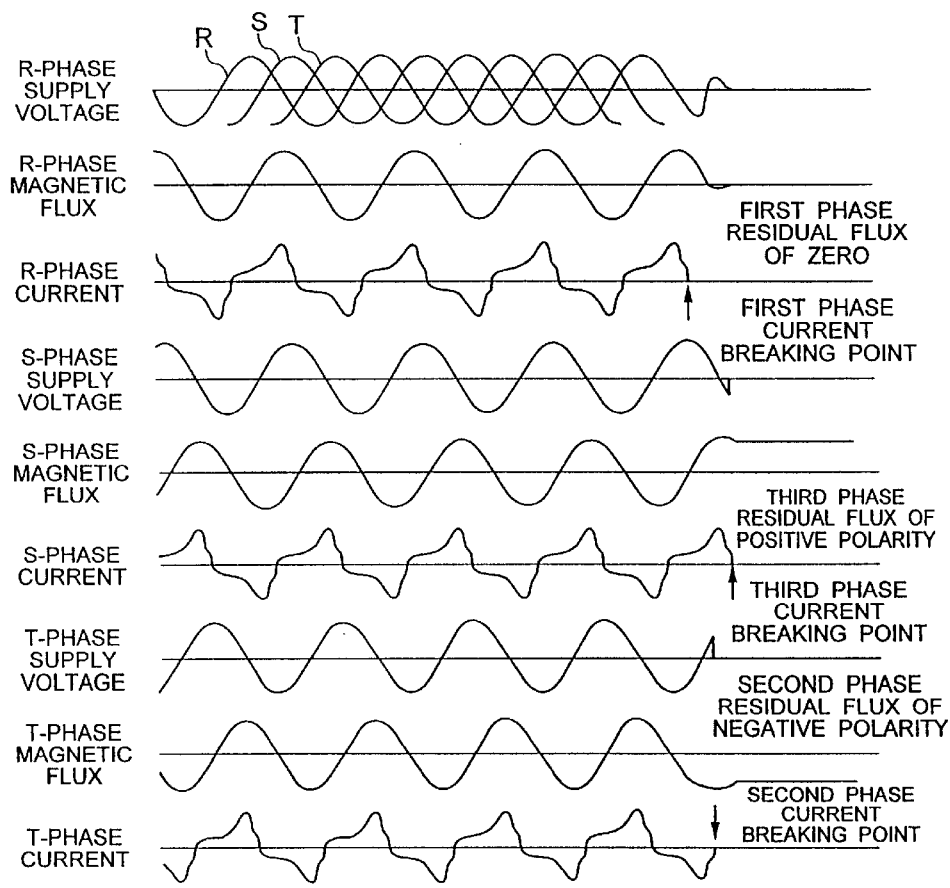

FIG. 18

TABLE 3: CLOSING (MAKING) PHASE ANGLES FOR TRANSFORMER OF Y-CONNECTION HAVING NEUTRAL POINT NOT GROUNDED

| CLOSING SEQUENCE | PHASE OF ZERO RESIDUAL FLUX (0%) | PHASE OF NEGATIVE RESIDUAL FLUX (-k%) | PHASE OF POSITIVE RESIDUAL FLUX (k%) |
|---|---|---|---|
| (1) PHASE OF POSITIVE RESIDUAL FLUX ↓ (2) PHASE OF NEGATIVE RESIDUAL FLUX ↓ (3) PHASE OF ZERO RESIDUAL FLUX | (3) 90±30°<br>(3) 270±30°<br>(3) θ±30°, cos θ =0<br>(VOLTAGE PEAK)<br><br>AFTER 1/2 CYCLES FROM CLOSING OF SECOND PHASE | (2) 30±30°<br>(2) θ±30°<br>cos(θ-2π/3)=0 | (1) GIVEN ELECTRICAL ANGLE SIMULTANEOUS WITH OR BEFORE CLOSING OF SECOND PHASE, i.e., CLOSED FIRST |
| (1) PHASE OF NEGATIVE RESIDUAL FLUX ↓ (2) PHASE OF POSITIVE RESIDUAL FLUX ↓ (3) PHASE OF ZERO RESIDUAL FLUX | (3) 90±30°<br>(3) 270±30°<br>(3) θ±30°, cos θ =0<br>(VOLTAGE PEAK)<br><br>AFTER 1/2 CYCLES FROM CLOSING OF SECOND PHASE | (1) GIVEN ELECTRICAL ANGLE SIMULTANEOUS WITH OR BEFORE CLOSING OF SECOND PHASE, i.e., CLOSED FIRST | (2) 150±30°<br>(2) θ±30°<br>cos(θ-π/3)=0 |
| (1) PHASE OF POSITIVE RESIDUAL FLUX ↓ (2) PHASE OF ZERO RESIDUAL FLUX ↓ (3) PHASE OF NEGATIVE RESIDUAL FLUX | (2) 270±30°<br>(2) θ±30°, cos θ =0<br>(VOLTAGE PEAK) | (3) (302+k/5)±30°<br><br>AFTER (272/360-k/1800) CYCLES FROM CLOSING OF SECOND PHASE | (1) GIVEN ELECTRICAL ANGLE SIMULTANEOUS WITH OR BEFORE CLOSING OF SECOND PHASE, i.e., CLOSED FIRST |
| (1) PHASE OF ZERO RESIDUAL FLUX ↓ (2) PHASE OF POSITIVE RESIDUAL FLUX ↓ (3) PHASE OF NEGATIVE RESIDUAL FLUX | (1) GIVEN ELECTRICAL ANGLE SIMULTANEOUS WITH OR BEFORE CLOSING OF SECOND PHASE, i.e., CLOSED FIRST | (3) (302+k/5)±30°<br><br>AFTER (272/360-k/1800) CYCLES FROM CLOSING OF SECOND PHASE | (2) 150±30°<br>(2) θ±30°<br>cos(θ-π/3)=0 |
| (1) PHASE OF ZERO RESIDUAL FLUX ↓ (2) PHASE OF NEGATIVE RESIDUAL FLUX ↓ (3) PHASE OF POSITIVE RESIDUAL FLUX | (1) GIVEN ELECTRICAL ANGLE SIMULTANEOUS WITH OR BEFORE CLOSING OF SECOND PHASE, i.e., CLOSED FIRST | (2) 30°±30°<br>(2) θ±30°<br>cos(θ-2π/3)=0 | (3) (375+195k/100)±30°<br>(3) θ±30°,<br>cos θ =-k/100<br><br>AFTER (15/24-13k/2400) CYCLES FROM CLOSING OF SECOND PHASE |
| (1) PHASE OF NEGATIVE RESIDUAL FLUX ↓ (2) PHASE OF ZERO RESIDUAL FLUX ↓ (3) PHASE OF POSITIVE RESIDUAL FLUX | (2) 270°±30°<br>(2) θ±30°, cos θ =0<br>(VOLTAGE PEAK) | (1) GIVEN ELECTRICAL ANGLE SIMULTANEOUS WITH OR BEFORE CLOSING OF SECOND PHASE, i.e., CLOSED FIRST | (3) (375+195k/100)±30°<br>(3) θ±30°,<br>cos θ =-k/100<br><br>AFTER (15/24-13k/2400) CYCLES FROM CLOSING OF SECOND PHASE |
| SIMULTANEOUS CLOSING OF THREE PHASES | 270°±30°, 90°±30° | 30°±30°, 210°±30° | 150°±30°, 330°±30° |

FIG. 23

TABLE 4: CLOSING (MAKING) PHASE ANGLES FOR TRANSFORMER OF Y-CONNECTION HAVING NEUTRAL POINT GROUNDED DIRECTLY

| RESIDUAL MAGNETIC FLUX | CLOSING SEQUENCE AND CLOSING (MAKING) PHASE ANGLE |
|---|---|
| FIRST BROKEN PHASE ; ZERO ↓ SECOND BROKEN PHASE ; NEGATIVE ↓ THIRD BROKEN PHASE ; POSITIVE | ①PHASE OF ZERO RESIDUAL FLUX ; 90° (VOLTAGE PEAK) ± 30° ↓ ②PHASE OF POSITIVE RESIDUAL FLUX ; 75° ± 15° ↓ ③PHASE OF NEGATIVE RESIDUAL FLUX ; GIVEN ELECTRICAL ANGLE HAVE EVER, AFTER CLOSING SECOND PHASE |
| | ①PHASE OF ZERO RESIDUAL FLUX ; 90° (VOLTAGE PEAK) ± 30° ↓ ②PHASE OF NEGATIVE RESIDUAL FLUX ; 315° ± 15° ↓ ③PHASE OF POSITIVE RESIDUAL FLUX ; GIVEN ELECTRICAL ANGLE HAVE EVER, AFTER CLOSING SECOND PHASE |
| FIRST BROKEN PHASE ; ZERO ↓ SECOND BROKEN PHASE ; POSITIVE ↓ THIRD BROKEN PHASE ; NEGATIVE | ①PHASE OF ZERO RESIDUAL FLUX ; 90° (VOLTAGE PEAK) ± 30° ↓ ②PHASE OF POSITIVE RESIDUAL FLUX ; 280° ± 20° ↓ ③PHASE OF POSITIVE RESIDUAL FLUX ; GIVEN ELECTRICAL ANGLE HAVE EVER, AFTER CLOSING SECOND PHASE |
| | ①PHASE OF ZERO RESIDUAL FLUX ; 90° (VOLTAGE PEAK) ± 30° ↓ ②PHASE OF NEGATIVE RESIDUAL FLUX ; 40° ± 20° ↓ ③PHASE OF POSITIVE RESIDUAL FLUX ; GIVEN ELECTRICAL ANGLE HAVE EVER, AFTER CLOSING SECOND PHASE |

PHASE CONTROL SWITCH APPARATUS

BACKGROUND OF THE INVENTION

1. Field of the Invention

The present invention relates to a phase control switch apparatus for controlling open/close (break/make) timings of a breaker connected to the power transmission system to thereby protect reactive loads or reactor components such as transformers, shunt reactors, capacitor banks (CB) and the like connected to the electric power system against an exciting rush current, a transient surge current or the like which takes place upon opening/closing of the breaker and which exerts adverse influences to the reactive load. More specifically, the present invention is concerned with a switchgear apparatus equipped with a phase-based break/make controller designed for suppressing the transient currents mentioned above to a possible minimum by controlling optimally the timings at which the breaker is to be closed.

2. Description of Related Art

Switchgear such as the breaker is generally equipped with a break/make timing control apparatus for the purpose of suppressing the exciting rush current, transient surge voltage or the like which occurs upon closing of the breaker by controlling the closing time point or timing of the breaker by taking into account the arcing time and like influential factors.

For having better understanding of the present invention, description will first be made in some detail of the conventional phase control switch apparatus (break/make timing control apparatus) known heretofore. FIG. 24 of the accompanying drawings shows a structure of a hitherto known break/make control apparatus for a breaker typifying the switchgear together with the standard waveforms of R-, S- and T-phase supply voltages in breaker contact closing operation as well as operation timings of the breaker. Parenthetically, this apparatus is disclosed in Japanese. Patent Application Laid-Open No. 156820/1991 (JP-A-3-156820).

Referring to FIG. 24, reference numeral 10 denotes generally a transformer connected or wired in a Y-connection with a neutral point being connected to the ground potential, and numeral 50 denotes generally a breaker having arc-extinction chambers 52a, 52b and 52c within which contacts are disposed. For making it possible to perform open/close (break/make) operations for these contacts independently of one another, the contacts are equipped with respective actuator devices 54a, 54b and 54c. Further, in FIG. 24, reference characters 72a, 72b and 72c denote voltage measuring devices designed for measuring R-, S- and T-phase supply voltages, respectively, and numeral 80 denotes generally a phase-based break/make controller provided for the breaker 50. The phase-based break/make controller 80 is comprised of a reference phase detecting unit 82 and an arithmetic processing/operation control unit 81.

Description will now turn to operation of the breaker and the phase control switch apparatus.

The R-, S- and T-phase supply voltages are measured by the voltage measuring devices 72a, 72b and 72c, respectively, the output signals thereof being transmitted to a reference phase detecting unit 82 incorporated in the phase-based break/make controller 80. The reference phase detecting unit 82 is designed for detecting the zero-point cycles of the R-, S- and T-phase supply voltages, respectively, to thereby determine the voltage-zero point which is to serve as the standard or reference time point $T_{standard}$.

Upon reception of make (close) command for closing the breaker 50, the arithmetic processing/operation control unit 81 constituting a part of the phase-based break/make controller 80 determines arithmetically a closing or making operation time $t_{close}$ and a pre-arcing time $t_{prearc}$ as predicted from the ambient temperature of the actuator devices, operating forces thereof and voltage measurement data, whereon the predicted closing operation time $t_{close}$ is subtracted from a time period intervening between the preset R-, S- and T-phase closing (making) target time point $T_{target}$ (e.g. electrical angle of 90° for voltage peak) and the reference time point $T_{standard}$ while adding the pre-arcing time $t_{prearc}$, to thereby determine an operation synchronizing time period $t_{cont}$.

Upon lapse of the operation synchronizing time period $t_{cont}$ from the reference time point $T_{standard}$, the arithmetic processing/operation control unit 81 of the phase-based break/make controller 80 supplies the close or make signals to the individual actuator devices 54a, 54b and 54c, respectively, to thereby control the closing or making operations for the contacts disposed within the arc-extinction chambers 52a, 52b and 52c independently of one another so that these contacts can be closed independently each at a predetermined electrical angle which allows the switching surge phenomenon or event (i.e., surge current occurring upon closing) to be suppressed to a minimum.

Such closing or making operation of the breaker 50 performed at the voltage peak through the control procedure or sequence described above is adopted in many practical applications for closing various load apparatuses and equipment such as exemplified by transformers or shunt reactors in the state in which substantially no residual magnetic flux exists and which is thus favorable to suppression or avoidance of the switching surge event as well as for closing capacitor banks and transmission lines in the no-load state in which the switching surge phenomenon or event can be suppressed by closing the breaker 50 at the voltage-zero point.

As is apparent from the above, the closing control for transformers, shunt reactors or the like has conventionally been performed in the state where substantially no residual magnetic flux exists, allowing thus the switching surge taking place transiently upon contact closing to be suppressed by closing the breaker 50 at a voltage peak point. In reality, however, in case the residual magnetic flux is present in the core of the transformer or shunt reactor, great difficulty is encountered in operating the breaker 50 at the closing time point which is optimal for suppressing the switching surge event, giving rise to a problem.

SUMMARY OF THE INVENTION

In the light of the state of the art described above, it is an object of the present invention to provide a phase control switch apparatus which is capable of suppressing transient switching surge phenomena by operating or actuating the breaker at an optimum making or closing time point determined on the basis of the residual magnetic flux predicted for each phase of the transformer, the shunt reactor or the like reactive load notwithstanding of existence of the magnetic flux in the core thereof. Parenthetically, it should be pointed out that such making or closing control of the breaker which can suppress the transient surge and the like phenomena is generally considered to be difficult in the case where the residual magnetic fluxes exist in the core of the transformer, the shunt reactor or the like reactive load.

In view of the above and other objects which will become apparent as the description proceeds, there is provided according to an aspect of the present invention a phase control switch apparatus which includes a breaker connected to a reactive load connected to a three-phase electric power system in A-connection or alternatively in Y-connection with a neutral point being connected directly to the ground or alternatively not connected to the ground, the breaker being designed to break a fault current and a load current flowing through the reactive load or make the reactive load closed to the three-phase electric power system for excitation thereof, a voltage measuring means for measuring phase voltages on a phase-by-phase basis, a current measuring means for measuring inter-contact currents at an output side of the breaker, an actuating means for effectuating open/close operations of contacts of the breaker independently on a phase-by-phase basis, a temperature measuring means disposed in the vicinity of the actuating means, a reference phase detecting means for detecting driving pressures and control voltages of the actuating means for the breaker on a phase-by-phase basis, the reference phase detecting means being so designed as to respond to a brake/make command issued to the breaker to thereby predict waveforms of phase voltages, respectively, upon closing of the breaker as well as phases and periodical zero points of waveforms of phase currents, respectively, upon opening of the breaker on the basis of voltage values and current values measured by the voltage measuring means and the current measuring means, respectively, a residual magnetic flux predicting means for storing breaking time points of the phase contacts of the breaker, respectively, and positive/negative polarities of individual phase currents immediately before breaking in a preceding breaking operation to thereby predict residual magnetic fluxes in the individual phases of the reactive load on the basis of the contents as stored, an optimal closing time point predicting means for predicting upon closing of individual phase contacts of the breaker an optimal closing electrical angle for each of the phases on the basis of the residual magnetic fluxes of the reactive load in the individual phases as predicted by the residual magnetic flux predicting means so that surges occurring upon closing of the breaker contacts can be suppressed each to a minimum, and a contact closing operation starting means for validating contact closing operations of the breaker so that the phase contacts of the breaker can be closed at the electrical angles, respectively, which are predicted and set by the optimal closing time point predicting means.

In a preferred mode for carrying out the invention, the residual magnetic flux predicting means may be so designed that on the precondition that the residual magnetic flux in a first phase broken firstly in the preceding break operation of the three-phase electric power system by the breaker is zero, when a second phase to be broken succeedingly is broken with a phase lag of 60° (⅙ cycle) relative to the first broken phase and when the first phase current is of positive polarity immediately before the breakage thereof with the polarity of the second phase current immediately before the breakage thereof being negative, decision is then made such that the residual magnetic flux in the second broken phase is negative (e.g. residual magnetic flux of −90%), while when the third phase current to be broken finally is broken with a phase lag of 60° (⅙ cycle) relative to the second phase current and when the second phase current is of negative polarity immediately before the breakage thereof with the polarity of the third phase current immediately before the breakage thereof being positive, decision is then made such that the residual magnetic flux in the third broken phase is positive (e.g. residual magnetic flux of 90%), whereas on the precondition that the residual magnetic flux in the first phase broken firstly in the preceding break operation of the three-phase electric power system by the breaker is zero, when the second phase current to be broken succeedingly is broken with a phase lag of 60° (⅙ cycle) relative to the first phase current and when the first phase current is of negative polarity immediately before the breakage thereof with the polarity of the second phase current immediately before the breakage thereof being positive, then decision is made such that the residual magnetic flux in the second broken phase is positive (e.g. residual magnetic flux of 90%), while when the third phase current to be broken finally is broken with a phase lag of 60° (⅙ cycle) relative to the second phase current and when the second phase current is of positive polarity immediately before the breakage thereof with the polarity of the third phase current immediately before the breakage thereof being negative, decision is then made such that the residual magnetic flux in the third broken phase is negative (e.g. residual magnetic flux of −90%).

In another preferred mode for carrying out the invention, the residual magnetic flux predicting means may be so designed that on the precondition that the residual magnetic flux in the first phase broken firstly in the preceding break operation of the three-phase electric power system is zero, when the second phase to be broken succeedingly is broken with a phase lag of 120° (⅓ cycle) relative to the first phase and when the first phase current is of positive polarity immediately before the breakage thereof with the polarity of the second phase current immediately before the breakage thereof being positive, decision is then made such that the residual magnetic flux in the second broken phase is negative (e.g. residual magnetic flux of −90%), while when the third phase current to be broken finally is broken with a phase lag of 120° (⅓ cycle) relative to the second phase current and when the second phase current is of positive polarity immediately before the breakage thereof with the polarity of the third phase current immediately before the breakage thereof being positive, decision is then made such that the residual magnetic flux in the third broken phase is positive (e.g. residual magnetic flux is 90%), whereas on the precondition that the residual magnetic flux in the first phase broken firstly in the preceding break operation is zero, when the second phase current to be broken succeedingly is broken with a phase lag of 120° (⅓ cycle) relative to the first phase current and when the first phase current is of negative polarity immediately before the breakage thereof with the polarity of the second phase current immediately before the breakage thereof being negative, decision is then made such that the polarity of the residual magnetic flux in the second broken phase is positive (e.g. residual magnetic flux is 90%), while when the third phase current to be broken finally is broken with a phase lag of 120° (⅓ cycle) relative to the second phase current and when the second phase current is of negative polarity immediately before the breakage thereof with the polarity of the third phase current immediately before the breakage thereof being negative, decision is then made such that the residual magnetic flux in the third broken phase is negative (e.g. residual magnetic flux of −90%).

In yet another preferred mode for carrying out the invention, the residual magnetic flux predicting means may be so designed as to be previously inputted with absolute values of residual magnetic fluxes of positive and negative polarities, respectively.

In still another preferred mode for carrying out the invention, the residual magnetic flux predicting means may be so designed that the absolute values of the residual magnetic fluxes of the positive and negative polarities are set each at a value within a range of 80% to 90% and that when a value of a rush current occurring upon closing operation of the breaker is greater than an expected value, the preset values of the residual fluxes of the positive and negative polarities are increased or decreased so that the rush current can approximate the expected value.

In a further preferred mode for carrying out the invention, the optimal closing time point predicting means may be so designed that on the basis of such results of prediction performed by the residual magnetic flux predicting means for each phase of the reactive load that the residual magnetic fluxes in the phases are zero, negative and positive, respectively, the optimal closing time point predicting means predicts contact closing time points (electrical angles) for the phases such that surges occurring upon closing of the phases can be suppressed to a minimum by setting the closing time points for the first and second phases to be closed, respectively, in terms of corresponding electrical angles on the basis of the respective residual magnetic fluxes, while setting the closing time point for the third phase to be closed at a same time point as the closing time points of the first and second phases or alternatively at a later time point.

In a yet further preferred mode for carrying out the invention, the optimal closing time point predicting means may be so designed that on the basis of such results of prediction performed by the residual magnetic flux predicting means for each phase of the reactive load connected in Y-connection with a neutral point connected directly to the ground that the residual magnetic flux of the first broken phase is zero, the residual magnetic flux of the second broken phase is negative and the residual magnetic flux of the third broken phase is positive, the optimal closing time point predicting means predicts contact closing time points (electrical angles) for the phases, respectively, such that surges occurring upon closing for the phases can be suppressed to a minimum by setting the phase for which the residual magnetic flux is zero (first broken phase) as the first phase to be closed, while setting the phase for which the residual magnetic flux is positive as the second phase to be closed and setting the phase for which the residual magnetic flux is negative as the third phase to be closed, wherein the closing time point for the first phase to be closed for which the residual magnetic flux is zero is set in the vicinity of an electrical angle of 90 degrees (voltage peak) or alternatively at an electrical angle within a range of 60 to 120 degrees (voltage peak), while the closing time point for the second phase to be closed for which the residual magnetic flux is positive is set in the vicinity of an electrical angle of 75 degrees or alternatively at an electrical angle within a range of 60 to 90 degrees, and wherein the closing time point for the third phase to be closed for which the residual magnetic flux is negative is set at a same time point as the closing time point of the second phase or alternatively at a later time point.

In a still further preferred mode for carrying out the invention, the optimal closing time point predicting means should preferably be so designed that on the basis of such results of prediction performed by the residual magnetic flux predicting means for each phase of the reactive load connected in Y-connection with a neutral point connected directly to the ground that the residual magnetic flux of the first broken phase is zero, the residual magnetic flux of the second broken phase is negative and the residual magnetic flux of the third broken phase is positive, the optimal closing time point predicting means predicts contact closing time points (electrical angles) for the phases, respectively, such that surges occurring upon closing of the phases can be suppressed to a minimum by setting the phase for which the residual magnetic flux is zero (first broken phase) as the first phase to be closed, while setting the phase for which the residual magnetic flux is negative as the second phase to be closed and setting the phase for which the residual magnetic flux is positive as the third phase to be closed, wherein the closing time point for the first phase to be closed for which the residual magnetic flux is zero is set in the vicinity of an electrical angle of 90 degrees (voltage peak) or alternatively in the vicinity of an electrical angle within a range of 60 to 120 degrees (voltage peak), while the closing time point for the second phase to be closed for which the residual magnetic flux is negative is set at an electrical angle of 315 degrees or alternatively at an electrical angle within a range of 300 to 330 degrees, and wherein the closing time point for the third phase to be closed for which the residual magnetic flux is positive is set at a same time point as the closing time point of the second phase or alternatively at a later time point.

In another mode for carrying out the invention, the optimal closing time point predicting means should preferably be so designed that on the basis of such results of prediction performed by the residual magnetic flux predicting means for each phase of the reactive load connected in Y-connection with a neutral point connected directly to the ground that the residual magnetic flux of the first broken phase is zero, the residual magnetic flux of the second broken phase is positive and the residual magnetic flux of the third broken phase is negative, the optimal closing time point predicting means predicts contact closing time points (electrical angles) for the phases, respectively, such that surges occurring upon closing of the phases can be suppressed to a minimum by setting the phase for which the residual magnetic flux is zero as the first phase to be closed, while setting the phase for which the residual magnetic flux is positive as the second phase to be closed and setting the phase for which the residual magnetic flux is negative as the third phase to be closed, wherein the closing time point for the first phase to be closed for which the residual magnetic flux is zero is set in the vicinity of an electrical angle of 90 degrees (voltage peak) or alternatively at an electrical angle within a range of 60 to 120 degrees, while the closing time point for the second phase to be closed for which the residual magnetic flux is positive is set in the vicinity of an electrical angle of 280 degrees or alternatively at an electrical angle within a range of 260 to 300 degrees, and wherein the closing time point for the third phase to be closed for which the residual magnetic flux is negative is set at a same time point as the closing time point of the second phase or alternatively at a later time point.

In yet another mode for carrying out the invention, the optimal closing time point predicting means should preferably be so designed that on the basis of such results of prediction performed by the residual magnetic flux predicting means for each phase of the reactive load connected in Y-connection with a neutral point connected directly to the ground that the residual magnetic flux of the first broken phase is zero, the residual magnetic flux of the second broken phase is positive and the residual magnetic flux of the third broken phase is negative, the optimal closing time point predicting means predicts contact closing time points (electrical angles) for the phases, respectively, such that surges occurring upon closing of the phases can be suppressed to a minimum by setting the phase for which the residual magnetic flux is zero as the first phase to be closed, while setting the phase for which the residual magnetic flux is negative as the second phase to be closed and setting the phase for which the residual magnetic flux is positive as the third phase to be closed, wherein the closing time point for the first phase to be closed for which the residual magnetic flux is zero is set in the vicinity of an electrical angle of 90 degrees (voltage peak) or alternatively at an electrical angle within a range of 60 to 120 degrees (voltage peak), while the closing time point for the second phase to be closed for which the residual magnetic flux is negative is set in the vicinity of an electrical angle of 40 degrees or alternatively at an electrical angle within a range of 20 to 60 degrees, and wherein the closing time point for the third phase to be closed for which the residual magnetic flux is positive is set at a same time point as the closing time point of the second phase or alternatively at a later time point.

By virtue of the arrangements of the phase control switch apparatus described above, the contacts of the breaker 50 can be closed at the optimal timings by taking into account the residual magnetic fluxes in the individual phases determined on the basis of the predicted residual fluxes in the transformer 10, the shunt reactor or the like reactive load, whereby the transient surge or the like phenomena taking place upon breaker contact closing operation can be suppressed to a minimum advantageously.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 1 is a view showing schematically a structure of a phase control switch apparatus according to a first embodiment of the present invention together with waveforms of phase voltages and currents of a three-phase power supply and changes of magnetic fluxes in a transformer connected thereto for illustrating operation in general of the control apparatus;

FIG. 6 is a view for illustrating breaker-contacts closing target points validated in the phase control switch apparatus according to the first embodiment of the invention;

FIG. 7 is a view showing schematically a structure of a phase control switch apparatus according to a second embodiment of the present invention together with waveforms of phase voltages and currents of a three-phase power supply and changes of magnetic fluxes in a transformer connected thereto for illustrating operation in general of the control apparatus;

FIG. 12 is a view for illustrating breaker-contacts closing target points validated in the phase control switch apparatus according to the second embodiment of the invention;

FIG. 13 is a view showing schematically a structure of a phase control switch apparatus according to a third embodiment of the present invention together with waveforms of phase voltages and currents of a three-phase power supply and changes of magnetic fluxes in a transformer connected thereto for illustrating operation in general of the control apparatus;

FIG. 18 is a view for illustrating breaker-contacts closing target points validated in the phase control switch apparatus according to the third embodiment of the invention;

FIG. 23 is a view for illustrating breaker-contacts closing target points validated in the phase control switch apparatus according to the fourth embodiment of the invention.

DESCRIPTION OF THE PREFERRED EMBODIMENTS

Figure 2:
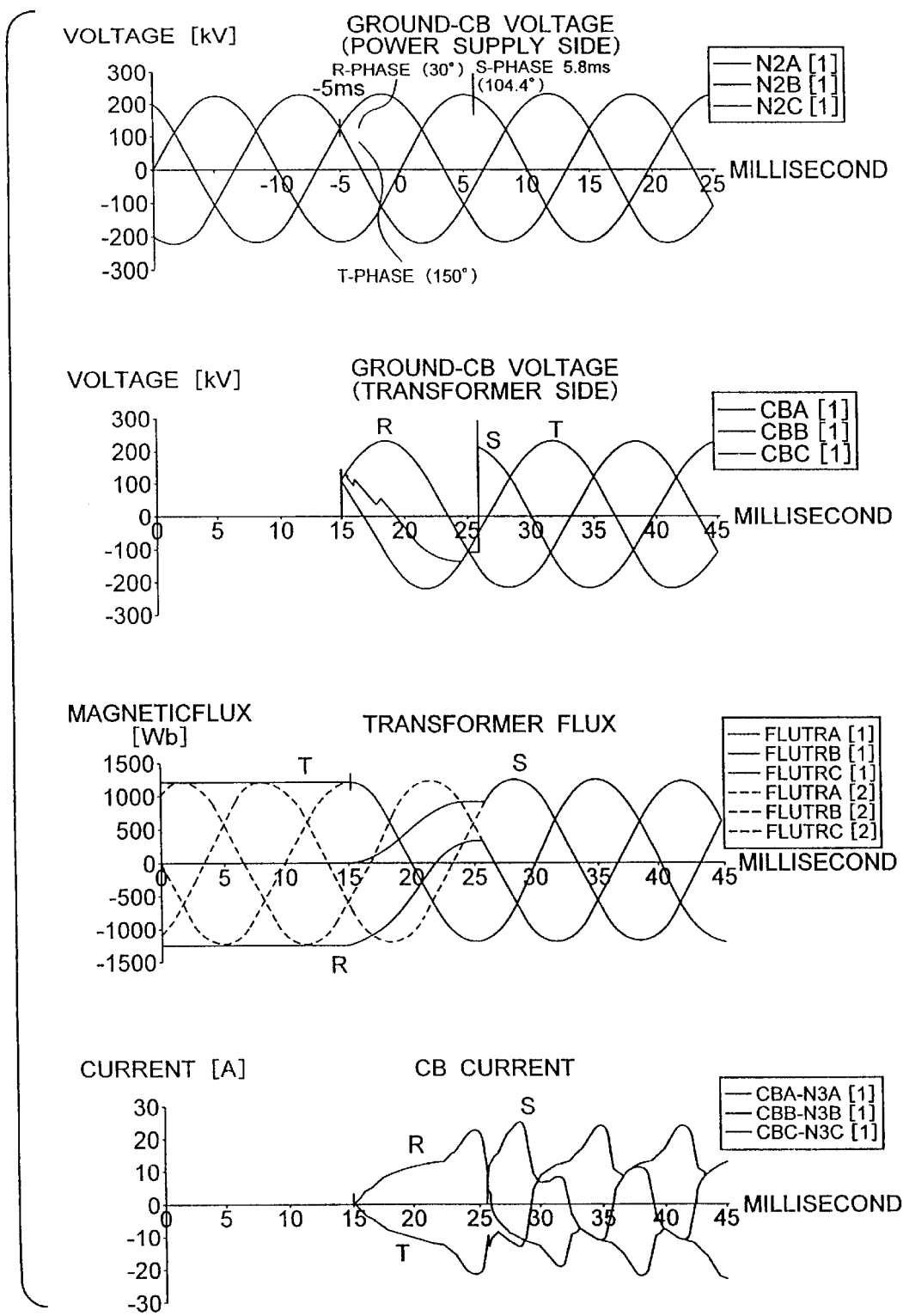
FIG. 2 is a view showing waveforms of phase voltages and currents of a three-phase power supply and changes of magnetic fluxes in a transformer connected thereto for illustrating a first mode of operation of the phase control switch apparatus according to the first embodiment of the invention.

The present invention will be described in detail in conjunction with what is presently considered as preferred or typical embodiments thereof by reference to the drawings. In the following description, like reference numerals or characters designate like or corresponding parts throughout the several views.

Embodiment 1

Now, description will be made of the phase control switch apparatus according to a first embodiment of the present invention by reference to the drawings. FIG. 1 is a view showing schematically a structure of the phase control switch apparatus for a breaker 50 designed for switching a transformer 10 or a shunt reactor of Δ-connection according to the first embodiment of the invention together with waveforms of supply voltages, currents and changes of magnetic fluxes in the R-, S- and T-phases, respectively.

In FIG. 1, reference numeral 10 denotes a transformer having a primary winding and a second winding both being wired in a Δ-connection, and a numeral 50 denotes generally a breaker (which may also be referred to as the circuit breaker or CB in abbreviation) which is designed for breaking R-, S- and T-phase powers and which has arc-extinction chambers 52a, 52b and 52c within which contacts are accommodated, respectively. For performing make/break (open/close) operations for these contacts independently of one another, there are provided independently operating or actuator devices 54a, 54b and 54c in association with these contacts, respectively.

Further, in FIG. 1, reference characters 72a, 72b and 72c denote voltage measuring devices designed for measuring R-, S- and T-phase supply voltages, respectively, 74a, 74b and 74c denote current measuring devices for measuring R-, S- and T-phase currents, respectively, and numeral 80A denotes generally a phase-based break/make controller for the breaker 50. The phase-based break/make controller 80A according to the instant embodiment of the invention is comprised of a standard or reference phase detecting unit 82, a residual magnetic flux detecting unit 83 and an arithmetic processing/operation control unit 81.

Operation of the phase control switch apparatus according to the instant embodiment of the invention will be described.

In the state where the breaker 50 is closed, the R-, S- and T-phase voltages are measured independently by the voltage measuring devices 72a, 72b and 72c, respectively. Further, in the state where the breaker 50 is closed, the R-, S- and T-phase currents are measured by the current measuring devices 74a, 74b and 74c, respectively. The signals indicative of the results of the measurements are supplied to the reference phase detecting unit 82 and the residual magnetic flux detecting unit 83, respectively, which constitute major components of the phase-based break/make controller 80A.

As can be seen in FIG. 1, in each of the R-, S- and T-phases, the magnetic flux exhibits a phase lag of 90° relative to the supply voltage. Further, it can be seen that at the moment the current attains the peak, the magnetic flux assumes a maximum value as well.

When the individual contacts accommodated within the arc-extinction chambers 52a, 52b and 52c, respectively, are opened in response to the contact open command issued to the breaker 50, each of the R-, S- and T-phase currents reaches the current zero point upon lapse of ⅙ cycle. In this manner, the phase currents are broken in the sequence of the R-phase, the T-phase and the S-phase in this order, as indicated, respectively, by phase current breaking points in FIG. 1.

At this juncture, it is assumed that a first phase, e.g. the R-phase current in the illustrated case, is broken. Then, the magnetic flux of the R-phase nonetheless continues to change periodically within the core of the transformer 10 of the Δ-connection similarly to the periodical change before the breakage because the current paths for the two remaining phase currents are still alive at this time point.

Subsequently, the second phase current, e.g. the T-phase current in the illustrated case, is broken. Nevertheless, the magnetic flux of the same polarity as that of the T-phase current immediately before the breaking operation will remain to be effective as the residual flux. In the case of the T-phase, the current is of negative (minus) polarity immediately before being broken. Consequently, the residual magnetic flux assumes negative polarity.

Finally, when the third phase current, e.g. the S-phase current in this exemplary case, is broken, the magnetic flux of the same polarity as that of the S-phase current immediately before the breaking continues to exist as the residual flux. In more concrete, the magnetic flux of positive (plus) polarity remains as the residual magnetic flux because the polarity of the S-phase current is positive upon breaking thereof. At this time point, the changing magnetic flux of the first broken phase, i.e., the R-phase magnetic flux, settles itself to the zero-flux state.

In this manner, for the magnetic fluxes remanent in the core of the transformer 10 of the Δ-connection, the attributes of the magnetic fluxes, i.e., positive (plus) and negative (minus) polarities as well as the zero state thereof can be detected on the basis of the phase sequence in which the phase currents are broken and the polarities of the phase currents immediately before the breakage as measured by the reference phase detecting unit 82 and the residual magnetic flux detecting unit 83 incorporated in the phase-based break/make controller 80A.

The reference phase detecting unit 82 and the residual magnetic flux detecting unit 83 of the phase-based break/make controller 80A according to the first embodiment of the invention are so designed as to operate as follows. Namely, the residual magnetic flux in the first phase broken firstly in the preceding break operation is decided to be zero. On this precondition, when it is detected that the second phase current to be broken succeedingly is broken with a phase lag of 60° (⅙ cycle) relative to the first phase current and when it is detected that the first phase current is of positive polarity immediately before the breakage thereof with the polarity of the second phase current immediately before the breakage thereof being negative (minus), it is then decided that the polarity of the residual magnetic flux in the second broken phase is negative (e.g. residual magnetic flux is −90%). Additionally, when it is detected that the third phase current to be broken finally is broken with a phase lag of 60° (⅙ cycle) relative to the second phase current and when it is detected that the second phase current is of negative polarity immediately before the breakage thereof with the polarity of the third phase current immediately before the breakage thereof being positive (plus), it is then decided that the residual magnetic flux in the third broken phase is of positive polarity (e.g. residual magnetic flux is 90%).

By contrast, on the presumption that the residual magnetic flux in the first phase broken firstly in the preceding break operation is decided to be zero, when it is detected that the second phase current to be broken succeedingly is broken with a phase lag of 60° (⅙ cycle) relative to the first phase current and when it is detected that the first phase current is of negative (minus) polarity immediately before the breakage thereof with the polarity of the second phase current immediately before the breakage thereof being positive (plus), it is then decided that the polarity of the residual magnetic flux in the second broken phase is positive (e.g. residual magnetic flux is 90%). Additionally, when it is detected that the third phase current to be broken finally is broken with a phase lag of 60° (⅙ cycle) relative to the second phase current and when it is detected that the second phase current is of positive polarity immediately before the breakage thereof with the polarity of the third phase current immediately before the breakage thereof being negative, it is then decided that the residual magnetic flux in the third broken phase is of negative polarity (e.g. residual magnetic flux is −90%).

Alternatively, on the presumption that the residual magnetic flux in the first phase broken firstly in the preceding break operation is decided to be zero, when it is detected that the second phase current to be broken succeedingly is broken with a phase lag of 120 (⅓ cycle) relative to the first phase current and when it is detected that the first phase current is of positive polarity immediately before the breakage thereof with the polarity of the second phase current immediately before the breakage thereof being also positive (plus), it is then decided that the polarity of the residual magnetic flux in the second broken phase is negative (e.g. the residual magnetic flux is −90%). Further, when it is detected that the third phase current to be broken finally is broken with a phase lag of 120° (⅓ cycle) relative to the second phase current and when it is detected that the second phase current is of positive polarity immediately before the breakage thereof with the polarity of the third phase current immediately before the breakage thereof being also positive (plus), it is then decided that the residual magnetic flux in the third broken phase is of positive polarity (e.g. residual magnetic flux is 90%).

On the other hand, on the precondition that the residual magnetic flux in the first phase broken firstly in the preceding break operation is decided to be zero, when it is detected that the second phase current to be broken succeedingly is broken with a phase lag of 120° (⅓ cycle) relative to the first phase current and when it is detected that the first phase current is of negative (minus) polarity immediately before the breakage thereof with the polarity of the second phase current immediately before the breakage thereof being negative (minus), then the polarity of the residual magnetic flux in the second broken phase is decided to be positive (e.g. residual magnetic flux is 90%). Furthermore, when it is detected that the third phase current to be broken finally is broken with a phase lag of 120° (⅓ cycle) relative to the second phase current and when it is detected that the second phase current is of negative polarity immediately before the breakage thereof with the polarity of the third phase current immediately before the breakage thereof being also negative, then the residual magnetic flux in the third broken phase is decided to be of negative polarity (e.g. residual magnetic flux is −90%).

As is apparent from the foregoing, when the residual magnetic fluxes exist in the core of the transformer 10 of the Δ-connection, the optimum closing (making) angle for each phase at which the switching surge current can be suppressed to a minimum differs in dependence on the values of the residual magnetic fluxes in the individual phases and the sequence in which the closing or making operations are carried out for the individual phases, respectively. However, in all the cases, the optimum closing (making) angle can be determined definitely.

In more concrete, in the case where the residual magnetic flux of positive or negative polarity continues to exist, the value thereof may be determined in advance empirically or experimentally so that the value of the residual magnetic flux can be set, for example, at 80% when the polarity of the residual magnetic flux is positive (plus), while it can be set, for example, at −80% when the flux polarity is negative (minus). Besides, so far as the absolute values of the residual magnetic fluxes of positive and negative polarities are known, the polarities and the zero points of the residual magnetic fluxes for the individual phases can be predicted through the sequence described previously on the basis of the current behaviors actually detected by the current measuring devices 74a, 74b and 74c, respectively. Thus, it is possible to determine the optimum closing or making angle for each of the phases.

On the other hand, in case the absolute values of the residual magnetic fluxes are unknown, the residual magnetic flux may provisionally be set to 80% in the case where the residual magnetic flux is of positive polarity (plus) while being set at −80% when the flux polarity is negative (minus), whereon the rush currents making appearance in the individual phases upon contact closing control are measured by the current measuring devices 74a, 74b and 74c, respectively. When the rush current value is greater than the expected surge level, then the surge level may be lowered by increasing or decreasing the absolute values of the residual fluxes by means of the phase-based break/make controller 80A.

In more concrete, the closing (making) target time points $T_{target}$ for the individual phases may be set in such manners as illustrated in the table 1 of FIG. 6. As can be seen from the table, in the case where the closing or making operation is to be started from the phase of which the residual magnetic flux is positive (e.g. k %), the closing (making) target time point for this first phase is set to be same as the closing time point for the second phase (i.e., the phase to be closed secondly) or at a time point preceding thereto, while for the closing or making operation for the phase of which the residual magnetic flux is of negative polarity (e.g. −k %), the closing or making target time point for this second phase is set at the electrical angle of $30°-\cos^{-1}(k/100)$ or in the vicinity thereof (e.g. within the range of ±30° from the above electrical angle). Finally, the third phase of which the residual magnetic flux is zero is closed. In that case, the making target time point for this third phase is set at the electrical angle of $(89+3k/20)°$ or in the vicinity thereof (e.g. within the range of ±30° from the above electrical angle) after lapse of $(363/360 -169k/3600)$ cycles from the closing of the second phase.

As another method of setting the closing or making target time points $T_{target}$, the following procedure may be taken. Namely, when the closing or making operation is to be started from the phase of which the residual magnetic flux is positive (e.g. k %), the closing or making target time point for this first phase is set to be same as the closing or making time point for the second phase or at a time point preceding thereto, while for the closing or making operation for the phase of which the residual magnetic flux is zero, the closing or making target time point for this second phase is set at the electrical angle of 60° or in the vicinity thereof (e.g. within the range of ±30° from the above electrical angle). Finally, the third phase of which the residual magnetic flux is of negative polarity (e.g. −k %) is closed. In that case, the making target time point for this third phase is set at the electrical angle of (274+7k/20)° or in the vicinity thereof (e.g. within the range of ±30° from the above electrical angle) after lapse of (−26/360+7k/7200) cycles from the closing of the second phase.

As yet another method of setting the closing or making target time points $T_{target}$, the following procedure may be adopted. Namely, when the closing or making operation is to be started from the phase of which the residual magnetic flux is zero, the closing or making target time point for this first phase is set to be same as the closing or making time point for the second phase or at a time point preceding thereto, while for the making operation for the phase of which the residual magnetic flux is of negative polarity (e.g. −k %), the making target time point for this second phase is set at the electrical angle of (146+46k/25)° or in the vicinity thereof (e.g. within the range of ±30° from the above electrical angle). Finally, when the third phase of which the residual magnetic flux is of positive polarity (e.g. k %) is closed, the closing or making target time point for this third phase is set at the electrical angle of (375−195k/100)° or in the vicinity thereof (e.g. within the range of ±30° from the above electrical angle) after lapse of (132/360−134k/3600) cycles from the closing of the second phase.

In operation, when the close (make) command for closing the breaker 50 is issued, the R-, S- and T-phase supply voltages are measured by the voltage measuring devices 72a, 72b and 72c, respectively, the output signals thereof being supplied to the reference phase detecting unit 82 incorporated in the phase-based break/make controller 80A. The reference phase detecting unit 82 is designed for detecting the zero-point periods of the R-, S- and T-phase supply voltages, respectively, to thereby determine the voltage-zero points serving as the standard or reference time points $T_{standard}$ for the contact making operations for the individual phases.

On the other hand, the arithmetic processing/ operation control unit 81 incorporated in the phase-based break/make controller 80A determines arithmetically the breaker contact closing operation time $t_{close}$ and the pre-arcing time $t_{prearc}$ as predicted on the basis of the measurements data concerning the ambient temperature of the actuator devices 54a, 54b and 54c, respectively, operating forces thereof and the relevant control voltages, whereon the predicted closing operation time $t_{close}$ is subtracted from the time period intervening between the preset R-, S-, T-phase closing (making) target time point $T_{target}$ and the reference time point $T_{standard}$ while adding the pre-arcing time $t_{prearc}$, to thereby determine the operation synchronizing time period $t_{cont}$.

Upon lapse of the determined operation synchronizing time period $t_{cont}$ from the reference time point $T_{standard}$ the arithmetic processing/operation control unit 81 of the phase-based break/make controller 80A supplies the close or make signals to the individual actuator devices 54a, 54b and 54c, respectively, to thereby control the contact making operations for the contacts disposed within the arc-extinction chambers 52a, 52b and 52c independently of one another so that these contacts can be closed independently each at a predetermined electrical angle which allows the switching surge phenomenon or event (i.e., surge current event occurring upon closing operation) to be suppressed to a minimum.

FIG. 2 shows changes of the voltages and the currents of the breaker 50 as well as the changes in the magnetic flux of the transformer 10 or the shunt reactor or the like connected in the Δ-connection when the contacts of the breaker 50 provided, respectively, for the individual phases of the transformer 10 or the shunt reactor or the like are closed independently of one another under the control of the phase-based break/make controller 80A according to the instant embodiment of the invention on the presumption that the first phase to be closed is the S-phase of which residual flux is zero and that the residual magnetic flux is 100% .

As can be seen in FIG. 2, the R-phase of which the residual magnetic flux is of negative polarity is closed at the electrical angle of 30° by the breaker 50 as the first phase, while the second phase, i.e., the T-phase, of which the residual magnetic flux is of positive polarity is closed at the electrical angle of 150°, and finally the contact making operation is performed for the third phase, i.e., the S-phase of which the residual magnetic flux is zero by the breaker 50 at the electrical angle of 104° after lapse of 10.8 ms (50 Hz) from the making or closing operation for the first and/or second phase whereby the rush current which would otherwise flow into the transformer 10 or the shunt reactor or the like can be suppressed satisfactorily.

Figure 3:
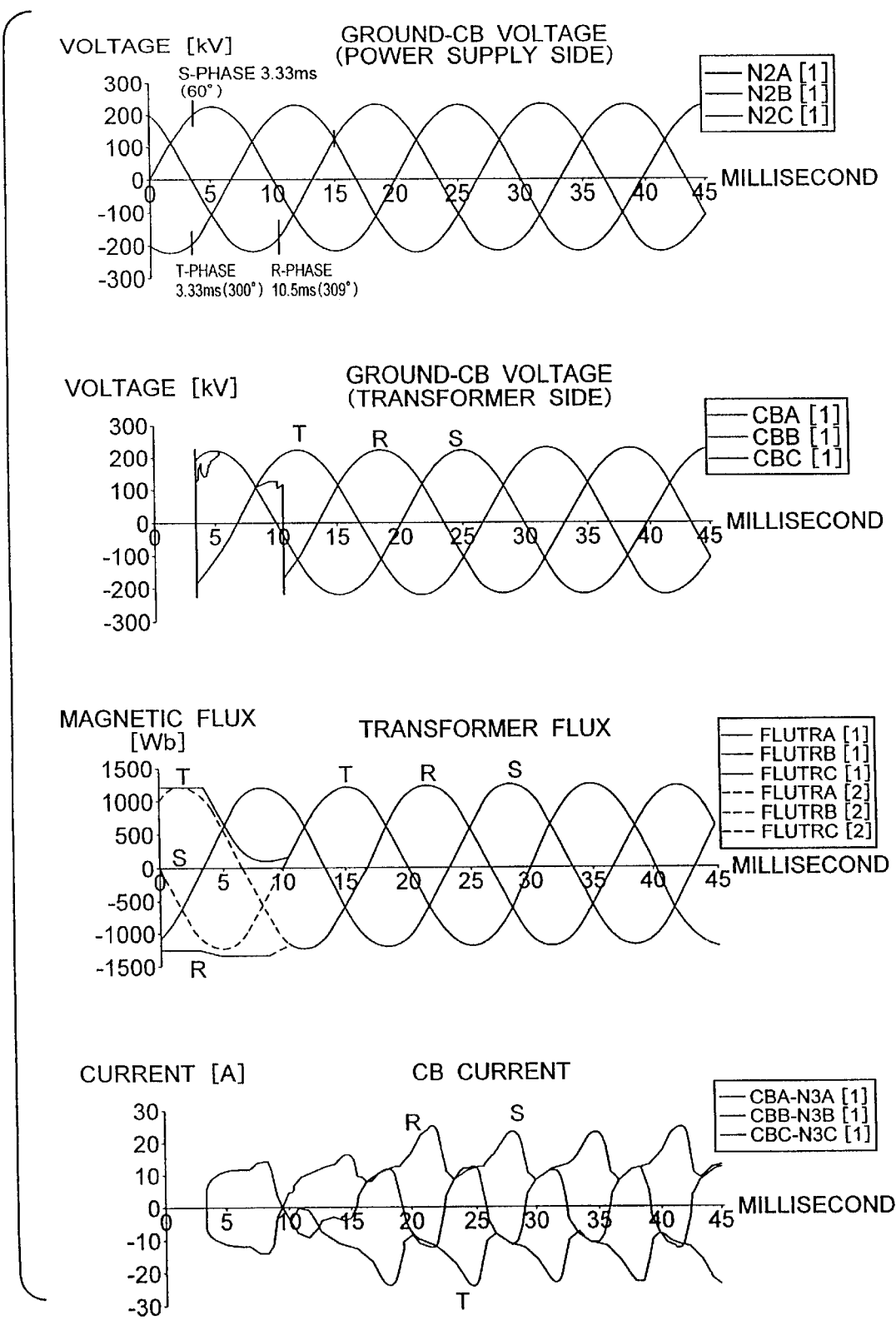
FIG. 3 a view similar to FIG. 2 for illustrating a second mode of operation of the phase control switch apparatus according to the first embodiment of the invention.

FIG. 3 shows waveforms of the voltage and the current of the breaker 50 as well as the changes in the magnetic flux of the transformer 10 or the shunt reactor or the like of the Δ-connection when the contacts of the breaker 50 provided, respectively, for the individual phases of the transformer 10 or the shunt reactor or the like of the Δ-connection are closed independently of one another under the control of the phase-based break/make controller 80A according to the instant embodiment of the invention on the presumption that the first phase to be closed is the R-phase of which the residual flux is of negative polarity.

As can be seen in FIG. 3, the T-phase of which the residual magnetic flux is of positive polarity is closed as the first phase by the breaker 50 at the electrical angle of 300°, while the S-phase of which the residual magnetic flux is zero is closed at the electrical angle of 60° as the second phase, and finally the R-phase of which the residual magnetic flux is zero is closed by the breaker 50 at the electrical angle of 309° after lapse of 7.2 ms (50 Hz) from the closing of the first and second phases. In this manner, the rush current which would otherwise flow into the transformer 10 or the shunt reactor or the like can be suppressed.

Figure 4:
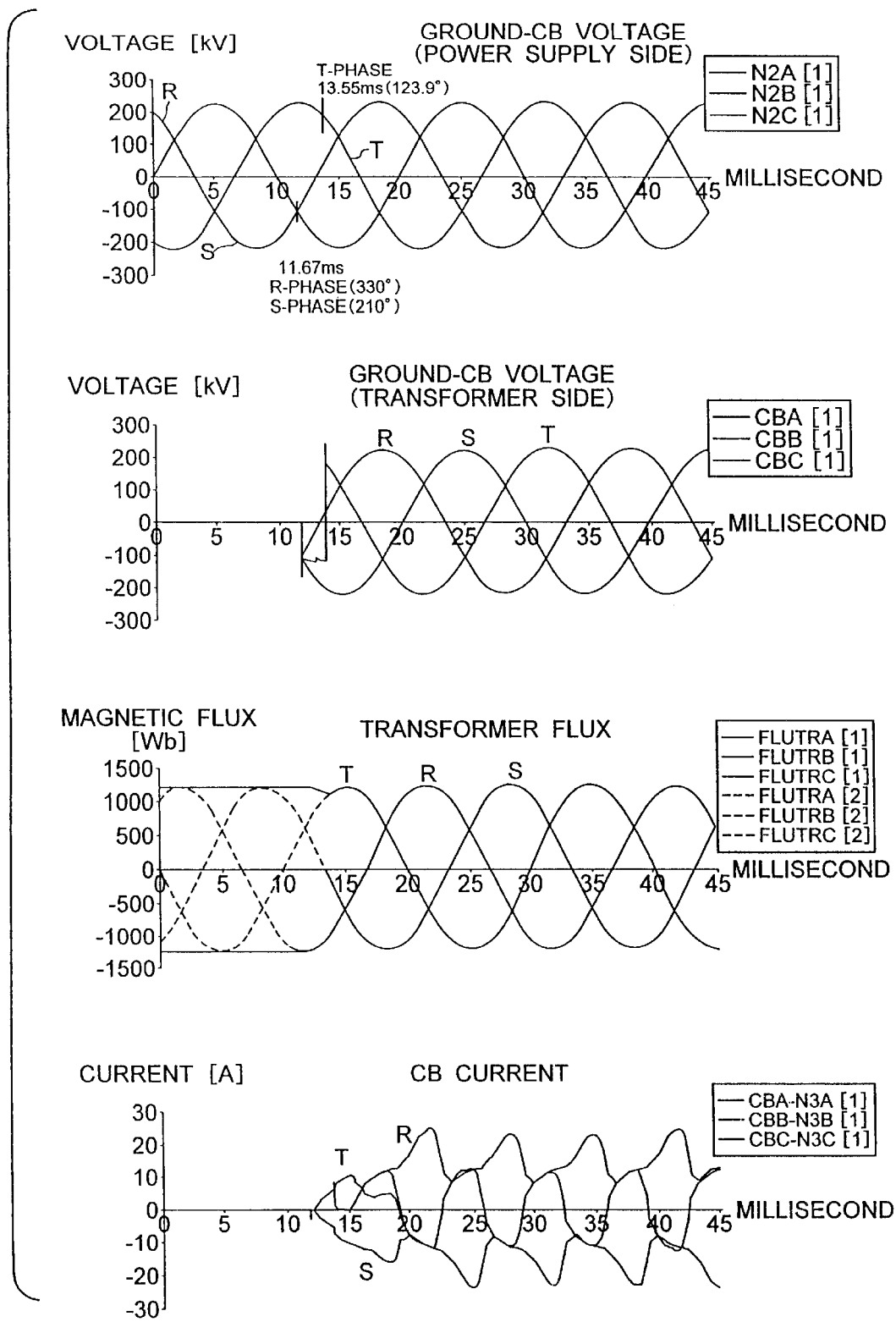
FIG. 4 is a view similar to FIG. 2 for illustrating a third mode of operation of the phase control switch apparatus according to the first embodiment of the invention.

FIG. 4 shows the voltage and the current of the breaker 50 as well as changes in the magnetic flux of the transformer 10 or the shunt reactor or the like of the Δ-connection when the contacts of the breaker 50 provided, respectively, for the individual phases of the transformer 10 or the shunt reactor or the like are closed independently of one another under the control of the phase-based break/make controller 80A according to the instant embodiment of the invention on the presumption that the first phase to be closed is the T-phase of which the residual flux is of positive polarity.

As can be seen in FIG. 4, the R-phase of which the residual magnetic flux is of negative polarity is closed at the electrical angle of 330° as the first phase by the breaker 50, while the S-phase of which the residual magnetic flux is zero is closed at the electrical angle of 210°, and finally the closing or making operation is performed for the T-phase of which the residual magnetic flux is zero by the breaker 50 at the electrical angle of 124° after lapse of 1.9 ms (50 Hz) from the closing of the first and second phases. In this way, the rush current otherwise flowing into the transformer 10 or the shunt reactor or the like can equally be suppressed.

At this juncture, it should be mentioned that in the phase closing sequences described above by way of example, control of the closing time point only for one of the second and third phases is sufficient for realizing the substantially same surge current suppression effect. In that case, the other one of the second and third phases may be closed at a given time point. In other words, it is not always required to close simultaneously the second phase and the third phase.

Figure 5:
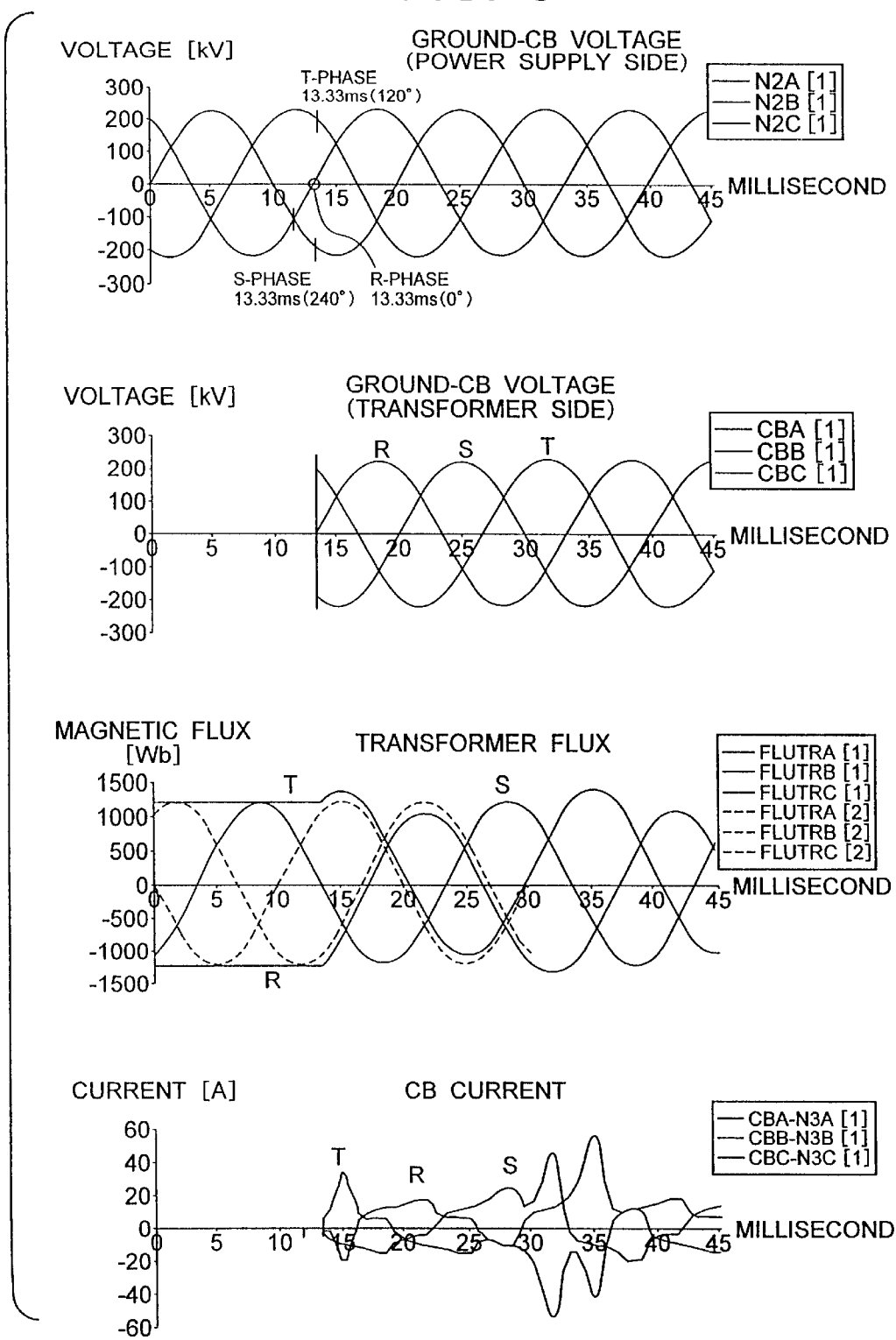
FIG. 5 is a view similar to FIG. 2 for illustrating a fourth mode of operation of the phase control switch apparatus according to the first embodiment of the invention.

FIG. 5 shows the voltage and the current of the breaker 50 as well as changes in the magnetic flux of the transformer 10 or the shunt reactor or the like wired in the Δ-connection when the contacts of the breaker 50 provided, respectively, for the individual phases of the transformer 10 or the shunt reactor or the like are closed simultaneously under the control of the phase-based break/make controller 80A according to the first embodiment of the invention.

As can be seen in FIG. 5, all the three phases are closed simultaneously, i.e., the S-phase for which the residual magnetic flux is zero is closed at the electrical angle of 240°, the T-phase for which the residual magnetic flux is positive is closed at the electrical angle of 120°, and the R-phase of which the residual magnetic flux is negative is closed at the electrical angle of zero, whereby the rush current otherwise flowing into the transformer 10 or the shunt reactor or the like can be suppressed.

Embodiment 2

Next, description will be made of the phase control switch apparatus according to a second embodiment of the present invention by reference to the drawings. FIG. 7 is a view showing a structure of the phase control switch apparatus for the breaker 50 designed for switching a transformer 10 or a shunt reactor or the like of the Y-connection according to the second embodiment of the invention together with supply voltages, the currents and changes of the magnetic fluxes in the individual phases, respectively, wherein the neutral points of both the primary and secondary windings of the transformer 10 are grounded.

Referring to FIG. 7, the transformer of the Y-connection denoted generally by 10 has the primary and secondary windings the neutral point of which is connected to the ground potential. The breaker 50 includes arc-extinction chambers 52a, 52b and 52c within which breaker contacts are accommodated. For effectuating the open/close (break/make) operations for these contacts independently of one another, there are provided actuator devices 54a, 54b and 54c in association with the contacts, respectively. Further, in FIG. 7, reference characters 72a, 72b and 72c denote voltage measuring devices designed for measuring the phase voltages of the respective R-, S- and T-phase lines, reference characters 74a, 74b and 74c denote current measuring devices or transducers designed for measuring currents of the R-, S- and T-phases, and numeral 80B, respectively, denotes generally a phase-based break/make controller provided in combination with the breaker 50. The phase-based break/make controller 80B is comprised of a reference phase detecting unit 82, a residual magnetic flux detecting unit 83 and an arithmetic processing/operation control unit 81. Parenthetically, the structure of the phase-based break/make controller 80B according to the instant embodiment of the invention is essentially same as that of the phase-based break/make controller 80A according to the first embodiment of the invention described hereinbefore.

Operation of the phase control switch apparatus according to the second embodiment of the invention will be described below.

In the state where the contacts of the breaker 50 are closed, the R-, S- and T-phase voltages are measured independently by the voltage measuring devices 72a, 72b and 72c, respectively. Further, in the state where the breaker contacts are closed, the R-, S- and T-phase currents are measured by the current measuring transducer devices 74a, 74b and 74c, respectively. The outputs of these measuring devices are supplied to the reference phase detecting unit 82 and the residual magnetic flux detecting unit 83, respectively, of the phase-based break/make controller 80B.

As can be seen in FIG. 7, in each of the R-, S- and T-phases, the magnetic flux exhibits a phase lag of 90° relative to the supply voltage. It can further be seen that at the moment the phase current attains the peak value, the magnetic flux also assumes the maximum value.

When the individual breaker contacts accommodated within the arc-extinction chambers 52a, 52b and 52c, respectively, are opened in response to the contact open command issued to the breaker 50, each of the R-, S- and T-phase currents reaches the current zero point upon lapse of ⅙ cycle. In this manner, the phase currents are broken in the sequence of the R-phase, the T-phase and the S-phase in this order, as indicated by respective phase current breaking points in FIG. 7.

At this juncture, it is assumed that a first phase current, e.g. the R-phase current in the illustrated case, is broken. The magnetic flux of the R-phase nonetheless continues to change periodically in the core of the transformer 10 of the Y-connection similarly to the periodical change before the breakage because the current paths for the two remaining phase currents are still alive at this time point.

Subsequently, the second phase current, e.g. the T-phase current in the illustrated case, is broken. Nevertheless, the magnetic flux of the same polarity as that of the T-phase current immediately before the breaking operation will remain to be effective as the residual flux. In the case of the T-phase, the current is of negative (minus) polarity immediately before being broken. Consequently, the residual magnetic flux is equally of negative polarity.

Finally, when the third phase current, e.g. the S-phase current in this exemplary case, is broken, the magnetic flux of the same polarity as that of the S-phase current immediately before the breaking continues to remain as residual flux. In more concrete, the magnetic flux of positive (plus) polarity remains as the residual magnetic flux because the polarity of the S-phase current is positive upon breaking thereof. At this time point, the changing magnetic flux of the first broken phase, i.e., the R-phase magnetic flux, settles itself to the zero-flux state.

In this manner, for the magnetic fluxes remanent in the core of the transformer 10 of the Y-connection, the attributes of the magnetic fluxes such as positive (plus) and negative (minus) polarities and the zero state can be detected on the basis of the phase sequence in which the phase currents are broken and the polarities of the phase currents immediately before the breakage as detected by the reference phase detecting unit 82 and the residual magnetic flux detecting unit 83 incorporated in the phase-based break/make controller 80B.

The reference phase detecting unit 82 and the residual magnetic flux detecting unit 83 of the phase-based break/make controller 80B according to the instant embodiment of the invention are so designed as to operate as follows. Namely, the residual magnetic flux in the first phase broken firstly in the preceding break operation is decided to be zero. Further, when it is detected that the second phase current to be broken succeedingly is broken with a phase lag of 60° (⅙ cycle) relative to the first phase current and when it is detected that the first phase current is of positive polarity immediately before the breakage thereof with the polarity of the second phase current immediately before the breakage thereof being negative (minus), it is then decided that the polarity of the residual magnetic flux in the second broken phase is negative (e.g. residual magnetic flux is −90%).

Additionally, when it is detected that the third phase current to be broken finally is broken with a phase lag of 60° (⅙ cycle) relative to the second phase current and when it is detected that the second phase current is of negative polarity immediately before the breakage thereof with the polarity of the third phase current immediately before the breakage thereof being positive (plus), it is then decided that the residual magnetic flux in the third broken phase is of positive polarity (e.g. residual magnetic flux is 90%).

By contrast, on the presumption that the residual magnetic flux in the first phase broken firstly in the preceding break operation is decided to be zero, the second phase current to be broken succeedingly may be broken with a phase lag of 60° (⅙ cycle) relative to the first phase current.

In this conjunction, when it is detected that the first phase current is of negative (minus) polarity immediately before the breakage thereof with the polarity of the second phase current immediately before the breakage thereof being positive (plus), it is then decided that the polarity of the residual magnetic flux in the second broken phase is positive (e.g. residual magnetic flux is 90%). Additionally, when it is detected that the third phase current to be broken finally is broken with a phase lag of 60° (⅙ cycle) relative to the second phase current and when it is detected that the second phase current is of positive polarity immediately before the breakage thereof with the polarity of the third phase current immediately before the breakage thereof being negative, it is then decided that the residual magnetic flux in the third broken phase is of negative polarity (e.g. residual magnetic flux is −90%).

Furthermore, on the presumption that the residual magnetic flux in the first phase broken firstly in the preceding break operation is decided to be zero, when it is detected that the second phase current to be broken succeedingly is broken with a phase lag of 120° (⅓ cycle) relative to the first phase current and when it is detected that the first phase current is of positive polarity immediately before the breakage thereof with the polarity of the second phase current immediately before the breakage thereof being also positive (plus), it is then decided that the polarity of the residual magnetic flux in the second broken phase is negative (e.g. the residual magnetic flux is −90%). Further, when it is detected that the third phase current to be broken finally is broken with a phase lag of 120° (⅓ cycle) relative to the second phase current and when it is detected that the second phase current is of positive polarity immediately before the breakage thereof with the polarity of the third phase current immediately before the breakage thereof being also positive (plus), it is then decided that the residual magnetic flux in the third broken phase is of positive polarity (e.g. residual magnetic flux is 90%).

On the other hand, on the presumption that the residual magnetic flux in the first phase broken firstly in the preceding break operation is decided to be zero, when the second phase current to be broken succeedingly is detected as being broken with a phase lag of 120° (⅓ cycle) relative to the first phase current and when the first phase current is detected to be of negative (minus) polarity immediately before the breakage thereof with the polarity of the second phase current immediately before the breakage thereof being negative (minus), then decision is made that the polarity of the residual magnetic flux in the second broken phase is positive (e.g. residual magnetic flux is 90%). Furthermore, when the third phase current to be broken finally is detected as being broken with a phase lag of 120° (⅓ cycle) relative to the second phase current and when the second phase current is detected as being negative immediately before the breakage thereof with the polarity of the third phase current immediately before the breakage thereof also being negative, then decision is made that the residual magnetic flux in the third broken phase is of negative polarity (e.g. residual magnetic flux is −90%).

As is apparent from the foregoing, when the residual magnetic fluxes exist in the core of the transformer 10 of the Y-connection having the neutral point which is connected to the ground potential, the optimum contact closing (making) angles for the individual phases at which the switching surge current can be suppressed to a minimum vary in dependence on the values of the residual magnetic fluxes in the individual phases and the sequence in which the making operations are carried out for the individual phases, respectively. However, in all the cases, the optimum closing (making) angles can be determined definitely.

In more concrete, in the case where the residual magnetic flux of positive or negative polarity continues to exist, the value thereof may previously be determined empirically or experimentally so that the value of the residual magnetic flux can be set, for example, at 80% when the polarity of the residual magnetic flux is positive, while it can be set, for example, at −80% when the flux polarity is negative. Besides, so far as the absolute values of the residual magnetic fluxes of positive/negative polarity are known, the polarities (positive/negative) and zero points of the residual magnetic fluxes for the individual phases can be predicted through the sequence taught by the invention and described previously on the basis of the current behaviors detected by the current measuring transducer devices 74a, 74b and 74c, respectively. Thus, it is possible to determine the optimum closing or making angle for each of the phases.

On the other hand, when the absolute value of the residual magnetic flux is unknown, the residual magnetic flux may provisionally set at 80% in the case where the residual magnetic flux is of positive polarity (plus) while being set at −80% when the flux polarity is negative (minus), whereon the rush currents of the individual phases are measured by means of the current measuring devices 74a, 74b and 74c upon every closing control. When the rush current value is greater than the expected surge level, then the surge level can be lowered by increasing or decreasing the absolute values of the residual fluxes by means of the phase-based break/make controller 80B.

In more concrete, the closing target time points $T_{target}$ for the individual phases may be set in such manners as illustrated in the table 2 of FIG. 12. As can be seen from the table, in the case where the closing or making operation is to be started from the first broken phase of which the residual magnetic flux is zero, the closing or making target time point for this first phase is set at a voltage peak or in the vicinity thereof, while upon closing operation for the phase of which the residual magnetic flux is of positive polarity (e.g. k %), the closing or making target time point for this second phase is set at the electrical angle of (60+39k/100)° after (¼+k/900) cycles from closing of the first phase or in the vicinity thereof (e.g. within the range of ±30° from the above electrical angle). Finally, the third phase of which the residual magnetic flux is negative is closed. In that case, the making target time point for this third phase is set at the same time point as the closing time point for the second phase or at a time point later than the former.

In conjunction with setting of the closing (making) target time points $T_{target}$, it may be conceived that the closing operation is started from the phase of which the residual magnetic flux is negative (e.g. residual flux of −k %). In that case, the closing or making target time point for the first phase is set at the electrical angle $\theta=\cos^{-1}(-k/100)$ or in the vicinity thereof (e.g. within the range of about ±30°). This closing target time point $T_{target}$ lies at the voltage-zero point or in the vicinity thereof in case the residual magnetic flux is −100%, while when the residual magnetic flux is −80%, the target time point corresponds to the electrical angle of 37°, 143°, 217° or 323° or the value in the vicinity thereof. Subsequently, for closing the phase of which the residual magnetic flux is of zero, the closing target time point for this second phase is set at the electrical angle of $(234+39k/100)°$ after $(-\frac{1}{60}+k/900)$ cycles from the closing of the first phase or in the vicinity thereof (e.g. within the range of ±30° from the above electrical angle). Finally, the phase of which the residual magnetic flux is positive is closed. In that case, the making target time point for this third phase is set at the same time point as the closing time point for the second phase or at a later time point than the above.

Further, in conjunction with setting of the closing target time points $T_{target}$, it can be conceived that the closing operation is started from the phase of which the residual magnetic flux is positive (e.g. residual flux of k %). In that case, the making target time point for the first phase is set at the electrical angle $\theta=\cos^{-1}(k/100)$ or in the vicinity thereof (e.g. within the range of about ±30°). This closing target time point $T_{target}$ lies at the voltage-zero point or in the vicinity thereof (e.g. within the range of about ±30°) in case the residual magnetic flux is 100%, while when the residual magnetic flux is 80%, the target time point corresponds to the electrical angle of 37°, 143°, 217° or 323° or a value in the vicinity thereof (e.g. within the range of about ±30°). Subsequently, for closing the phase of which the residual magnetic flux is of negative (e.g. residual flux of −k %), the closing target time point for this second phase is set at the electrical angle of $(245+10k/100)°$ after $(20/39+k/3600)$ cycles from the closing of the first phase or in the vicinity thereof (e.g. within the range of ±30° from the above electrical angle). Finally, the phase of which the residual magnetic flux is zero is closed. In that case, the making target time point for this third phase is set at the same time point as the closing time point for the second phase or at a later time point than the above.

In operation, when a close (make) command for closing the breaker 50 is issued, the R-, S- and T-phase supply voltages are measured by the voltage measuring devices 72a, 72b and 72c, respectively, the output signals thereof being transmitted to the reference phase detecting unit 82 incorporated in the phase-based break/make controller 80B. The reference phase detecting unit 82 is designed for detecting the zero-point periods of the R-, S- and T-phase supply voltages, respectively, to thereby determine the voltage-zero point serving as the reference time point $T_{standard}$.

The arithmetic processing/operation control unit 81 incorporated in the phase-based break/make controller 80B determines arithmetically the closing operation time $t_{close}$ and the pre-arcing time $t_{prearc}$ as predicted on the basis of the ambient temperature of the actuator devices 54a, 54b and 54c, operating forces thereof and measurement data for the relevant control voltages, whereon the predicted closing operation time $t_{close}$ is subtracted from the time period intervening between the preset R-, S- and T-phase closing (making) target time points $T_{target}$ and the reference time point $T_{standard}$ while adding the pre-arcing time $t_{prearc}$ to thereby determine the operation synchronizing time period $t_{cont}$.

Upon lapse of the determined operation synchronizing time period $t_{cont}$ from the reference time point $T_{standard}$, the arithmetic processing/operation control unit 81 of the phase-based break/make controller 80B supplies the close or make signals to the individual actuator devices 54a, 54b and 54c, respectively, to thereby control the contact making operations for the contacts disposed within the arc-extinction chambers 52a, 52b and 52c independently of one another so that these contacts can be closed independently each at a predetermined electrical angle which allows the switching surge phenomenon or event (i.e., surge current event occurring upon closing operation) to be suppressed to a minimum.

Figure 8:
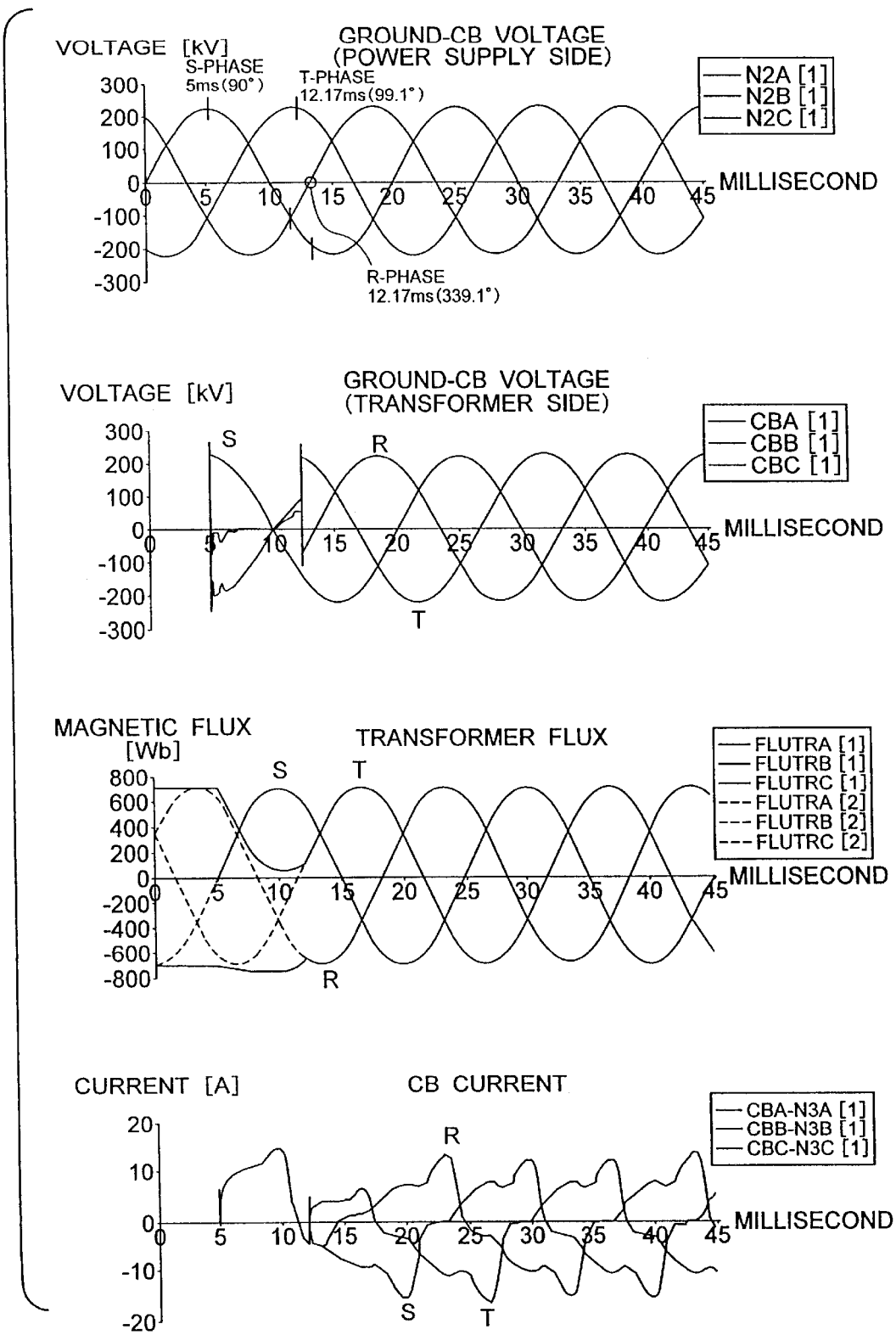
FIG. 8 is a view showing waveforms of phase voltages and currents of a three-phase power supply and changes of magnetic fluxes in a transformer connected thereto for illustrating a first mode of operation of the phase control switch apparatus according to the second embodiment of the invention.

FIG. 8 shows changes of the voltage and the current of the breaker 50 as well as the changes in the magnetic flux of the transformer 10 or the shunt reactor or the like connected in the Δ-connection when the contacts of the breaker 50 provided, respectively, for the individual phases of the transformer 10 or the shunt reactor or the like are closed independently of one another under the control of the phase-based break/make controller 80A according to the instant embodiment of the invention on the presumption that the first phase to be closed is the S-phase of which residual flux is zero and that the residual magnetic flux is 100%.

As can be seen in FIG. 8, the S-phase of which the residual magnetic flux is zero is closed as the first phase at the voltage peak point of the breaker 50, while the T-phase is closed at the electrical angle of 99° after lapse of 7.17 ms (50 Hz) from the closing of the first phase, and the R-phase is closed at the electrical angle of 339° simultaneously with the T-phase, whereby the rush current which would otherwise flow into the transformer 10 or the shunt reactor or the like can be suppressed satisfactorily.

Figure 9:
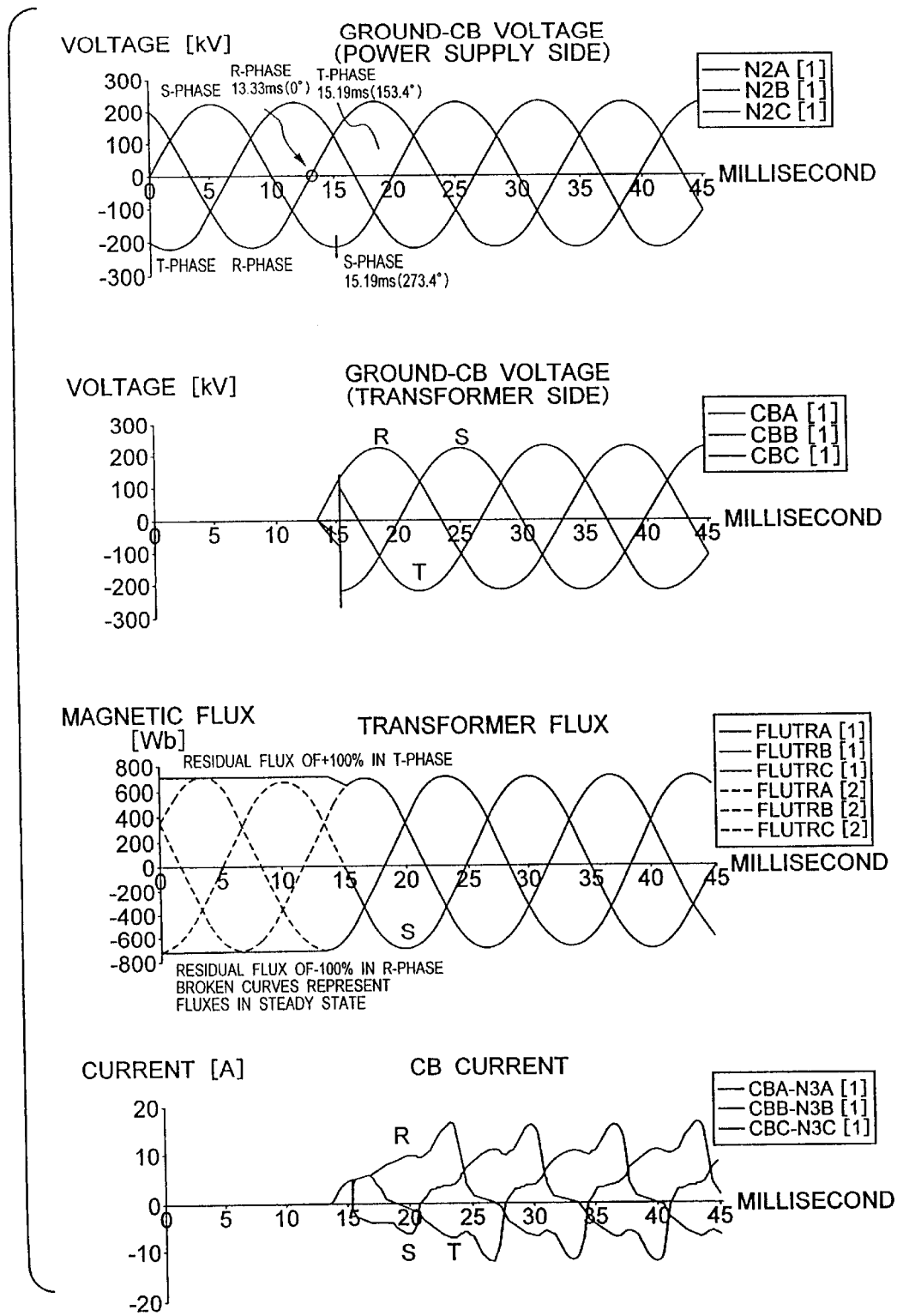
FIG. 9 is a view similar to FIG. 8 for illustrating a second mode of operation of the phase control switch apparatus according to the second embodiment of the invention.

FIG. 9 shows waveforms of the voltage and the current of the breaker 50 as well as the changes in the magnetic fluxes of the transformer 10 or the shunt reactor or the like of Y-connection grounded directly when the contacts of the breaker 50 provided, respectively, for the individual phases of the transformer 10 or the shunt reactor or the like are closed independently of one another under the control of the phase-based break/make controller 80B according to the second embodiment of the invention on the presumption that the first phase to be closed is the R-phase of which the residual flux is of negative polarity.

As can be seen in FIG. 9, the R-phase of which the residual magnetic flux is zero is closed as the first phase at the voltage zero point at which the voltage tends to rise, while the T-phase is closed at the electrical angle of 153° after lapse of 1.86 ms (50 Hz) from the closing of the first phase with the S-phase being closed at the electrical angle of 273° simultaneously with the T-phase. In this way, the rush current which would otherwise flow into the transformer 10 or the shunt reactor or the like can be suppressed.

Figure 10:
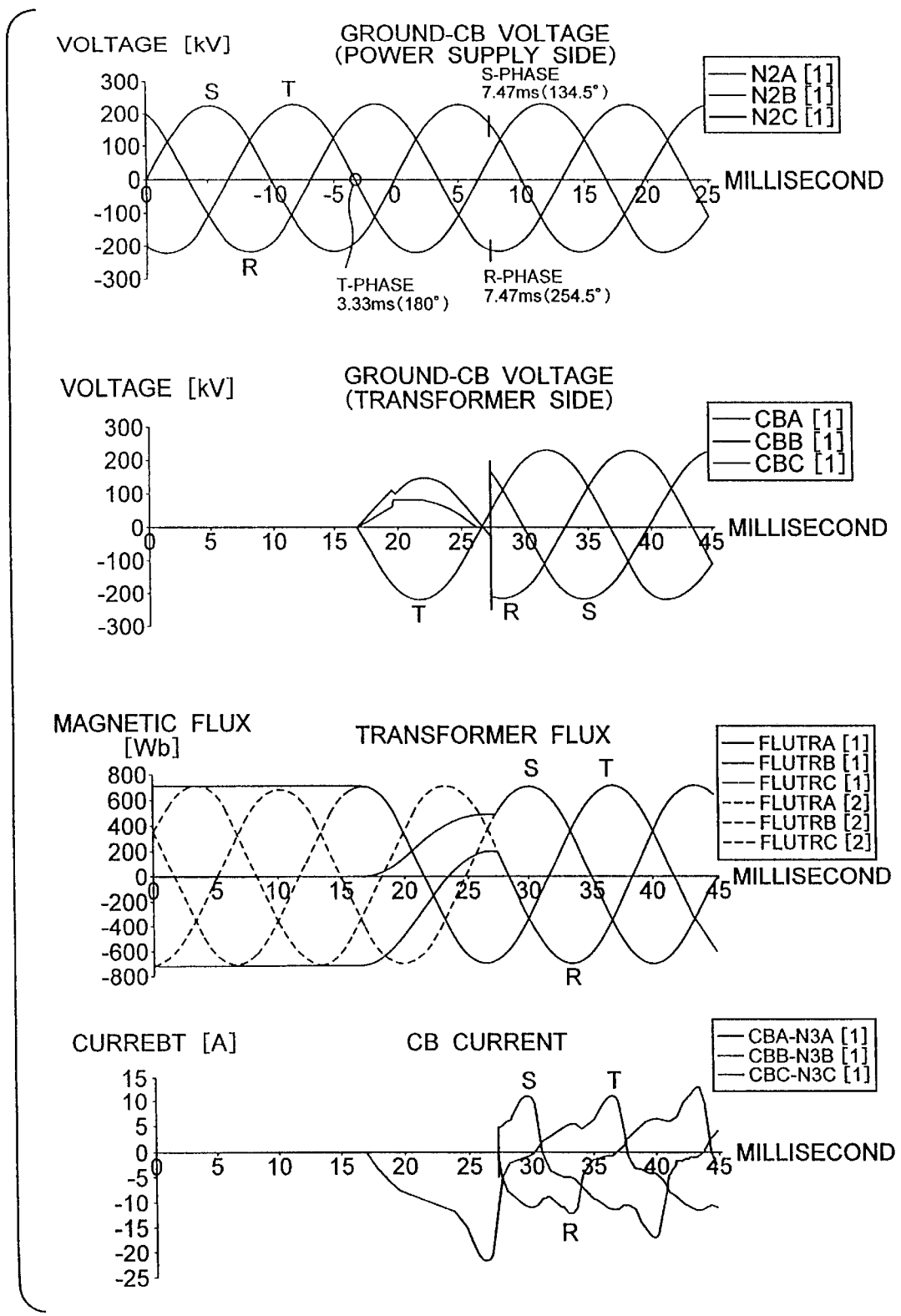
FIG. 10 is a view showing similar to FIG. 8 for illustrating a third mode of operation of the phase control switch apparatus according to the second embodiment of the inventing

FIG. 10 shows waveforms of the voltage and the current of the breaker 50 as well as the changes in the magnetic fluxes of the transformer 10 or the shunt reactor or the like of Y-connection grounded directly when the contacts of the breaker 50 provided, respectively, for the individual phases of the transformer 10 or the shunt reactor or the like are closed independently of one another under the control of the phase-based break/make controller 80B according to the second embodiment of the invention on the precondition that the first phase to be closed is the T-phase of which the residual flux is of positive polarity.

As can be seen in FIG. 10, the T-phase of which the residual magnetic flux is of positive polarity is closed as the first phase at the voltage peak point at which the voltage tends to fall or decrease, while the S-phase is closed at the electrical angle of 134° after lapse of 4.14 ms (50 Hz) from the closure of the first phase with the R-phase being closed at the electrical angle of 255° simultaneously with the S-phase, whereby the rush current which would otherwise flow into the transformer 10 or the shunt reactor or the like can be suppressed.

At this juncture, it should be mentioned that in the phase closing sequences described above by way of example, control of the closing time point only for one of the second and third phases is sufficient for realizing the substantially same surge current suppression effect. In that case, the other one of the second and third phases may be closed at a given time point. In other words, it is not always required to close simultaneously the second phase and the third phase.

Figure 11:
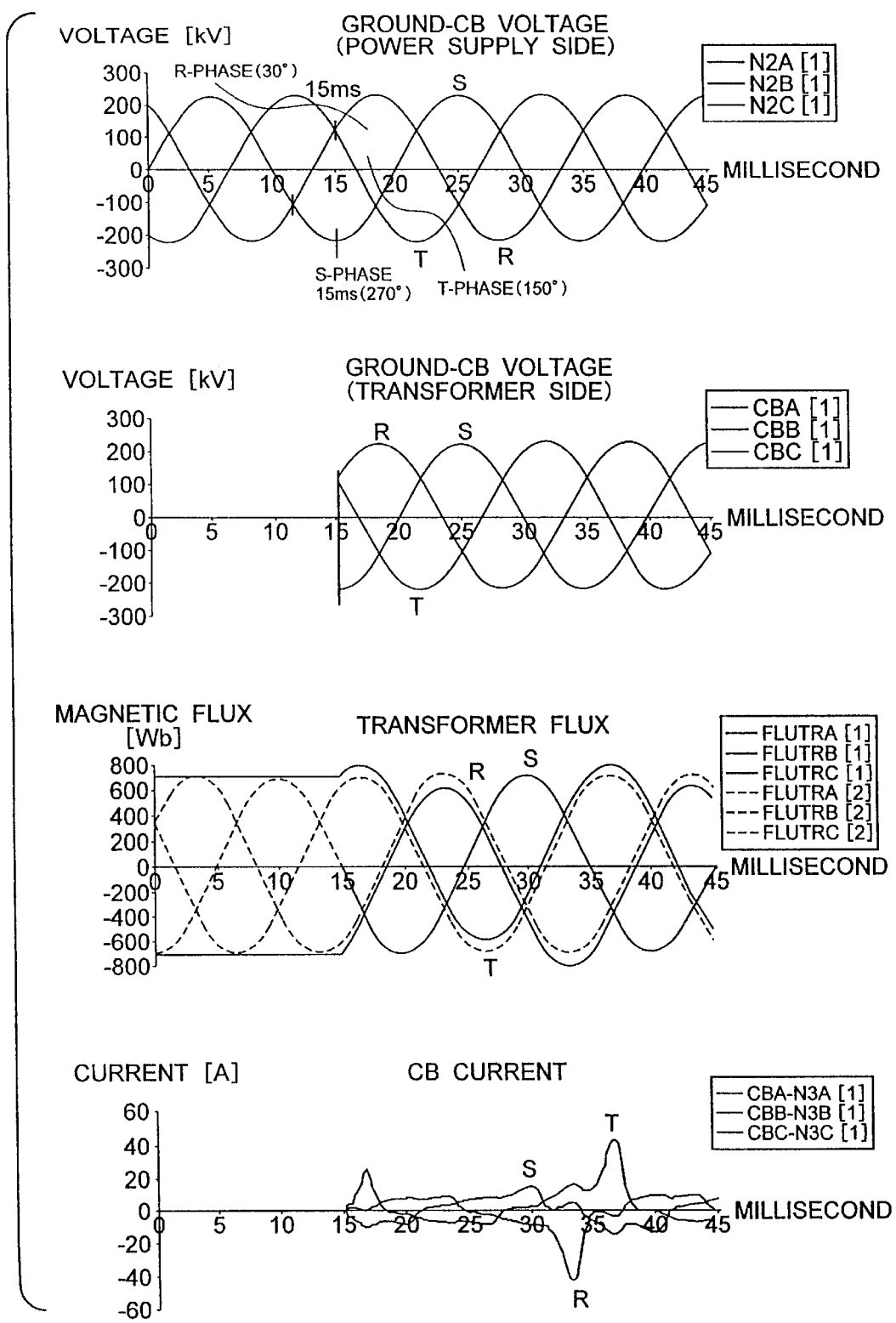
FIG. 11 is a view similar to FIG. 8 for illustrating fourth mode of operation of the phase control switch apparatus according to the second embodiment of the invention.

FIG. 11 shows the voltage and the current of the breaker 50 as well as changes in the magnetic flux of the transformer 10 or the shunt reactor or the like of the Y-connection grounded directly when the contacts of the breaker 50 provided, respectively, for the individual phases of the transformer 10 or the shunt reactor or the like are closed simultaneously under the control of the phase-based break/make controller 80B according to the second embodiment of the invention.

As can be seen in FIG. 11, all the three phases are closed simultaneously, i.e., the S-phase for which the residual magnetic flux is zero is closed at the voltage peak, the T-phase for which the residual magnetic flux is positive or plus is closed at the electrical angle of 150°, and the R-phase of which the residual magnetic flux is negative is closed at the electrical angle of 30°, whereby the rush current otherwise flowing into the transformer 10 or the shunt reactor or the like can be suppressed.

Embodiment 3

Now, description will be made of the phase control switch apparatus according to a third embodiment of the present invention by reference to the drawings.

FIG. 13 is a view showing schematically a structure of the phase control switch apparatus for a breaker 50 designed for switching of a transformer 10 or a shunt reactor of Y-connection having a neutral point not grounded according to the third embodiment of the invention together with waveforms of supply voltages and currents as well as changes of magnetic fluxes in the individual phases, respectively.

In FIG. 13, reference numeral 10 denotes generally a transformer of the Y-connection having a neutral point not grounded, and numeral 50 denotes generally a breaker having arc-extinction chambers 52a, 52b and 52c within which contacts are disposed, respectively. For enabling open/close (break/make) operations to be performed for these contacts independently of one another, the contacts are equipped with respective actuator devices 54a, 54b and 54c. Further, in FIG. 13, reference characters 72a, 72b and 72c denote voltage measuring devices designed for measuring voltages of the R-, S- and T-phases, respectively, reference characters 74a, 74b and 74c denote current measuring devices such as transducers which are designed for measuring R-, S- and T-phase, currents, respectively, and a reference character 80C denotes generally a phase-based break/make controller provided for the breaker 50. The phase-based break/make controller 80C is comprised of a reference phase detecting unit 82, a residual magnetic flux detecting unit 83 and an arithmetic processing/operation control unit 81.

Operation of the phase control switch apparatus according to the instant embodiment of the invention will be described.

In the state where the contacts of the breaker 50 are closed, the R-, S- and T-phase supply voltages are measured independently by the voltage measuring devices 72a, 72b and 72c, respectively. Further, in the breaker-closed state, the R-, S- and T-phase currents are measured by the current measuring transducers 74a, 74b and 74c, respectively. The output signals of the devices 72 and 74 are supplied to the reference phase detecting unit 82 and the residual magnetic flux detecting unit 83, respectively, of the phase-based break/make controller 80C.

As can be seen in FIG. 13, in each of the R-, S- and T-phases, the magnetic flux exhibits a phase lag of 90° relative to the supply voltage. Further, it can be seen that at the moment the current attains the peak, the magnetic flux assumes a maximum value.

When the individual contacts accommodated within the arc-extinction chambers 52a, 52b and 52c, respectively, are opened in response to the contact open command issued to the breaker 50, each of the R-, S- and T-phase currents reaches the current zero point upon lapse of ⅙ cycle. In this manner, the phase currents are broken in the sequence of the R-phase, the T-phase and the S-phase in this order, as indicated by the respective phase current breaking points in FIG. 13.

At this juncture, it is assumed that a first phase, e.g. the R-phase current in the illustrated case, is broken. The magnetic flux of the R-phase nonetheless continues to change periodically within the core of the transformer 10 of Y-connection similarly to the periodical change before the breakage because the current paths for the two remaining phase currents are still alive at this time point. Subsequently, the second phase current, e.g. the T-phase current in the illustrated case, is broken. Nevertheless, the magnetic flux of the same polarity as that of the T-phase current immediately before the breaking operation will remain effective at the T-phase residual flux. In the case of the illustrated example, the T-phase current is of negative polarity immediately before being broken. Consequently, the residual magnetic flux is also negative. Finally, when the third phase current, e.g. the S-phase current in this exemplary case, is broken, the magnetic flux of the same polarity as that of the S-phase current immediately before the breaking continues to remain as the S-phase residual flux. In more concrete, the magnetic flux of positive polarity remains as the S-phase residual flux because the polarity of the S-phase current is positive upon breaking thereof. At this time point, the changing magnetic flux of the first broken phase, i.e., the R-phase magnetic flux, settles itself to the zero-flux state.

In this manner, for the magnetic fluxes remanent in the core of the transformer 10 of Y-connection having the neutral point not grounded, the attributes such as positive/negative polarities as well as the zero state of the magnetic flux can be detected on the basis of the phase sequence in which the phase currents are broken and the polarities of the phase currents immediately before the breakage as measured by the reference phase detecting unit 82 and the residual magnetic flux detecting unit 83 incorporated in the phase-based break/make controller 80C.

In this conjunction, the reference phase detecting unit 82 and the residual magnetic flux detecting unit 83 of the phase-based break/make controller 80C according to the third embodiment of the invention are so designed as to operate as follows. Namely, the residual magnetic flux of the first phase broken firstly in the preceding breaking operation is decided to be zero. Further, when it is detected that the second phase current to be broken succeedingly is broken with a phase lag of 60° (⅙ cycle) relative to the first phase current and when it is detected that the first phase current is of positive polarity immediately before the breakage thereof with the polarity of the second phase current immediately before the breakage thereof being negative, it is then decided that the polarity of the residual magnetic flux in the second broken phase is negative (e.g. residual magnetic flux is −90%). Additionally, when it is detected that the third phase current to be broken finally is broken with a phase lag of 60° (⅙ cycle) relative to the second phase current and when it is detected that the second phase current is of negative polarity immediately before the breakage thereof with the polarity of the third phase current immediately before the breakage thereof being positive (plus), it is then decided that the residual magnetic flux in the third broken phase assumes positive polarity (e.g. residual magnetic flux is 90%).

By contrast, on the presumption that the residual magnetic flux in the first phase broken firstly in the preceding break operation is decided to be zero, and when it is detected that the second phase current to be broken succeedingly is broken with a phase lag of 60° (⅙ cycle) relative to the first phase current and additionally when it is detected that the first phase current is of negative polarity immediately before the breakage thereof with the polarity of the second phase current immediately before the breakage thereof being positive, then decision is made that the polarity of the residual magnetic flux in the second broken phase is positive (e.g. residual magnetic flux is 90%). Additionally, when it is detected that the third phase current to be broken finally is broken with a phase lag of 60° (⅙ cycle) relative to the second phase current and when it is detected that the second phase current is of positive polarity immediately before the breakage thereof with the polarity of the third phase current immediately before the breakage thereof being negative, then decision is made that the residual magnetic flux in the third broken phase is of negative polarity (e.g. residual magnetic flux is −90%)

Furthermore, on the precondition that the residual magnetic flux in the first phase broken firstly in the preceding break operation is zero and when it is detected that the second phase current to be broken succeedingly is broken with a phase lag of 120° (⅓ cycle) relative to the first phase current and when it is detected that the first phase current is of positive polarity immediately before the breakage thereof with the polarity of the second phase current immediately before the breakage thereof being also positive, then decision is made that the polarity of the residual magnetic flux in the second broken phase is negative (e.g. the residual magnetic flux is −90%). Further, when it is detected that the third phase current to be broken finally is broken with a phase lag of 120° (⅓ cycle) relative to the second phase current and when it is detected that the second phase current is of positive polarity immediately before the breakage thereof with the polarity of the third phase current immediately before the breakage thereof being also positive, it is then decided that the residual magnetic flux in the third broken phase is of positive polarity (e.g. residual magnetic flux is 90%).

On the other hand, on the presumption that the residual magnetic flux in the first phase broken firstly in the preceding break operation is zero and when it is detected that the second phase current to be broken succeedingly is broken with a phase lag of 120° (⅓ cycle) relative to the first phase current and when it is detected that the first phase current is of negative polarity immediately before the breakage thereof with the polarity of the second phase current immediately before the breakage thereof being also negative, it is then decided that the polarity of the residual magnetic flux in the second broken phase is positive (e.g. residual magnetic flux is 90%). Furthermore, when it is detected that the third phase current to be broken finally is broken with a phase lag of 120° (⅓ cycle) relative to the second phase current and when it is detected that the second phase current is of negative polarity immediately before the breakage thereof with the polarity of the third phase current immediately before the breakage thereof being also negative, it is then decided that the residual magnetic flux in the third broken phase is of negative polarity (e.g. residual magnetic flux is −90%).

As is apparent from the foregoing, when the residual magnetic fluxes exist in the core of the transformer 10 of the Y-connection having the neutral point not grounded, the optimum contact closing (making) angles for the individual phases at which the switching surge current can be suppressed to a minimum vary in dependence on the values of the residual magnetic fluxes in the individual phases and the sequence in which the making operations are carried out for the individual phases, respectively. However, in all the cases, the optimum closing (making) angles can be determined definitely.

In more concrete, in the case where the residual magnetic flux of positive or negative polarity continues to exist, the value thereof may previously be determined experimentally so that the value of the residual magnetic flux can be set, for example, at 80% when the polarity of the residual magnetic flux is positive, while it can be set, for example, at −80% when the flux polarity is negative. Besides, so far as the absolute values of the residual magnetic fluxes of positive/negative polarities are known, the polarities (positive/negative) and zero points of the residual magnetic fluxes for the individual phases can be predicted through the procedure taught by the invention and described previously on the basis of the current behaviors detected by the current measuring transducer devices 74a, 74b and 74c, respectively. Thus, it is possible to determine the optimum closing or making angle for each of the phases.

On the other hand, when the absolute value of the residual magnetic flux is unknown, the residual magnetic flux may provisionally set at 80% in the case where the residual magnetic flux is of positive polarity while being set at −80% when the flux polarity is negative, whereon the rush currents of the individual phases are measured by means of the current measuring devices 74a, 74b and 74c upon every closing control. When the rush current value measured actually is greater than the expected surge level, then the surge level can be lowered by increasing or decreasing the absolute values of the residual fluxes by means of the phase-based break/make controller 80B.

In more concrete, the closing or making target time points $T_{target}$ for the individual phases may be set in such manners as illustrated in the table 3 of FIG. 18. As can be seen from the table, in the case where the closing operation is to be started from the phase of which the residual magnetic flux is positive (e.g. k %), the closing target time point for this first phase is set to be same as the closing time point for the second phase (i.e., the phase to be closed secondly) or at a time point preceding thereto, while for closing the phase of which the residual magnetic flux is negative (e.g. −k %), the closing target time point for this second phase is set at the electrical angle of 30° or in the vicinity thereof (e.g. within the range of ±30° from the above electrical angle). Finally, the third phase of which the residual magnetic flux is zero is closed. In that case, the making target time point for this third phase is set at the electrical angle of 90° or in the vicinity thereof (e.g. within the range of ±30° from the above electrical angle) after lapse of ½° cycle from the closing of the second phase.

As another method of setting the closing or making target time points $T_{target}$, the following procedure may be taken. Namely, when the making operation is to be started from the phase of which the residual magnetic flux is positive (e.g. k %), the making target time point for this first phase is set to be same as the making time point for the second phase or at a time point preceding thereto, while for the making operation for the phase of which the residual magnetic flux is zero, the making target time point for this second phase is set at the electrical angle of 270° or in the vicinity thereof (e.g. within the range of ±30° from the above electrical angle). Finally, the third phase of which the residual magnetic flux is of negative polarity (e.g. −k %) is closed. In that case, the making target time point for this third phase is set at the electrical angle of (302−k/5)° or in the vicinity thereof (e.g. within the range of ±30° from the above electrical angle) after lapse of (272/360 −k/1800) cycles from the closing of the second phase.

As yet another method of setting the making target time points $T_{target}$, the following procedure may be adopted. Namely, when the making operation is to be started from the phase of which the residual magnetic flux is zero, the making target time point for this first phase is set to be same as the making time point for the second phase or at a time point preceding thereto, while for the making operation for the phase of which the residual magnetic flux is negative (e.g. −k %), the making target time point for this second phase is set at the electrical angle of 30° or in the vicinity thereof (e.g. within the range of ±30° from the above electrical angle). Finally, when the third phase of which the residual magnetic flux is positive (e.g. k %) is closed, the making target time point for this third phase is set at the electrical angle of (375−195k/100)° or in the vicinity thereof (e.g. within the range of ±30° from the above electrical angle) after lapse of (15/24−13k/2400) cycles from the closing of the second phase.

In operation, when the make command for closing the breaker 50 is issued, the R-, S- and T-phase supply voltages are measured by the voltage measuring devices 72a, 72b and 72c, respectively, the output signals thereof being supplied to the reference phase detecting unit 82 incorporated in the phase-based break/make controller 80C. The reference phase detecting unit 82 is designed for detecting the zero-point cycles of the R-, S- and T-phase supply voltages, respectively, to thereby determine the voltage-zero points serving as the standard or reference time points $T_{standard}$ for the making operations for the individual phases.

On the other hand, the arithmetic processing/operation control unit 81 incorporated in the phase-based break/make controller 80C determines arithmetically the breaker contact closing operation time $t_{close}$ and the pre-arcing time $t_{prearc}$ as predicted on the basis of the measurements data concerning the ambient temperature of the actuator devices 54a, 54b and 54c, respectively, operating forces thereof and the control voltages, whereon the predicted closing operation time $t_{close}$ is subtracted from the time period intervening between the preset R-, S-, T-phase making target time point $T_{target}$ and the reference time point $T_{standard}$ while adding the pre-arcing time $t_{prearc}$ to thereby determine the operation synchronizing time period $t_{cont}$.

Upon lapse of the determined operation synchronizing time period $t_{cont}$ from the reference time point $T_{standard}$, the arithmetic processing/operation control unit 81 of the phase-based break/make controller 80C supplies the make signals to the individual actuator devices 54a, 54b and 54c, respectively, to thereby control the contact making operations for the contacts disposed within the arc-extinction chambers 52a, 52b and 52c independently of one another so that these contacts can be closed independently each at a predetermined electrical angle which allows the switching surge phenomenon or event (i.e., surge current event occurring upon closing operation) to be suppressed to a minimum.

Figure 14:
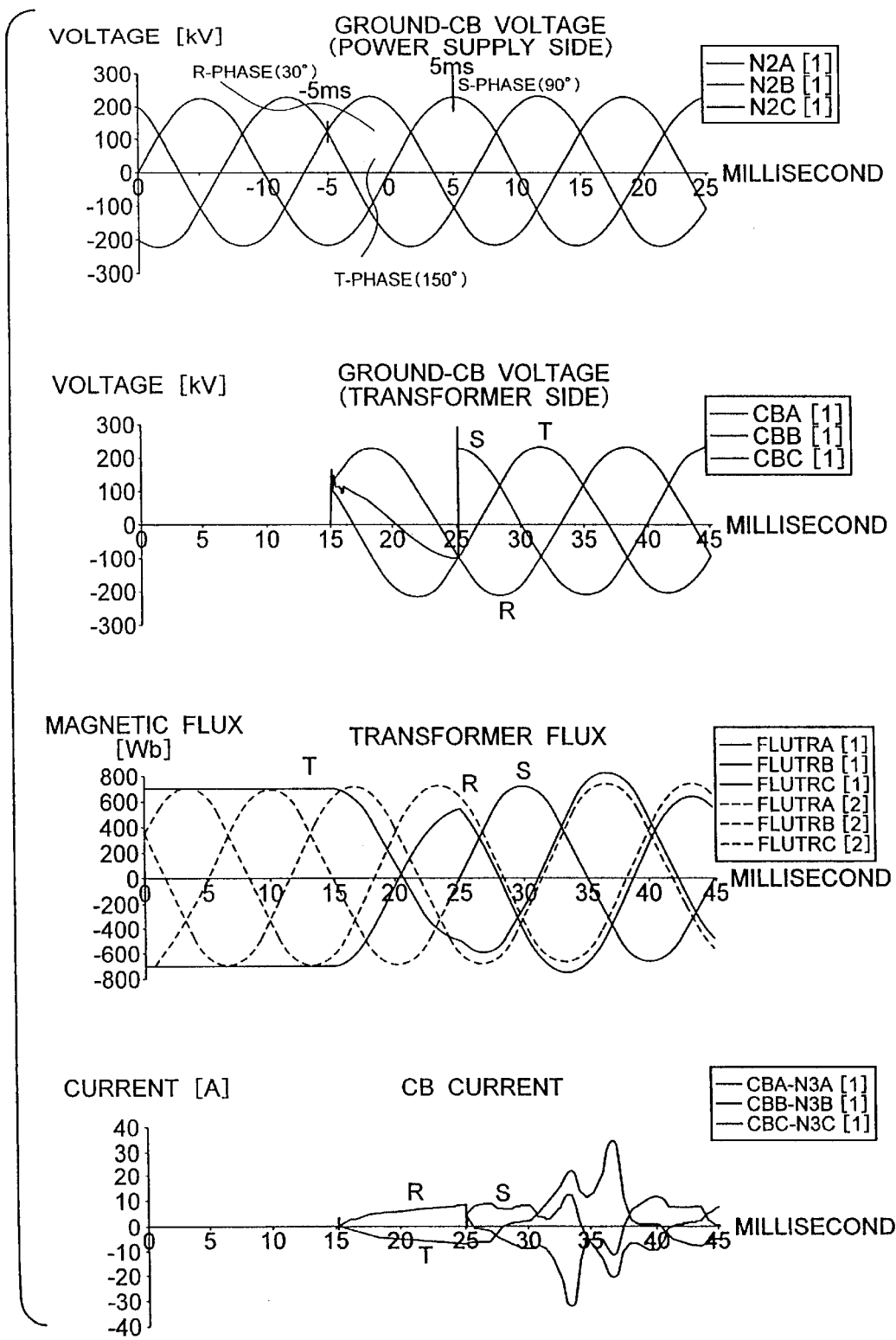
FIG. 14 is a view showing waveforms of phase voltages and currents of a three-phase power supply and changes of magnetic fluxes in a transformer connected thereto for illustrating a first mode of operation of the phase control switch apparatus according to the third embodiment of the invention.

FIG. 14 shows changes of the voltage and the current of the breaker 50 as well as the changes in the magnetic flux of the transformer 10 or the shunt reactor or the like of Y-connection having a neutral point not grounded when the contacts of the breaker 50 provided, respectively, for the individual phases of the transformer 10 or the shunt reactor or the like are closed independently of one another under the control of the phase-based break/make controller 80C according to the third embodiment of the invention on the presumption that the first phase to be closed is the S-phase of which residual flux is zero and that the residual magnetic flux is 100%.

As can be seen in FIG. 14, the R-phase of which the residual magnetic flux is of negative polarity is closed at the electrical angle of 30° by the breaker 50 as the first phase, while the second phase, i.e., the T-phase, of which the residual magnetic flux is positive is closed at the electrical angle of 150°, and finally the contact making operation is performed for the third phase, i.e., the S-phase, of which the residual magnetic flux is zero at the electrical angle of 90° after lapse of 10 ms (50 Hz) from the closing for the first and/or second phase, whereby the rush current which would otherwise flow into the transformer 10 or the shunt reactor or the like can be suppressed.

Figure 15:
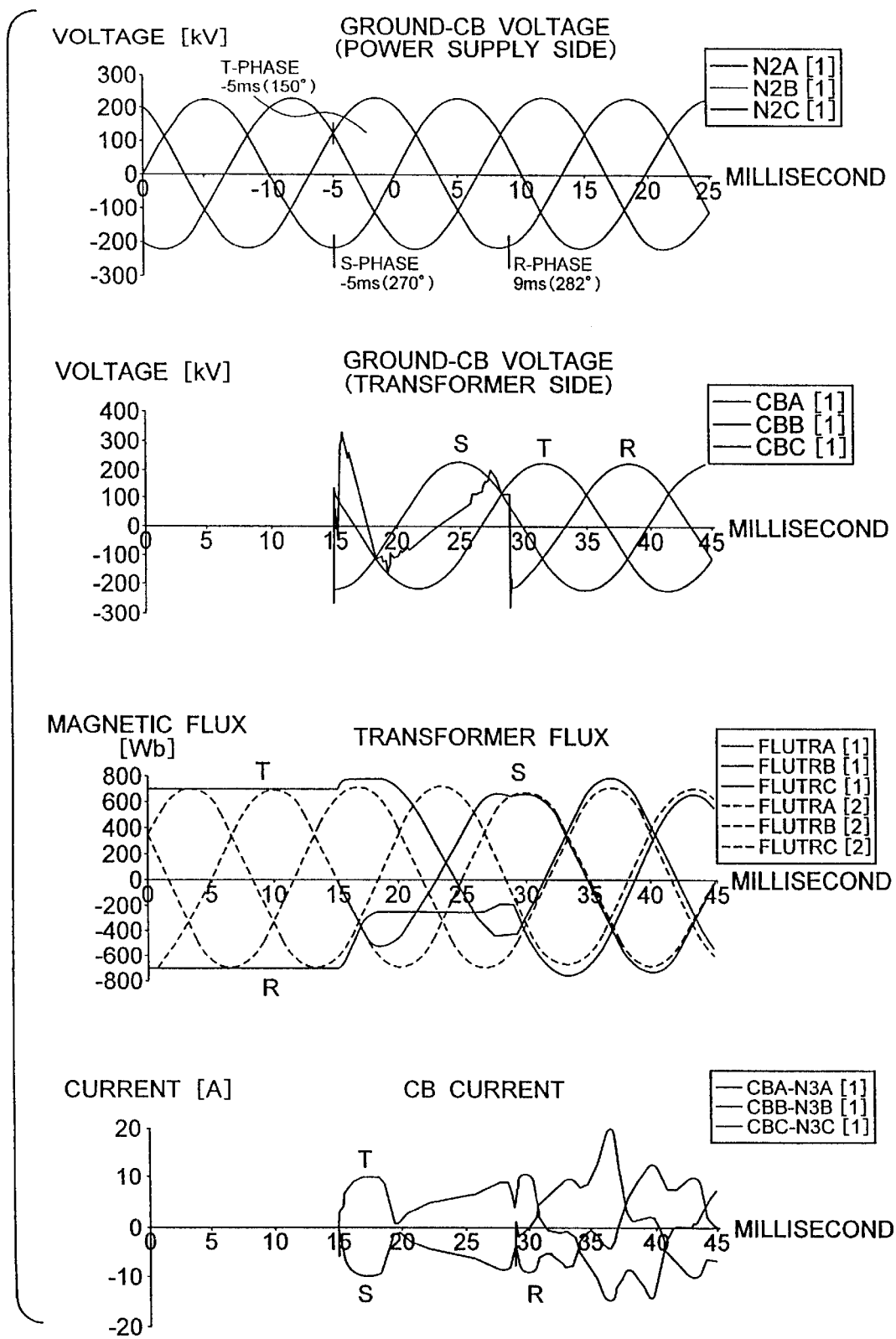
FIG. 15 is a view similar to FIG. 14 for illustrating a second mode of operation of the phase control switch apparatus according to the third embodiment of the invention.

FIG. 15 shows waveforms of the voltage and the current of the breaker 50 as well as the changes in the magnetic flux of the transformer 10 or the shunt reactor or the like of Y-connection having a neutral point not grounded when the contacts of the breaker 50 provided, respectively, for the individual phases of the transformer 10 or the shunt reactor or the like are closed independently of one another under the control of the phase-based break/make controller 80C according to the third embodiment of the invention on the presumption that the first phase to be closed is the R-phase of which the residual flux is negative.

As can be seen in FIG. 15, the T-phase of which the residual magnetic flux is positive is closed as the first phase by the breaker 50 at the electrical angle of 150°, while the S-phase of which the residual magnetic flux is zero is closed at the electrical angle of 270° as the second phase, and finally the R-phase of which the residual magnetic flux is zero is closed at the electrical angle of 282° after lapse of 14 ms (50 Hz) from the closing of the first and second phases, whereby the rush current which would otherwise flow into the transformer 10 or the shunt reactor or the like can be suppressed.

Figure 16:
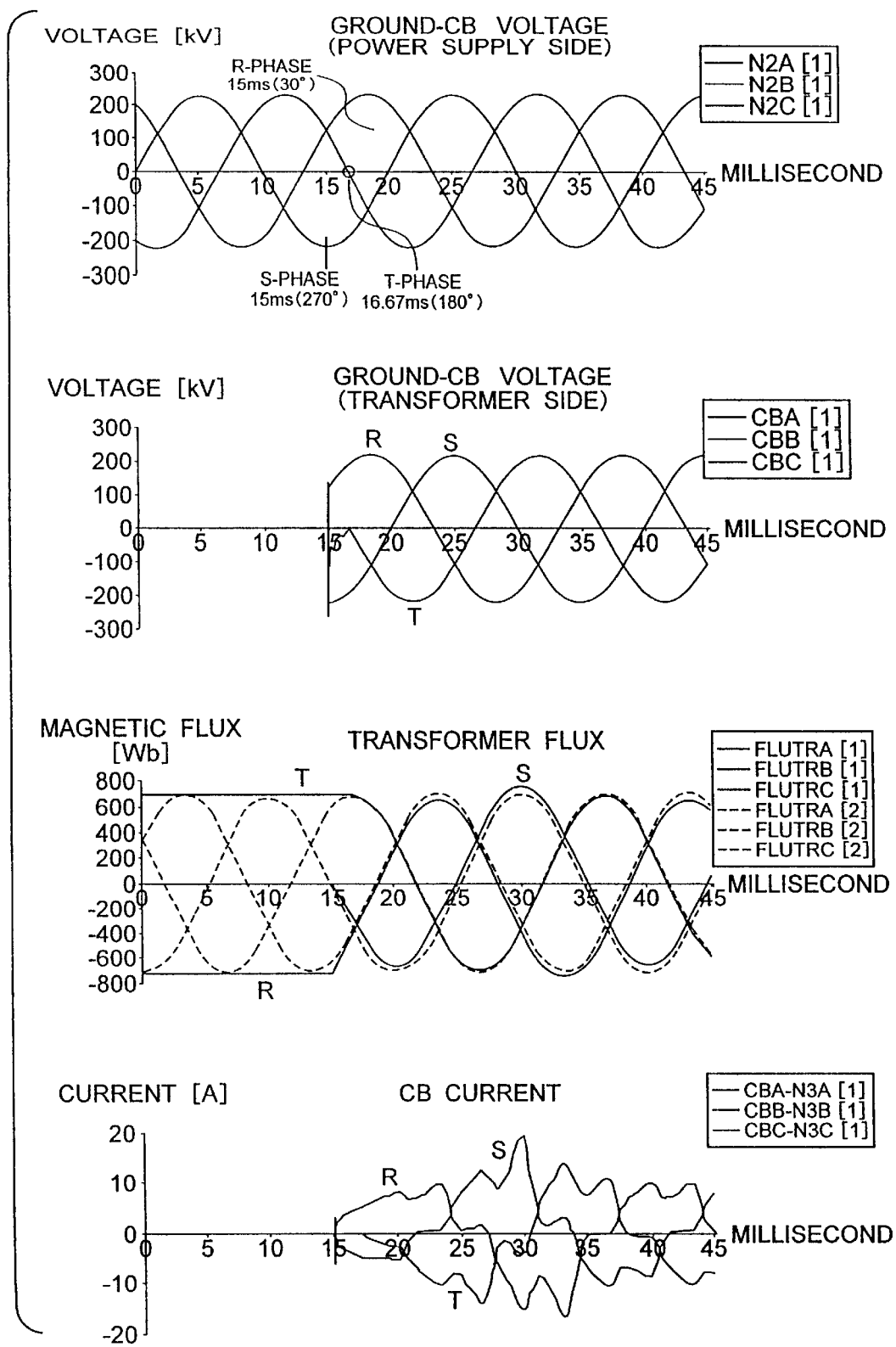
FIG. 16 is a view similar to FIG. 14 for illustrating a third mode of operation of the phase control switch apparatus according to the third embodiment of the invention.

FIG. 16 shows the voltage and the current of the breaker 50 as well as changes in the magnetic flux of the transformer 10 of the Y-connection which is not grounded or the shunt reactor or the like when the contacts of the breaker 50 provided, respectively, for the individual phases of the transformer 10 or shunt reactor or the like are closed independently of one another under the control of the phase-based break/make controller 80C according to the instant embodiment of the invention on the presumption that the first phase to be closed is the T-phase of which the residual flux is positive.

As can be seen in FIG. 16, the R-phase of which the residual magnetic flux is negative is closed at the electrical angle of 30° as the first phase, while the S-phase of which the residual magnetic flux is zero is closed at the electrical angle of 270°, and finally the making operation is performed for the T-phase of which the residual magnetic flux is zero at the electrical angle of 180° after lapse of 1.7 ms (50 Hz) from the closing of the first and second phases, whereby the rush current otherwise flowing into the transformer 10 or the shunt reactor or the like can be suppressed.

At this juncture, it should be mentioned that in the phase closing sequences described above by way of example, control of the closing time point only for one of the second and third phases is sufficient for realizing the substantially same surge current suppression effect. In that case, the other one of the second and third phases may be closed at a given time point. In other words, it is not necessarily required to close simultaneously the second phase and the third phase.

Figure 17:
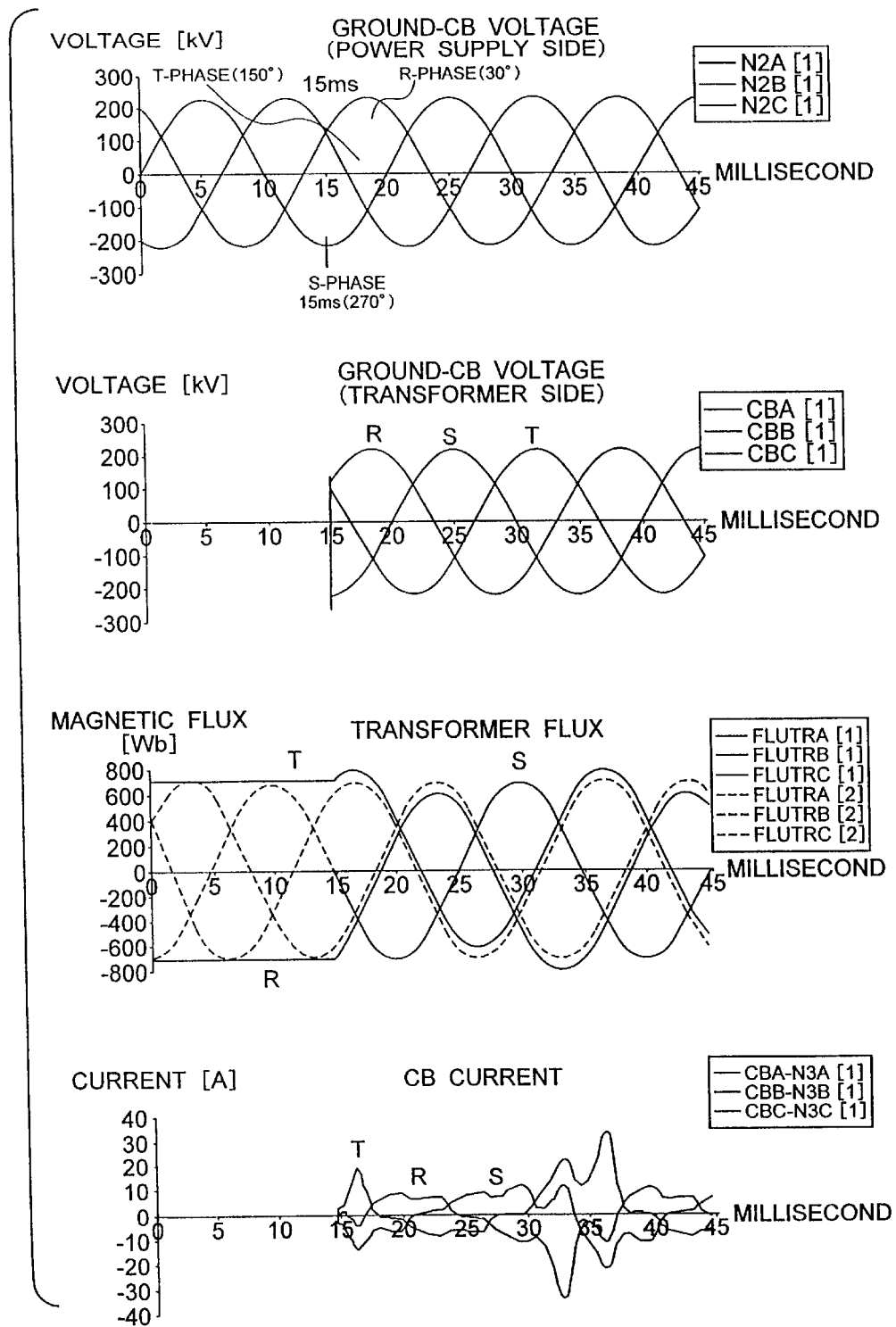
FIG. 17 is a view similar to FIG. 14 for illustrating a fourth mode of operation of the phase control switch apparatus according to the third embodiment of the invention.

FIG. 17 shows the voltage and the current of the breaker 50 as well as changes in the magnetic flux of the transformer 10 or the shunt reactor or the like of Y-connection not grounded when the contacts of the breaker 50 provided, respectively, for the individual phases of the transformer 10 or the shunt reactor or the like are closed simultaneously under the control of the phase-based break/make controller 80C according to the third embodiment of the invention.

As can be seen in FIG. 17, all the three phases are closed simultaneously, i.e., the S-phase for which the residual magnetic flux is zero is closed at the voltage peak, the T-phase for which the residual magnetic flux is positive is closed at the electrical angle of 150°, and the R-phase of which the residual magnetic flux is negative is closed at the electrical angle of 30°, whereby the rush current otherwise flowing into the transformer 10 or the shunt reactor or the like can be suppressed.

Embodiment 4

Next, description will turn to the phase control switch apparatus according to a fourth embodiment of the present invention. It should first be mentioned that the circuit arrangement of the phase control switch apparatus according to the instant embodiment is similar to that described hereinbefore by reference to FIG. 7. Accordingly, the following description will be directed to operation of the phase control switch apparatus.

In the state where the breaker 50 is closed, the R-, S- and T-phase voltages are measured independently by the voltage measuring devices 72a, 72b and 72c, respectively. On the other hand, the R-, S- and T-phase currents are measured by the current measuring devices 74a, 74b and 74c, respectively. The signals indicative of the results of the measurements are supplied to the reference phase detecting unit 82 and the residual magnetic flux detecting unit 83, respectively, which constitute major components of the phase-based break/make controller 80.

As can be seen in FIG. 7, in each of the R-, S- and T-phases, the magnetic flux exhibits a phase lag of 90° relative to the voltage. Further, it can be seen that at the moment the current attains the peak, the magnetic flux assumes a maximum value as well.

When the individual contacts accommodated within the arc-extinction chambers 52a, 52b and 52c, respectively, are opened in response to the contact open command issued to the breaker 50, each of the R-, S- and T-phase currents reaches the current zero point upon every lapse of ⅙ cycle. In this manner, the phase currents are broken, by way of example, in the sequence of the R-phase, the T-phase and the S-phase in this order, as indicated in FIG. 7.

At this juncture, it is assumed that the first phase, e.g. the R-phase current in the illustrated case, is broken. In that case, the magnetic flux of the broken R-phase nonetheless continues to change periodically internally of the core of the transformer 10 of the Y-connection similarly to the periodical change before the breakage because the current paths for the two remaining phase currents are still alive at this time point. Subsequently, the second phase current, e.g. the T-phase current in the illustrated case, is broken. Nevertheless, the magnetic flux of the same polarity as that of the T-phase current immediately before the breaking operation will remain to be effective as the residual flux. In the case of the T-phase, the current is of negative (minus) polarity immediately before being broken. Consequently, the residual magnetic flux assumes negative polarity. Finally, when the third phase current, e.g. the S-phase current in this exemplary case, is broken, the magnetic flux of the same polarity as that of the S-phase current immediately before the breaking thereof continues to exist as the residual flux. In more concrete, the magnetic flux of positive (plus) polarity remains as the residual magnetic flux because the polarity of the S-phase current is positive upon breaking thereof. At this time point, the changing magnetic flux of the first broken phase, i.e., the R-phase magnetic flux, settles itself to the zero-flux state.

In this manner, for the magnetic fluxes remanent in the core of the transformer 10 of the Y-connection, the attributes of the magnetic fluxes, i.e., positive (plus) and negative (minus) polarities as well as the zero state thereof can be decided on the basis of the phase sequence in which the phase currents are broken and the polarities of the phase currents immediately before the breakage as measured by the reference phase detecting unit 82 and the residual magnetic flux detecting unit 83 incorporated in the phase-based break/make controller 80.

Thus, the reference phase detecting unit 82 and the residual magnetic flux detecting unit 83 of the phase-based break/make controller 80 according to the fourth embodiment of the present invention are so designed as to operate as follows. Namely, the residual magnetic flux in the first phase broken firstly in the preceding break operation is decided to be zero. On this precondition, when it is detected that the second phase current to be broken succeedingly is broken with a phase lag of 60° (⅙ cycle) relative to the first phase current as broken and when it is detected that the first phase current as broken is of positive polarity immediately before the breakage thereof with the polarity of the second phase current immediately before the breakage thereof being negative (minus), it is then decided that the polarity of the residual magnetic flux in the second broken phase is negative. Further, when it is detected that the third phase current to be broken finally is broken with a phase lag of 60° (⅙ cycle) relative to the second phase current as broken and when it is detected that the second phase current is of negative polarity immediately before the breakage thereof with the polarity of the third phase current immediately before the breakage thereof being positive (plus), it is then decided that the residual magnetic flux in the third broken phase is of positive polarity. By contrast, on the presumption that the residual magnetic flux in the first phase broken firstly in the preceding break operation is decided to be zero and when it is detected that the second phase current to be broken succeedingly is broken with a phase lag of 60° (⅙ cycle) relative to the first phase current and when it is detected that the first phase current is of negative (minus) polarity immediately before the breakage thereof with the polarity of the second phase current immediately before the breakage thereof being positive, it is then decided that the polarity of the residual magnetic flux in the second broken phase is positive. Furthermore, when it is detected that the third phase current to be broken finally is broken with a phase lag of 60° (⅙ cycle) relative to the second phase current and when it is detected that the second phase current is of positive polarity immediately before the breakage thereof with the polarity of the third phase current immediately before the breakage thereof being negative, it is then decided that the residual magnetic flux in the third broken phase is negative.

In more concrete, the closing target time points $T_{target}$ for the individual phases may be set in such manners as illustrated in the table 4 of FIG. 23. As can be seen from the table, in the case where the residual magnetic fluxes in the individual phases are decided such that the residual magnetic flux in the first broken phase is zero and that the residual magnetic flux of the second broken phase is negative with that of the third broken phase being positive, the closing or making target time point for the first phase is set at a voltage peak or in the vicinity thereof, while upon closing operation for the phase for which the residual magnetic flux is positive, the closing or making target time point for this second phase is set at the electrical angle of 75° after 105/360 cycles from closing of the first phase or in the vicinity thereof (e.g. within a range of ±15° from the above electrical angle), and finally the third phase for which the residual magnetic flux is negative is closed, wherein the making target time point for this third phase is set at the same time point as the closing time point for the second phase or at a later time point.

Alternatively, the another closing target time points $T_{target}$ for the individual phases may be set as follows. In the case where the residual magnetic fluxes in the individual phases are decided such that the residual magnetic flux in the first broken phase is zero, the residual magnetic flux of the second broken phase is negative and that the residual magnetic flux of the third broken phase is positive, the closing or making target time point for the first phase is set at a voltage peak or in the vicinity thereof, while upon closing operation for the phase for which the residual magnetic flux is negative, the closing or making target time point for this second phase is set at the electrical angle of 315° after 105/360 cycles from closing of the first phase or in the vicinity thereof (e.g. within the range of ±15° from the above electrical angle), and finally the third phase for which the residual magnetic flux is positive is closed. In that case, the making target time point for this third phase is set at the same time point as the closing time point for the second phase or at a later time point.

As further alternative, the closing target time points $T_{target}$ for the individual phases may be set as follows. Namely, in the case where the residual magnetic fluxes in the individual phases are decided such that the residual magnetic flux in the first broken phase is zero, the residual magnetic flux of the second broken phase is positive and that the residual magnetic flux of the third broken phase is negative, the closing or making target time point for the first phase is set at a voltage peak or in the vicinity thereof, while upon closing operation for the phase for which the residual magnetic flux is positive, the closing or making target time point for this second phase is set at the electrical angle of 280° after 70/360 cycles from closing of the first phase or in the vicinity thereof (e.g. within the range of ±20° from the above electrical angle). Finally, the third phase for which the residual magnetic flux is negative is closed. In that case, the making target time point for this third phase is set at the same time point as the closing time point for the second phase or at a later time point.

Alternatively, the closing target time points $T_{target}$ for the individual phases may be set as follows. Namely, in the case where the residual magnetic fluxes in the individual phases are decided such that the residual magnetic flux in the first broken phase is zero, the residual magnetic flux of the second broken phase is positive and that the residual magnetic flux of the third broken phase is negative, the closing or making target time point for the first phase is set at a voltage peak or in the vicinity thereof, while for closing operation of the phase for which the residual magnetic flux is negative, the closing or making target time point for this second phase is set at the electrical angle of 40° after 70/360 cycles from closing of the first phase or in the vicinity thereof (e.g. within the range of ±15° from the above electrical angle), whereas for closing the third phase for which the residual magnetic flux is positive, the making target time point for this third phase is set at the same time point as the closing time point for the second phase or at a later time point.

As is apparent from the foregoing, when the residual magnetic fluxes exist in the core of the transformer 10 of the Y-connection having the neutral point which is connected to the ground potential, the optimum contact closing (making) angles for the individual phases at which the switching surge current can be suppressed to a minimum vary in dependence on the values of the residual magnetic fluxes in the individual phases and the sequence in which the making operations are carried out for the individual phases, respectively. However, it has been established that in all the cases, the optimum closing or making angles can be determined definitely.

At this juncture, it is assumed that a close (make) command for closing the breaker 50 is issued. Then, the R-, S- and T-phase voltages are measured by the voltage measuring devices 72a, 72b and 72c, respectively, the output signals thereof being transmitted to the reference phase detecting unit 82 incorporated in the phase-based break/make controller 80. The reference phase detecting unit 82 is designed for detecting the zero-point periods of the R-, S- and T-phase voltages, respectively, to thereby determine the voltage-zero point serving as the reference time point $T_{standard}$.

The arithmetic processing/operation control unit 81 incorporated in the phase-based break/make controller 80 is so designed as to arithmetically determine the closing operation time $t_{close}$ and the pre-arcing time $t_{prearc}$ which can be predicted on the basis of the ambient temperature of the actuator devices (actuating means), operating forces thereof and measurement data for the relevant control voltages, whereon the predicted closing operation time $t_{close}$ is subtracted from the time period intervening between the preset R-, S- and T-phase closing (making) target time point $T_{target}$ and the reference time point $T_{standard}$ while adding the pre-arcing time $t_{prearc}$, to thereby determine an operation synchronizing time period $t_{cont}$.

When the operation synchronizing time period $t_{cont}$ from the reference time point $T_{standard}$ as determined has lapsed, the arithmetic processing/operation control unit 81 of the phase-based break/make controller 80 supplies the close or make signal to the individual actuator devices 54a, 54b and 54c, respectively, to thereby control the contact making operations of the contacts disposed within the arc-extinction chambers 52a, 52b and 52c independently of one another so that these contacts can be closed independently each at a predetermined electrical angle which allows the switching surge phenomenon or event (i.e., surge current event occurring upon closing operation) to be suppressed to a minimum.

Figure 19:
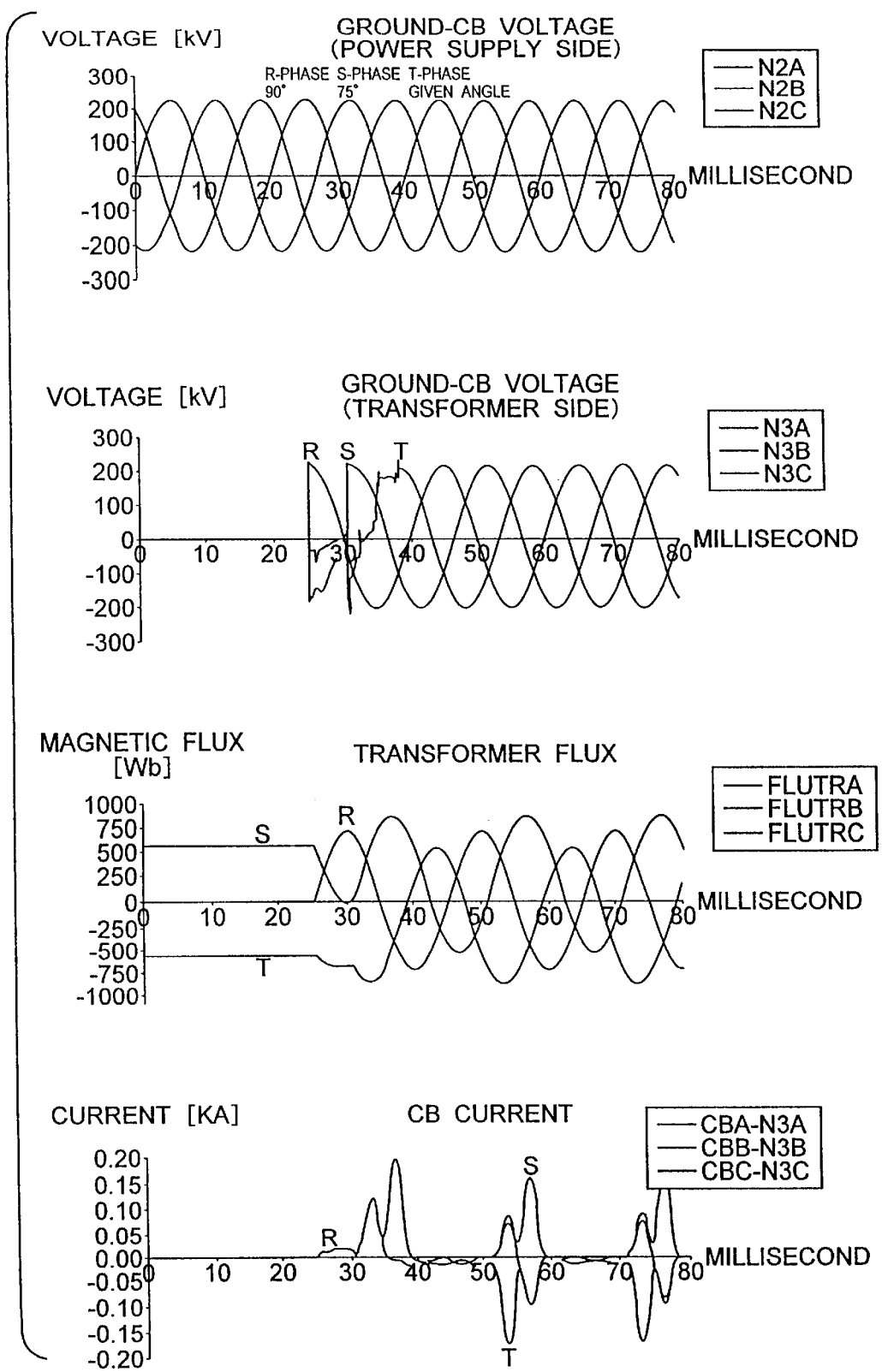
FIG. 19 is a view showing waveforms of phase voltages and currents of a three-phase power supply and changes of magnetic fluxes in a transformer connected thereto for illustrating a first mode of operation of the phase control switch apparatus according to a fourth embodiment of the present invention.

FIG. 19 shows changes of the voltage and the current of the breaker as well as the changes in the magnetic flux of the transformer (or the shunt reactor or the like) connected to the ground in the Y-connection when the contacts of the breaker provided, respectively, for the individual phases of the transformer (or the shunt reactor or the like) are closed independently of one another under the control of the phase-based break/make controller according to the fourth embodiment of the invention (on the presumption that the residual magnetic flux is 80%) and on the assumption that the residual magnetic fluxes of the first, second and third broken phases are decided to be zero, negative and positive, respectively, and that the phase for which the residual magnetic is zero (first broken phase) is set as the first phase to be closed, the phase for which the residual magnetic flux is positive is set as the second phase to be closed and the phase for which the residual magnetic flux is negative is set as the third phase to be closed.

As can be seen in FIG. 19, the R-phase of which the residual magnetic flux is zero is closed as the first phase at the voltage peak point of the breaker, while the S-phase is closed as the second phase at the electrical angle of 75° after lapse of 5.8 ms (50 Hz) from the closing of the first phase (R-phase) with the T-phase being closed at a given electrical angle in succession to the closing of the second phase, whereby the rush current which would otherwise flow into the transformer (or the shunt reactor or the like) can be suppressed satisfactorily.

Figure 20:
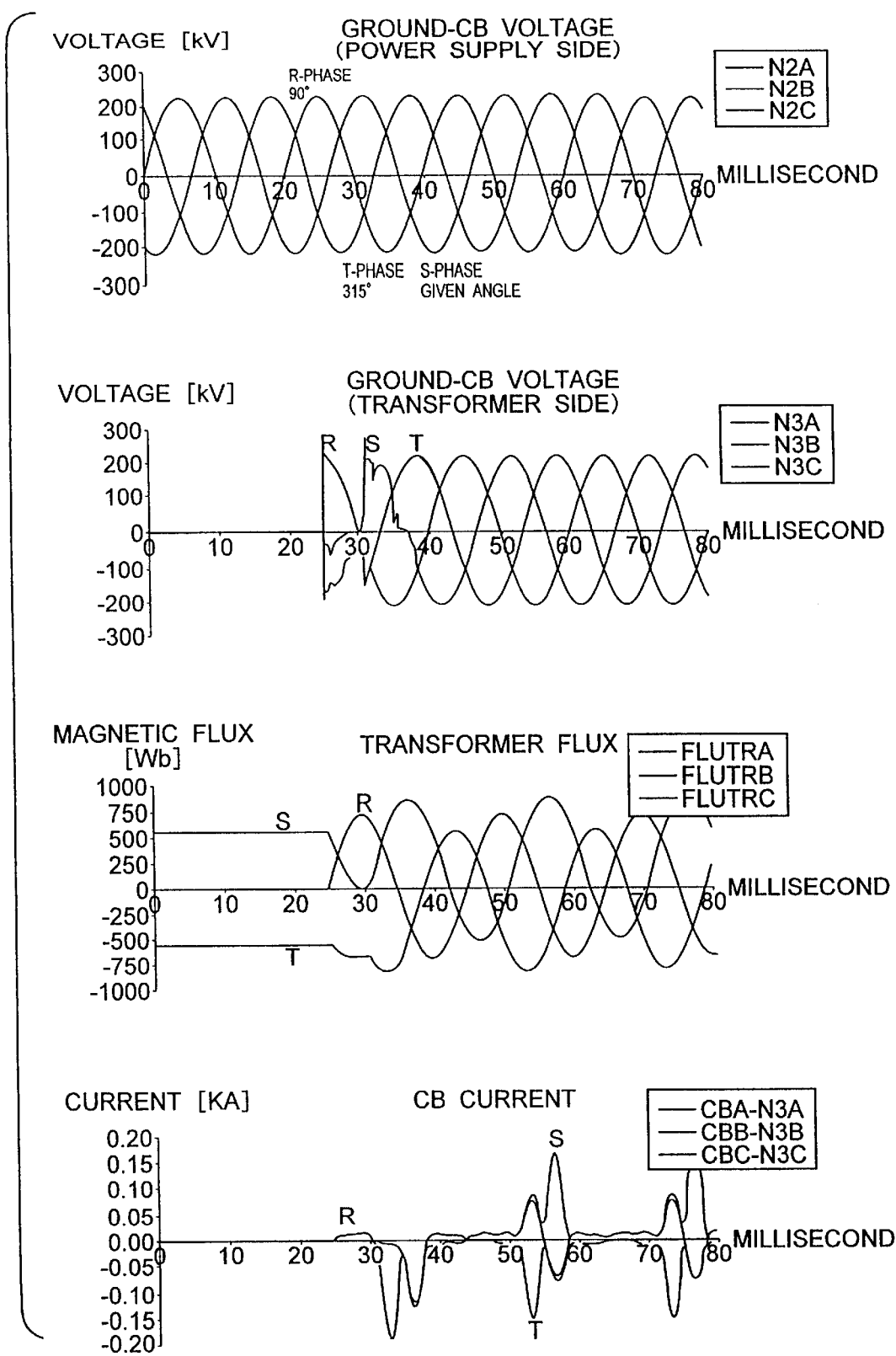
FIG. 20 is a view similar to FIG. 19 for illustrating a second mode of operation of the phase control switch apparatus according to the fourth embodiment of the invention.

FIG. 20 shows changes of the voltage and the current of the breaker as well as the changes in the magnetic flux of the transformer (or the shunt reactor or the like) connected to the ground in the Y-connection when the contacts of the breaker provided, respectively, for the individual phases of the transformer (or the shunt reactor or the like) are closed independently of one another under the control of the phase-based break/make controller according to the fourth embodiment of the invention (on the presumption that the residual magnetic flux is 80%) and on the assumption that the residual magnetic fluxes of the first, second and third broken phases are decided to be zero, negative and positive, respectively, and that the phase for which the residual magnetic is zero (first broken phase) is set as the first phase to be closed, the phase for which the residual magnetic flux is negative is set as the second phase to be closed and that the phase for which the residual magnetic flux is positive is set as the third phase to be closed.

As can be seen in FIG. 20, the R-phase of which the residual magnetic flux is zero is closed as the first phase at the voltage peak point of the breaker, while the T-phase is closed as the second phase at the electrical angle of 315° after lapse of 5.8 ms (50 Hz) from the closing of the first phase (R-phase) with the S-phase being closed at a given electrical angle in succession to the closing of the second phase, whereby the rush current which would otherwise flow into the transformer (or the shunt reactor or the like) can be suppressed satisfactorily.

Figure 21:
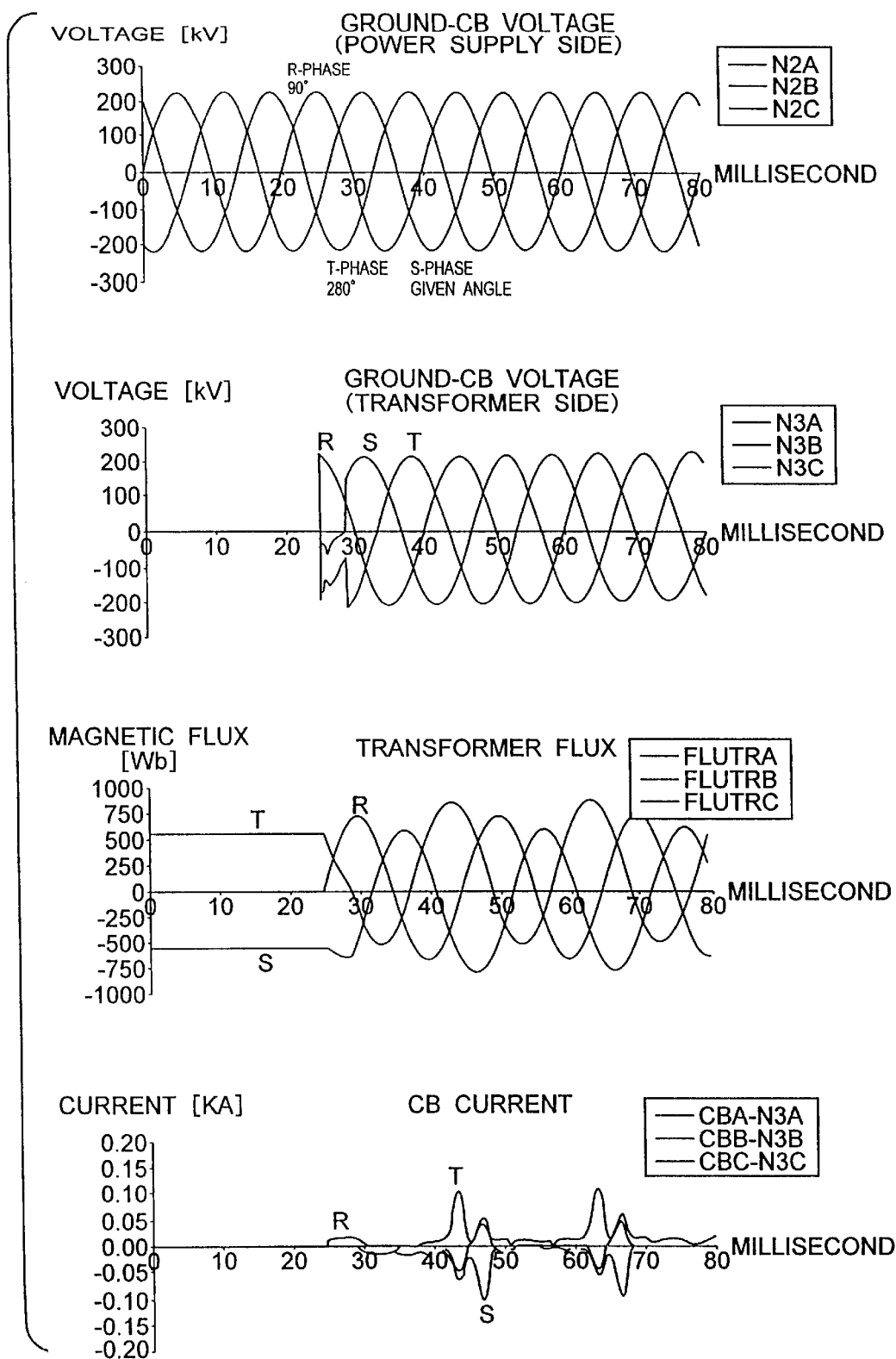
FIG. 21 is a view showing similar to FIG. 19 for illustrating a third mode of operation of the phase control switch apparatus according to the fourth embodiment of the invention.

FIG. 21 shows changes of the voltage and the current of the breaker as well as the changes in the magnetic flux of the transformer (or the shunt reactor or the like) connected to the ground in the Y-connection when the contacts of the breaker provided, respectively, for the individual phases of the transformer (or the shunt reactor or the like) are closed independently of one another under the control of the phase-based break/make controller according to the instant embodiment of the invention (on the presumption that the residual magnetic flux is 80%) and on the assumption that the residual magnetic fluxes of the first, second and third broken phases are decided to be zero, positive and negative, respectively, and that the phase for which the residual magnetic is zero (first broken phase) is set as the first phase to be closed, the phase for which the residual magnetic flux is positive is set as the second phase to be closed and that the phase for which the residual magnetic flux is negative is set as the third phase to be closed.

As can be seen in FIG. 21, the R-phase of which the residual magnetic flux is zero is closed as the first phase at the voltage peak point of the breaker, while the T-phase is closed as the second phase at the electrical angle of 280° after lapse of 3.9 ms (50 Hz) from the closing of the first phase (R-phase) with the S-phase being closed at a given electrical angle in succession to the closing of the second phase, whereby the rush current which would otherwise flow into the transformer (or the shunt reactor or the like) can be suppressed satisfactorily.

Figure 22:
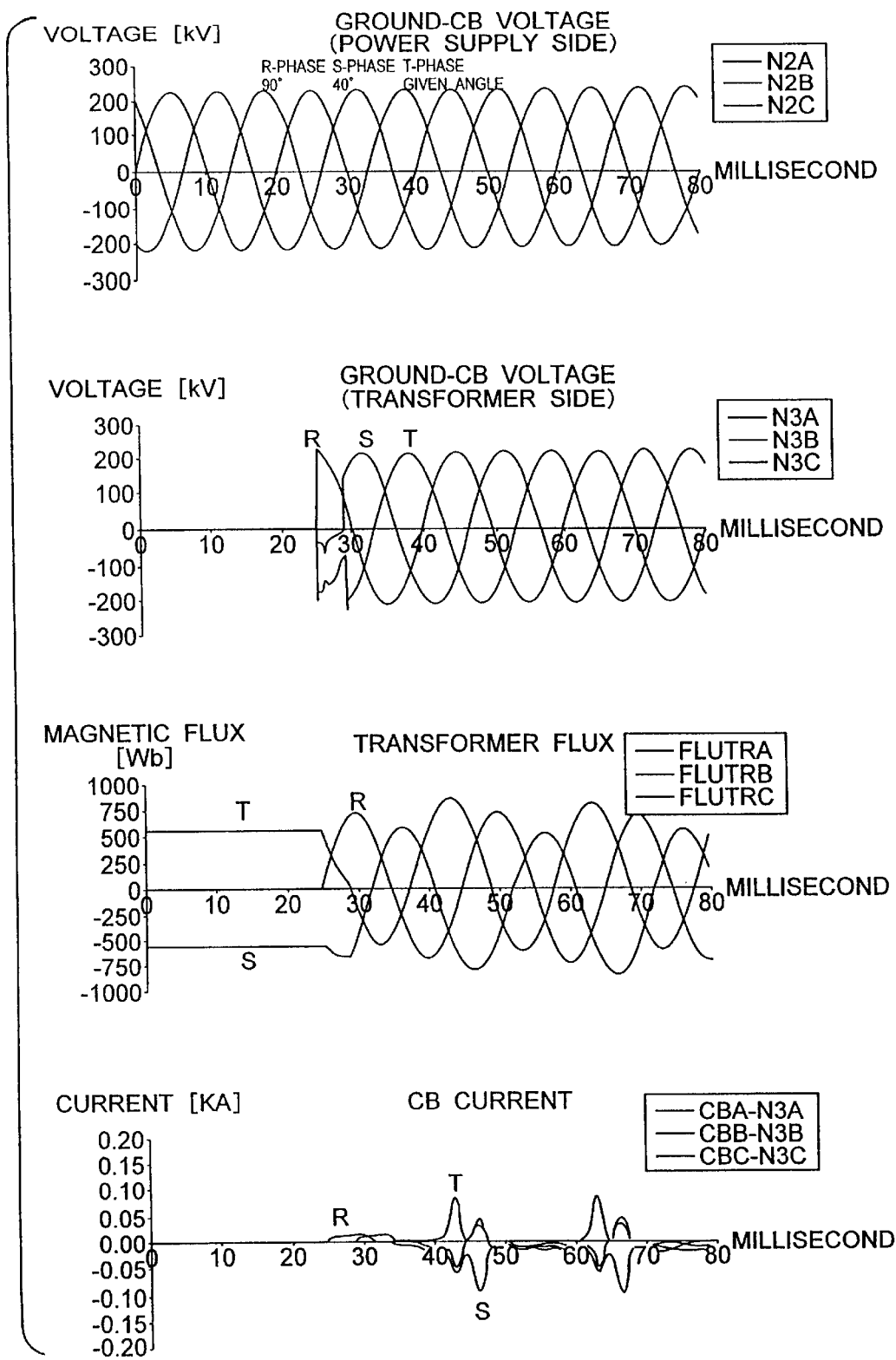
FIG. 22 is a view similar to FIG. 19 for illustrating a fourth mode of operation of the phase control switch apparatus according to the fourth embodiment of the invention.
Figure 24:
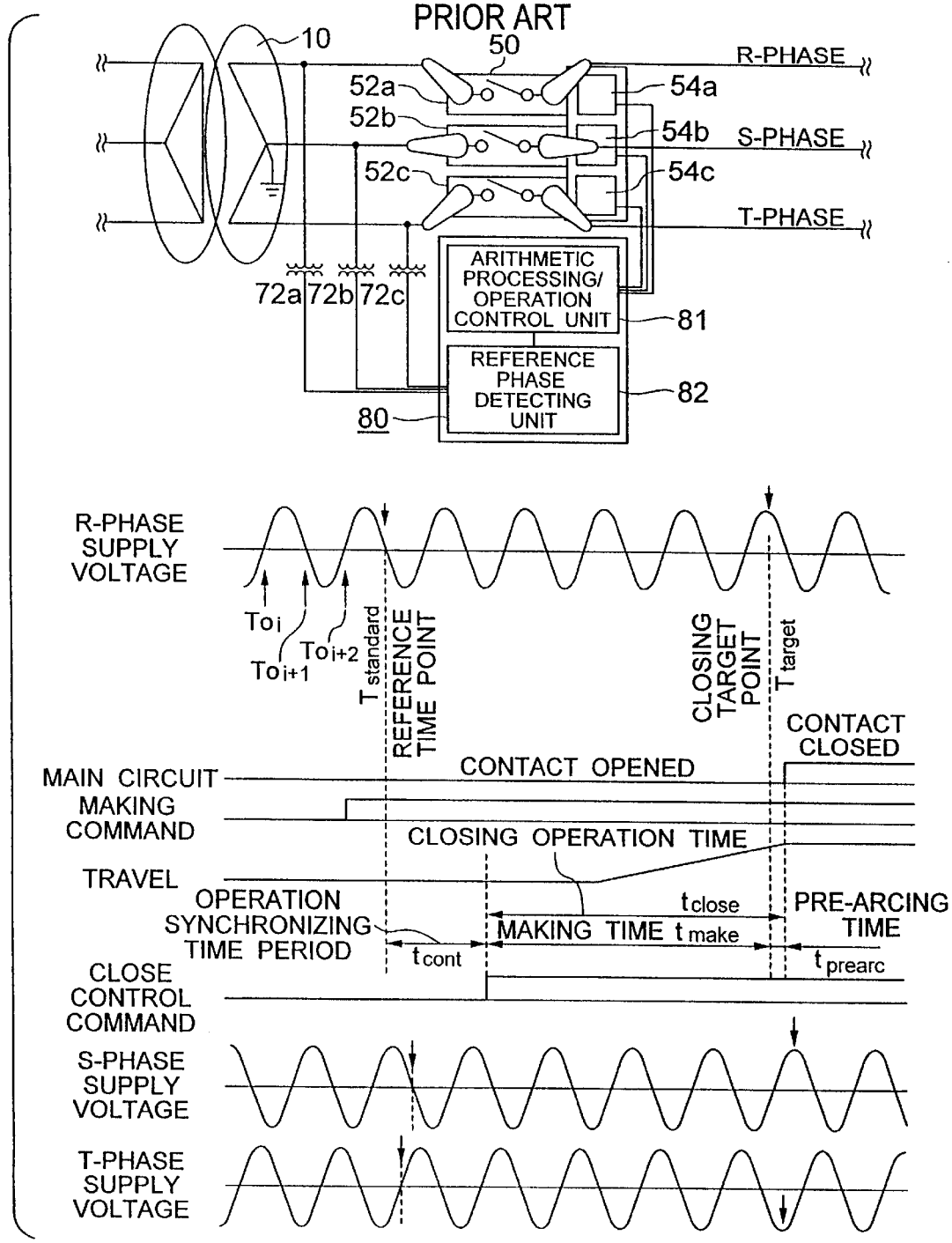
FIG. 24 is a view showing schematically a structure of a conventional phase control switch apparatus together with waveforms of phase-voltages and currents of a three-phase power supply and changes of magnetic fluxes in a transformer connected thereto for illustrating operation of the conventional apparatus.

FIG. 22 shows changes of the voltage and the current of the breaker as well as the changes in the magnetic flux of the transformer (or the shunt reactor or the like) connected to the ground in the Y-connection when the contacts of the breaker provided, respectively, for the individual phases of the transformer (or the shunt reactor or the like) are closed independently of one another under the control of the phase-based break/make controller according to the instant embodiment of the invention (on the presumption that the residual magnetic flux is 80%) and on the assumption that the residual magnetic fluxes of the first, second and third broken phases are decided to be zero, positive and negative, respectively, and that the phase for which the residual magnetic is zero (first broken phase) is set as the first phase to be closed, the phase for which the residual magnetic flux is negative is set as the second phase to be closed and that the phase for which the residual magnetic flux is positive is set as the third phase to be closed.

As can be seen in FIG. 22, the R-phase of which the residual magnetic flux is zero is closed as the first phase at the voltage peak point of the breaker, while the S-phase is closed as the second phase at the electrical angle of 40° after lapse of 3.9 ms (50 Hz) from the closing of the first phase (R-phase) with the T-phase being closed at a given electrical angle in succession to the closing of the second phase, whereby the rush current which would otherwise flow into the transformer (or the shunt reactor or the like) can be suppressed satisfactorily.

Many modifications and variations of the present invention are possible in the light of the above techniques. It is therefore to be understood that within the scope of the appended claims, the invention may be practiced otherwise than as specifically described.

What is claimed is:

1. A phase control switch apparatus, comprising:
   a breaker connected to a reactive load which is connected to a three-phase electric power system in Δ-connection or alternatively in Y-connection with a neutral point connected directly to the ground or alternatively not connected to the ground, said breaker being designed to break a fault current and a load current flowing through said reactive load or make said reactive load closed to said three-phase electric power system for excitation thereof,
   voltage measuring means for measuring phase voltages on a phase-by-phase basis;
   current measuring means for measuring inter-contact currents at an output side of said breaker;
   actuating means for effectuating open/close operations of contacts of said breaker independently on a phase-by-phase basis;
   temperature measuring means disposed in the vicinity of said actuating means;
   reference phase detecting means for detecting driving pressures and control voltages of said actuating means for said breaker on a phase-by-phase basis, said reference phase detecting means being so designed as to respond to a brake/make command issued to said breaker to thereby predict waveforms of phase voltages, respectively, upon closing of said breaker as well as phases and periodical zero points of waveforms of phase currents, respectively, upon opening of said breaker on the basis of voltage values and current values measured by said voltage measuring means and said current measuring means, respectively;

residual magnetic flux predicting means for storing breaking time points of the phase contacts of said breaker, respectively, and positive/negative polarities of individual phase currents immediately before breaking in a preceding breaking operation to thereby predict residual magnetic fluxes in the individual phases of said reactive load on the basis of the contents as stored;

optimal closing time point predicting means for predicting upon closing of individual phase contacts of said breaker an optimal closing electrical angle for each of the phases on the basis of the residual magnetic fluxes of said reactive load in the individual phases as predicted by said residual magnetic flux predicting means so that surges occurring upon closing of said breaker contacts can be suppressed each to a minimum; and contact closing operation starting means for validating contact closing operations of said breaker so that said phase contacts of said breaker can be closed at the electrical angles, respectively, which are predicted and set by said optimal closing time point predicting means.

2. A phase control switch apparatus according to claim 1, wherein said residual magnetic flux predicting means is so designed that on the precondition that the residual magnetic flux in the first phase broken firstly in the preceding break operation of the three-phase electric power system is zero, when the second phase to be broken succeedingly is broken with a phase lag of 120° (⅓ cycle) relative to said first phase and when the first phase current is of positive polarity immediately before the breakage thereof with the polarity of the second phase current immediately before the breakage thereof being positive, decision is then made such that the residual magnetic flux in the second broken phase is negative (e.g. residual magnetic flux of −90%), while when the third phase current to be broken finally is broken with a phase lag of 120° (⅓ cycle) relative to said second phase current and when the second phase current is of positive polarity immediately before the breakage thereof with the polarity of the third phase current immediately before the breakage thereof being positive, decision is then made such that the residual magnetic flux in said third broken phase is positive (e.g. residual magnetic flux is 90%), whereas on the precondition that the residual magnetic flux in the first phase broken firstly in the preceding break operation is zero, when the second phase current to be broken succeedingly is broken with a phase lag of 120° (⅓ cycle) relative to the first phase current and when the first phase current is of negative polarity immediately before the breakage thereof with the polarity of the second phase current immediately before the breakage thereof being negative, decision is then made such that the polarity of the residual magnetic flux in said second broken phase is positive (e.g. residual magnetic flux is 90%), while when the third phase current to be broken finally is broken with a phase lag of 120° (⅓ cycle) relative to said second phase current and when said second phase current is of negative polarity immediately before the breakage thereof with the polarity of said third phase current immediately before the breakage thereof being negative, decision is then made such that the residual magnetic flux in said third broken phase is negative (e.g. residual magnetic flux of −90%).

3. A phase control switch apparatus according to claim 1, wherein said residual magnetic flux predicting means is so designed that on the precondition that the residual magnetic flux in a first phase broken firstly in the preceding break operation of the three-phase electric power system by said breaker is zero, when a second phase to be broken succeedingly is broken with a phase lag of 60° (⅙ cycle) relative to said first broken phase and when the first phase current is of positive polarity immediately before the breakage thereof with the polarity of said second phase current immediately before the breakage thereof being negative, decision is then made such that the residual magnetic flux in said second broken phase is negative (e.g. residual magnetic flux of −90%), while when the third phase current to be broken finally is broken with a phase lag of 60° (⅙ cycle) relative to the second phase current and when said second phase current is of negative polarity immediately before the breakage thereof with the polarity of the third phase current immediately before the breakage thereof being positive, decision is then made such that the residual magnetic flux in the third broken phase is positive (e.g. residual magnetic flux of 90%), whereas on the precondition that the residual magnetic flux in the first phase broken firstly in the preceding break operation of said three-phase electric power system by said breaker is zero, when the second phase current to be broken succeedingly is broken with a phase lag of 60° (⅙ cycle) relative to said first phase current and when said first phase current is of negative polarity immediately before the breakage thereof with the polarity of the second phase current immediately before the breakage thereof being positive, then decision is made such that the residual magnetic flux in said second broken phase is positive (e.g. residual magnetic flux of 90%), while when the third phase current to be broken finally is broken with a phase lag of 60° (⅙ cycle) relative to said second phase current and when said second phase current is of positive polarity immediately before the breakage thereof with the polarity of said third phase current immediately before the breakage thereof being negative, decision is then made such that the residual magnetic flux in said third broken phase is negative (e.g. residual magnetic flux of −90%).

4. A phase control switch apparatus according to claim 3, wherein said residual magnetic flux predicting means is designed to be previously inputted with absolute values of residual magnetic fluxes of positive and negative polarities, respectively.

5. A phase control switch apparatus according to claim 3, wherein said residual magnetic flux predicting means is so designed that the absolute values of the residual magnetic fluxes of the positive and negative polarities are set each at a value within a range of 80% to 90% and that when a value of a rush current occurring upon closing operation of said breaker is greater than an expected value, the preset values of said residual fluxes of the positive and negative polarities are increased or decreased so that said rush current can approximate said expected value.

6. A phase control switch apparatus according to claim 3, wherein on the basis of such results of prediction performed by said residual magnetic flux predicting means for each phase of said reactive load connected in Δ-connection that the residual magnetic fluxes in said phases are zero (0%), negative (residual magnetic flux of –k %), and positive (residual magnetic flux of k %), respectively, said optimal closing time point predicting means predicts closing time points for said phases, respectively, such that surges occurring upon closing of said phases can be suppressed to a minimum by setting the phase for which the residual magnetic flux is positive as the first phase to be closed, while setting the phase for which the residual magnetic flux is negative as the second phase to be closed and setting the phase for which the residual magnetic flux is zero (first broken phase) as the third phase to be closed, wherein the closing time point for the first phase to be closed for which the residual magnetic flux is positive is set to be same as the closing time point for said second phase or at a given time point preceding to said closing time point for said second phase, wherein the closing time point for said second phase to be closed for which the residual magnetic flux is negative (residual magnetic flux of –k %) is set at an electrical angle within a range of (–184+46k/25) to (–124+46k/25) degrees or alternatively at an electrical angle within a range of $-\cos^{-1}(k/100)$ to $60 - \cos^{-1}(k/100)$ degrees, and wherein the closing time point for said third phase to be closed for which the residual magnetic flux is zero is set at an electrical angle within a range of (59+3k20) to (119+3k/20) degrees.

7. A phase control switch apparatus according to claim 3, wherein on the basis of such results of prediction performed by the residual magnetic flux predicting means for each phase of said reactive load connected in Δ-connection that the residual magnetic fluxes in said phases are zero (0%), negative (residual magnetic flux of –k %) and positive (residual magnetic flux of k %), respectively, said optimal closing time point predicting means predicts contact closing time points (electrical angles) for said phases, respectively, so that surges occurring upon closing of said phases can be suppressed to a minimum by setting the phase for which the residual magnetic flux is negative as the first phase to be closed, while setting the phase for which the residual magnetic flux is positive as the second phase to be closed and setting the phase for which the residual magnetic flux is zero (first broken phase) as the third phase to be closed, wherein the closing time point for the first phase to be closed for which the residual magnetic flux is negative is set to be same as the closing time point for said second phase or at a given time point preceding to said closing time point for said second phase, wherein the closing time point for said second phase for which the residual magnetic flux is positive (residual magnetic flux of k %) is set at an electrical angle within a range of (–64+46k/25) to (–4+46k/25) degrees or alternatively at an electrical angle within a range of $120-\cos^{-1}(k/100)$ to $180-\cos^{-1}(k/100)$ degrees, and wherein the closing time point for said third phase to be closed for which the residual magnetic flux is zero is set at an electrical angle within a range of (59+3k/20) to (119+3k/20) degrees.

8. A phase control switch apparatus according to claim 3, wherein on the basis of such results of prediction performed by the residual magnetic flux predicting means for each phase of said reactive load connected in Δ-connection that the residual magnetic fluxes in said phases are zero (0%), negative (residual magnetic flux of –k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is positive as the first phase to be closed, while setting the phase for which the residual magnetic flux is zero (first broken phase) as the second phase to be closed and setting the phase for which said residual magnetic flux is negative as the third phase to be closed, wherein the closing time point for the first phase to be closed for which the residual magnetic flux is positive is set to be same as the closing time point for said second phase or at a given time point preceding to said closing time point for said second phase, wherein the closing time point for said second phase to be closed for which the residual magnetic flux is zero is set at an electrical angle within a range of 30 to 90 degrees, and wherein the closing time point for said third phase to be closed for which the residual magnetic flux is negative is set at an electrical angle within a range of (244+7k/20) to (304+7k/20) degrees.

9. A phase control switch apparatus according to claim 3, wherein on the basis of such results of prediction performed by the residual magnetic flux predicting means for each phase of said reactive load connected in Δ-connection that the residual magnetic fluxes in said phases are zero (0%), negative (residual magnetic flux of –k %) and positive (residual magnetic flux of k %), respectively, said optimal closing time point predicting means predicts contact closing time points (electrical angles) for said phases,respectively, such that surges occurring upon closing of said phases can be suppressed to a minimum by setting the phase for which the residual magnetic flux is zero (first broken phase) as the first phase to be closed, while setting the phase for which the residual magnetic flux is positive as the second phase to be closed and setting the phase for which the residual magnetic flux is negative as the third phase to be closed, wherein the closing time point for the first phase to be closed for which the residual magnetic flux is zero is set to be same as the closing time point for said second phase or at a given time point preceding to said closing time point for said second phase, wherein the closing time point for said second phase to be closed for which the residual magnetic flux is positive (residual magnetic flux of k %) is set at an electrical angle within a range of 270 to 330 degrees, and wherein the closing time point for said third phase to be closed for which the residual magnetic flux is negative is set at an electrical angle within a range of (244+7k/20) to (304+7k/20) degrees.

10. A phase control switch apparatus according to claim 3, wherein on the basis of such results of prediction performed by the residual magnetic flux predicting means for each phase of said reactive load connected in Δ-connection that the residual magnetic fluxes in said phases are zero (0%), negative (residual magnetic flux of −k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is zero (first broken phase) as the first phase to be closed, while setting the phase for which the residual magnetic flux is negative as the second phase to be closed and setting the phase for which the residual magnetic flux is positive as the third phase to be closed, wherein the closing time point for the first phase to be closed for which the residual magnetic flux is zero is set to be same as the closing time point for said second phase or at a given time point preceding to said closing time point for said second phase, wherein the closing time point for said second phase to be closed for which the residual magnetic flux is negative is set at an electrical angle within a range of (116+46k/25) to (176+46k/25) degrees or alternatively at an electrical angle within a range of $300-\cos^{-1}(k/100)$ to $360-\cos^{-1}(k/100)$ degrees, and wherein the closing time point for said third phase to be closed for which the residual magnetic flux is positive is set at an electrical angle within a range of (345−195k/100) to (405−195k/100) degrees.

11. A phase control switch apparatus according to claim 3, wherein on the basis of such results of prediction performed by the residual magnetic flux predicting means for each phase of said reactive load connected in Δ-connection that the residual magnetic fluxes in said phases are zero (0%), negative (residual magnetic flux of −k %) and positive (residual magnetic flux of k %), respectively, said optimal closing time point predicting means predicts contact closing time points (electrical angles) for said phases, respectively, so that surges occurring upon closing of said phases can be suppressed to a minimum by setting the phase for which the residual magnetic flux is negative as the first phase to be closed, while setting the phase for which the residual magnetic flux is zero (first broken phase) as the second phase to be closed and setting the phase for which the residual magnetic flux is positive as the third phase to be closed, wherein the closing time point for the first phase to be closed for which the residual magnetic flux is negative is set to be same as the closing time point for said second phase or at a given time point preceding to said closing time point for said second phase, wherein the closing time point for said second phase to be closed for which the residual magnetic flux is zero is set at an electrical angle within a range of (−4+46k/25) to (56+46k/25) degrees or preferably at an electrical angle within a range of $180-\cos^{-1}(k/100)$ to $240-\cos^{-1}(k/100)$ degrees, and wherein the closing time point for said third phase to be closed for which the residual magnetic flux is positive is set at an electrical angle within a range of (345−195k/100) to (405−195k/100) degrees.

12. A phase control switch apparatus according to claim 3, wherein on the basis of such results of prediction performed by the residual magnetic flux predicting means for each phase of said reactive load connected in Δ-connection that the residual magnetic fluxes in said phases are zero, negative and positive, respectively, said optimal closing time point predicting means predicts contact closing time points (electrical angles) for said phases such that surges occurring upon closing of said phases can be suppressed to a minimum, wherein the closing time points for the first and second phases to be closed for each of which the residual magnetic flux is zero are set each in the vicinity of an electrical angle within a range of 240 to 300 degrees (voltage peak) or alternatively at an electrical angle within a range of 60 to 120 degrees (voltage peak), while the closing time points for the first and second phases to be closed for each of which the residual magnetic flux is negative are set each at an electrical angle within a range of 0 to 60 degree(s) or alternatively at an electrical angle within a range of 180 to 240 degrees, and wherein the closing time point for the third phase to be closed for which the residual magnetic flux is positive is set at a same time point as the closing time points of said first and second phases or alternatively at a later time point.

13. A phase control switch apparatus according to claim 3, wherein on the basis of such results of prediction performed by the residual magnetic flux predicting means for each phase of said reactive load connected in Δ-connection that the residual magnetic fluxes in said phases are zero, negative and positive, respectively, said optimal closing time point predicting means predicts contact closing time points (electrical angles) for said phases such that surges occurring upon closing of said phases can be suppressed to a minimum, wherein the closing time points for the first and second phases to be closed for each of which the residual magnetic flux is zero are set each in the vicinity of an electrical angle within a range of 240 to 300 degrees (voltage peak) or alternatively in the vicinity of an electrical angle within a range of 60 to 120 degrees (voltage peak), while the closing time points for the first and second phases to be closed for each of which the residual magnetic flux is positive are set each at an electrical angle within a range of 120 to 180 degrees or alternatively at an electrical angle within a range of 300 to 360 degrees, and wherein the closing time point for the third phase to be closed for which the residual magnetic flux is negative is set at a same time point as the closing time points of said first and second phases or alternatively at a later time point.

14. A phase control switch apparatus according to claim 3, wherein on the basis of such results of prediction performed by the residual magnetic flux predicting means for each phase of said reactive load connected in Δ-connection that the residual magnetic fluxes in said phases are zero, negative and positive, respectively, said optimal closing time point predicting means predicts contact closing time points (electrical angles) for said phases such that surges occurring upon closing of said phases can be suppressed to a minimum, wherein the closing time points for the first and second phases to be closed for each of which the residual magnetic flux is negative are set each at an electrical angle within a range of 0 to 60 degree(s) or alternatively at an electrical angle within a range of 180 to 240 degrees, while the closing time points for the first and second phases to be closed for each of which the residual magnetic flux is positive are set each at an electrical angle within a range of 120 to 180 degrees or alternatively at an electrical angle within a range of 300 to 360 degrees, and wherein the closing time point for the third phase to be closed for which the residual magnetic flux is zero is set at a same time point as the closing time points of said first and second phases or alternatively at a later time point.

15. A phase control switch apparatus according to claim 3, wherein on the basis of such results of prediction performed by the residual magnetic flux predicting means for each phase of the reactive load connected in Y-connection with a neutral point connected directly to the ground that the residual magnetic fluxes in said phases are zero (0%), negative (residual magnetic flux of −k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is zero (first broken phase) as the first phase to be closed, while setting the phase for which the residual magnetic flux is positive as the second phase to be closed and setting the phase for which the residual magnetic flux is negative as the third phase to be closed, wherein the closing time point for said first phase to be closed for which the residual magnetic flux is zero is set in the vicinity of an electrical angle within a range of 60 to 120 degrees (voltage peak) or alternatively in the vicinity of an electrical angle within a range of 240 to 300 degrees (voltage peak), while the closing time point for said second phase to be closed for which the residual magnetic flux is positive is set at an electrical angle within a range of (30+39k/100) to (90+39k/100) degrees or alternatively at an electrical angle within a range of (210+39k/100) to (270+39k/100) degrees, and wherein the closing time point for the third phase to be closed for which the residual magnetic flux is negative is set at a same time point as the closing time point of said second phase or alternatively at a later time point.

16. A phase control switch apparatus according to claim 3, wherein on the basis of such results of prediction performed by the residual magnetic flux predicting means for each phase of the reactive load connected in Y-connection with a neutral point connected directly to the ground that the residual magnetic flux of the first broken phase is zero, the residual magnetic flux of the second broken phase is negative and the residual magnetic flux of the third broken phase is positive, said optimal closing time point predicting means predicts contact closing time points (electrical angles) for said phases, respectively, such that surges occurring upon closing for said phases can be suppressed to a minimum by setting the phase for which the residual magnetic flux is zero (first broken phase) as the first phase to be closed, while setting the phase for which the residual magnetic flux is positive as the second phase to be closed and setting the phase for which the residual magnetic flux is negative as the third phase to be closed, wherein the closing time point for said first phase to be closed for which the residual magnetic flux is zero is set in the vicinity of an electrical angle of 90 degrees (voltage peak) or alternatively at an electrical angle within a range of 60 to 120 degrees (voltage peak), while the closing time point for said second phase to be closed for which the residual magnetic flux is positive is set in the vicinity of an electrical angle of 75 degrees or alternatively at an electrical angle within a range of 60 to 90 degrees, and wherein the closing time point for the third phase to be closed for which the residual magnetic flux is negative is set at a same time point as the closing time point of said second phase or alternatively at a later time point.

17. A phase control switch apparatus according to claim 3, wherein on the basis of such results of prediction performed by the residual magnetic flux predicting means for each phase of said reactive load connected in Y-connection with a neutral point connected directly to the ground that the residual magnetic fluxes in said phases are zero (0%), negative (residual magnetic flux of −k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is zero (first broken phase) as the first phase to be closed, while setting the phase for which the residual magnetic flux is negative as the second phase to be closed and setting the phase for which the residual magnetic flux is positive as the third phase to be closed, wherein the closing time point for said first phase to be closed for which the residual magnetic flux is zero is set in the vicinity of an electrical angle within a range of 60 to 120 degrees (voltage peak) or alternatively in the vicinity of an electrical angle within a range of 240 to 300 degrees (voltage peak), while the closing time point for said second phase to be closed for which the residual magnetic flux is negative is set at an electrical angle within a range of (270+39k/100) to (330+39k/100) degrees or alternatively at an electrical angle within a range of (90+39k/100) to (150+39k/100) degrees, and wherein the closing time point for the third phase to be closed for which the residual magnetic flux is positive is set at a same time point as the closing time point of said second phase or alternatively at a later time point.

18. A phase control switch apparatus according to claim 3, wherein on the basis of such results of prediction performed by the residual magnetic flux predicting means for each phase of said reactive load connected in Y-connection with a neutral point connected directly to the ground that the residual magnetic flux of the first broken phase is zero, the residual magnetic flux of the second broken phase is negative and the residual magnetic flux of the third broken phase is positive, said optimal closing time point predicting means predicts contact closing time points (electrical angles) for said phases, respectively, such that surges occurring upon closing of said phases can be suppressed to a minimum by setting the phase for which the residual magnetic flux is zero (first broken phase) as the first phase to be closed, while setting the phase for which the residual magnetic flux is negative as the second phase to be closed and setting the phase for which the residual magnetic flux is positive as the third phase to be closed, wherein the closing time point for said first phase to be closed for which the residual magnetic flux is zero is set in the vicinity of an electrical angle of 90 degrees (voltage peak) or alternatively in the vicinity of an electrical angle within a range of 60 to 120 degrees (voltage peak), while the closing time point for said second phase to be closed for which the residual magnetic flux is negative is set at an electrical angle of 315 degrees or alternatively at an electrical angle within a range of 300 to 330 degrees, and wherein the closing time point for the third phase to be closed for which the residual magnetic flux is positive is set at a same time point as the closing time point of said second phase or alternatively at a later time point.

19. A phase control switch apparatus according to claim 3, wherein on the basis of such results of prediction performed by the residual magnetic flux predicting means for each phase of said reactive load connected in Y-connection with a neutral point connected directly to the ground that the residual magnetic fluxes in said phases are zero (0%), negative (residual magnetic flux of –k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is negative as the first phase to be closed, while setting the phase for which the residual magnetic flux is positive as the second phase to be closed and setting the phase for which the residual magnetic flux is zero (first broken phase) as the third phase to be closed, wherein the closing time point for said first phase to be closed for which the residual magnetic flux is negative (residual magnetic flux of –k %) is set at an electrical angle θ within a range of $\cos^{-1}(-k/100)-30$ to $\cos^{-1}(-k/100)+30$ degrees, and more specifically at an electrical angle within a range of 330 (=–30) to 30 degrees or alternatively at an electrical angle within a range of 150 to 210 degrees on the precondition that the residual magnetic flux is given by k=100%, while the closing time point for said second phase to be closed for which the residual magnetic flux is positive (residual magnetic flux of k %) is set at an electrical angle within a range of (84+39k/100) to (144+39k/100) degrees or alternatively at an electrical angle within a range of (264+39k/100) to (324+39k/100) degrees, and wherein the closing time point for the third phase to be closed for which the residual magnetic flux is zero is set at a same time point as the closing time point of said second phase or alternatively at a later time point.

20. A phase control switch apparatus according to claim 3, wherein on the basis of such results of prediction performed by the residual magnetic flux predicting means for each phase of said reactive load connected in Y-connection with a neutral point connected directly to the ground that the residual magnetic fluxes in said phases are zero (0%), negative (residual magnetic flux of –k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is negative as the first phase to be closed, while setting the phase for which the residual magnetic flux is zero (first broken phase) as the second phase to be closed and setting the phase for which the residual magnetic flux is positive as the third phase to be closed, wherein the closing time point for said first phase to be closed for which the residual magnetic flux is negative (residual magnetic flux of –k %) is set at an electrical angle θ within a range of $\cos^{-1}(-k/100)-30$ to $\cos^{-1}(-k/100)+30$ degrees, and more specifically at an electrical angle within a range of 330 (–30) to 30 degrees or alternatively at an electrical angle within a range of 150 to 210 degrees on the precondition that the residual magnetic flux is given by k=100%, while the closing time point for said second phase to be closed for which the residual magnetic flux is zero is set at an electrical angle within a range of (204+39k/100) to (264+39k/100) degrees or alternatively at an electrical angle within a range of (14+39k/100) to (74+39k/100) degrees, and wherein the closing time point for the third phase to be closed for which the residual magnetic flux is positive is set at a same time point as the closing time point of said second phase or alternatively at a later time point.

21. A phase control switch apparatus according to claim 3, wherein on the basis of such results of prediction performed by the residual magnetic flux predicting means for each phase of said reactive load connected in Y-connection with a neutral point connected directly to the ground that the residual magnetic fluxes in said phases are zero (0%), negative (residual magnetic flux of –k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is positive as the first phase to be closed, while setting the phase for which the residual magnetic flux is zero (first broken phase) as the second phase to be closed and setting the phase for which the residual magnetic flux is negative as the third phase to be closed, wherein the closing time point for said first phase to be closed for which the residual magnetic flux is positive (residual magnetic flux of k %) is set at an electrical angle θ within a range of $\cos^{-1}(-k/100)-30$ to $\cos^{-1}(-k/100)+30$ degrees, and more specifically at an electrical angle within a range of 150 to 210 degrees or alternatively at an electrical angle in the vicinity of 0 (zero) degree (voltage zero point) and preferably at an electrical angle within a range of 330 (=−30) to 30 degrees on the precondition that the residual magnetic flux is given by k=100%, while the closing time point for said second phase to be closed for which the residual magnetic flux is zero is set at an electrical angle within a range of (95+10k/100) to (155+10k/100) degrees or alternatively at an electrical angle within a range of (275+10k/100) to (335+10k/100) degrees, and wherein the closing time point for the third phase to be closed for which the residual magnetic flux is negative is set at a same time point as the closing time point of said second phase or alternatively at a later time point.

22. A phase control switch apparatus according to claim 3, wherein on the basis of such results of prediction performed by the residual magnetic flux predicting means for each phase of said reactive load connected in Y-connection with a neutral point connected directly to the ground that the residual magnetic fluxes in said phases are zero (0%), negative (residual magnetic flux of −k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is positive as the first phase to be closed, while setting the phase for which the residual magnetic flux is negative as the second phase to be closed and setting the phase for which the residual magnetic flux is zero (first broken phase) as the third phase to be closed, wherein the closing time point for said first phase to be closed for which the residual magnetic flux is positive (residual magnetic flux of k %) is set at an electrical angle θ within a range of $\cos^{-1}(-k/100)-30$ to $\cos^{-1}(-k/100)+30$ degrees, and more specifically at an electrical angle within a range of 150 to 210 degrees or alternatively at an electrical angle within a range of 330 (=−30) to 30 degrees on the precondition that the residual magnetic flux is given by k=100%, while the closing time point for said second phase to be closed for which the residual magnetic flux is negative is set at an electrical angle within a range of (215+10k/100) to (275+10k/100) degrees or alternatively at an electrical angle within a range of (35+10k/100) to (95+10k/100) degrees, and wherein the closing time point for the third phase to be closed for which the residual magnetic flux is zero is set at a same time point as the closing time point of said second phase or alternatively at a later time point.

23. A phase control switch apparatus according to claim 3, wherein on the basis of such results of prediction performed by the residual magnetic flux predicting means for each phase of said reactive load connected in Y-connection with a neutral point connected directly to the ground that the residual magnetic fluxes in said phases are zero, negative and positive, respectively, said optimal closing time point predicting means predicts contact closing time points (electrical angles) for said phases such that surges occurring upon closing of said phases can be suppressed to a minimum, wherein the closing time points for the first and second phases to be closed for each of which the residual magnetic flux is zero are set each in the vicinity of an electrical angle within a range of 240 to 300 degrees (voltage peak) or alternatively at an electrical angle within a range of 60 to 120 degrees (voltage peak), while the closing time points for the first and second phases to be closed for each of which the residual magnetic flux is negative are set each at an electrical angle within a range of 0 to 60 degree(s) or alternatively at an electrical angle within a range of 180 to 240 degrees, and wherein the closing time point for the third phase to be closed for which the residual magnetic flux is positive is set at a same time point as the closing time points of said first and second phases or alternatively at a later time point.

24. A phase control switch apparatus according to claim 3, wherein on the basis of such results of prediction performed by the residual magnetic flux predicting means for each phase of said reactive load connected in Y-connection with a neutral point connected directly to the ground that the residual magnetic fluxes in said phases are zero, negative and positive, respectively, said optimal closing time point predicting means predicts contact closing time points (electrical angles) for said phases such that surges occurring upon closing of said phases can be suppressed to a minimum, wherein the closing time points for the first and second phases to be closed for each of which the residual magnetic flux is zero are set each in the vicinity of an electrical angle within a range of 240 to 300 degrees (voltage peak) or alternatively in the vicinity of an electrical angle within a range of 60 to 120 degrees (voltage peak), while the closing time points for the first and second phases to be closed for each of which the residual magnetic flux is positive are set each at an electrical angle within a range of 120 to 180 degrees or alternatively at an electrical angle within a range of 300 to 360 degrees, and wherein the closing time point for the third phase to be closed for which the residual magnetic flux is negative is set at a same time point as the closing time points of said first and second phases or alternatively at a later time point.

25. A phase control switch apparatus according to claim 3, wherein on the basis of such results of prediction performed by the residual magnetic flux predicting means for each phase of said reactive load connected in Y-connection with a neutral point connected directly to the ground that the residual magnetic fluxes in said phases are zero, negative and positive, respectively, said optimal closing time point predicting means predicts contact closing time points (electrical angles) for said phases such that surges occurring upon closing of said phases can be suppressed to a minimum, wherein the closing time points for the first and second phases to be closed for each of which the residual magnetic flux is negative are set each at an electrical angle within a range of 0 to 60 degree(s) or alternatively at an electrical angle within a range of 180 to 240 degrees, while the closing time points for the first and second phases to be closed for each of which the residual magnetic flux is positive are set each at an electrical angle within a range of 180 to 120 degrees or alternatively at an electrical angle within a range of 300 to 360 degrees, and wherein the closing time point for the third phase to be closed for which the residual magnetic flux is zero is set at a same time point as the closing time points of said first and second phases or alternatively at a later time point.

26. A phase control switch apparatus according to claim 3, wherein on the basis of such results of prediction performed by the residual magnetic flux predicting means for each phase of said reactive load connected in Y-connection with a neutral point connected directly to the ground that the residual magnetic flux of the first broken phase is zero, the residual magnetic flux of the second broken phase is positive and the residual magnetic flux of the third broken phase is negative, said optimal closing time point predicting means predicts contact closing time points (electrical angles) for said phases, respectively, such that surges occurring upon closing of said phases can be suppressed to a minimum by setting the phase for which the residual magnetic flux is zero as the first phase to be closed, while setting the phase for which the residual magnetic flux is positive as the second phase to be closed and setting the phase for which the residual magnetic flux is negative as the third phase to be closed, wherein the closing time point for said first phase to be closed for which the residual magnetic flux is zero is set in the vicinity of an electrical angle of 90 degrees (voltage peak) or alternatively at an electrical angle within a range of 60 to 120 degrees, while the closing time point for said second phase to be closed for which the residual magnetic flux is positive is set in the vicinity of an electrical angle of 280 degrees or alternatively at an electrical angle within a range of 260 to 300 degrees, and wherein the closing time point for the third phase to be closed for which the residual magnetic flux is negative is set at a same time point as the closing time point of said second phase or alternatively at a later time point.

27. A phase control switch apparatus according to claim 3, wherein on the basis of such results of prediction performed by the residual magnetic flux predicting means for each phase of said reactive load connected in Y-connection with a neutral point connected directly to the ground that the residual magnetic flux of the first broken phase is zero, the residual magnetic flux of the second broken phase is positive and the residual magnetic flux of the third broken phase is negative, said optimal closing time point predicting means predicts contact closing time points (electrical angles) for said phases, respectively, such that surges occurring upon closing of said phases can be suppressed to a minimum by setting the phase for which the residual magnetic flux is zero as the first phase to be closed, while setting the phase for which the residual magnetic flux is negative as the second phase to be closed and setting the phase for which the residual magnetic flux is positive as the third phase to be closed, wherein the closing time point for said first phase to be closed for which the residual magnetic flux is zero is set in the vicinity of an electrical angle of 90 degrees (voltage peak) or alternatively at an electrical angle within a range of 60 to 120 degrees (voltage peak), while the closing time point for said second phase to be closed for which the residual magnetic flux is negative is set in the vicinity of an electrical angle of 40 degrees or alternatively at an electrical angle within a range of 20 to 60 degrees, and wherein the closing time point for the third phase to be closed for which the residual magnetic flux is positive is set at a same time point as the closing time point of said second phase or alternatively at a later time point.

28. A phase control switch apparatus according to claim 3, wherein on the basis of such results of prediction performed by the residual magnetic flux predicting means for each phase of said reactive load of Y-connection with a neutral point not connected to the ground that the residual magnetic fluxes in said phases are zero (0%), negative (residual magnetic flux of −k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is positive as the first phase to be closed, while setting the phase for which the residual magnetic flux is negative as the second phase to be closed and setting the phase for which the residual magnetic flux is zero as the third phase to be closed, wherein the closing time point for the first phase to be closed for which the residual magnetic flux is positive is set at a same time point as the closing time point for said second phase or at a given time point preceding to the closing time point for said second phase, wherein the closing time point for the second phase to be closed for which the residual magnetic flux is negative is set at an electrical angle within a range of 0 to 60 degree(s), and wherein the closing time point for the third phase to be closed for which the residual magnetic flux is zero is set in the vicinity of an electrical angle within a range of 60 to 120 degrees (voltage peak) or alternatively in the vicinity of an electrical angle within a range of 240 to 300 degrees (voltage peak).

29. A phase control switch apparatus according to claim 3, wherein on the basis of such results of prediction performed by the residual magnetic flux predicting means for each phase of said reactive load connected in Y-connection with a neutral point not connected to the ground that the residual magnetic fluxes in said phases are zero (0%), negative (residual magnetic flux of −k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is negative as the first phase to be closed, while setting the phase for which the residual magnetic flux is positive as the second phase to be closed and setting the phase for which the residual magnetic flux is zero (first broken phase) as the third phase to be closed, wherein the closing time point for the first phase to be closed for which the residual magnetic flux is negative is set at a same time point as the closing time point for said second phase or at a given time point preceding to the closing time point for said second phase, wherein the closing time point for the second phase to be closed for which the residual magnetic flux is positive is set at an electrical angle within a range of 120 to 180 degrees, and wherein the closing time point for the third phase to be closed for which the residual magnetic flux is zero is set at an electrical angle within a range of 60 to 120 degrees or alternatively at an electrical angle within a range of 240 to 300 degrees (voltage peak).

30. A phase control switch apparatus according to claim 3, wherein on the basis of such results of prediction performed by the residual magnetic flux predicting means for each phase of said reactive load connected in Y-connection with a neutral point not connected to the ground that the residual magnetic fluxes in said phases are zero (0%), negative (residual magnetic flux of –k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is positive as the first phase to be closed, while setting the phase for which the residual magnetic flux is zero (first broken phase) as the second phase to be closed and setting the phase for which the residual magnetic flux is negative as the third phase to be closed, wherein the closing time point for the first phase to be closed for which the residual magnetic flux is positive is set at a same time point as the closing time point for said second phase or at a given time point preceding to the closing time point for said second phase, wherein the closing time point for the second phase to be closed for which the residual magnetic flux is zero is set at an electrical angle within a range of 300 to 240 degrees, and wherein the closing time point for the third phase to be closed for which the residual magnetic flux is negative is set at an electrical angle within a range of 272–k/5 to 332–k/5 degrees.

31. A phase control switch apparatus according to claim 3, wherein on the basis of such results of prediction performed by the residual magnetic flux predicting means for each phase of said reactive load connected in Y-connection with a neutral point not connected to the ground that the residual magnetic fluxes in said phases are zero (0%), negative (residual magnetic flux of –k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is zero (first broken phase) as the first phase to be closed, while setting the phase for which the residual magnetic flux is positive as the second phase to be closed and setting the phase for which the residual magnetic flux is negative as the third phase to be closed, wherein the closing time point for the first phase to be closed for which the residual magnetic flux is zero is set at a same time point as the closing time point for said second phase or at a given time point preceding to the closing time point for said second phase, wherein the closing time point for the second phase to be closed for which the residual magnetic flux is positive is set at an electrical angle within a range of 180 to 120 degrees, and wherein the closing time point for the third phase to be closed for which the residual magnetic flux is negative is set at an electrical angle within a range of (272–k/5) to (332–k/5) degrees.

32. A phase control switch apparatus according to claim 3, wherein on the basis of such results of prediction performed by the residual magnetic flux predicting means for each phase of said reactive load connected in Y-connection with a neutral point not connected to the ground that the residual magnetic fluxes in said phases are zero (0%), negative (residual magnetic flux of –k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is zero (first broken phase) as the first phase to be closed, while setting the phase for which the residual magnetic flux is negative as the second phase to be closed and setting the phase for which the residual magnetic flux is positive as the third phase to be closed, wherein the closing time point for the first phase to be closed for which the residual magnetic flux is zero is set at a same time point as the closing time point for said second phase or at a given time point preceding to the closing time point for said second phase, wherein the closing time point for the second phase to be closed for which the residual magnetic flux is negative is set at an electrical angle within a range of 60 to 0 degree(s), and wherein the closing time point for the third phase to be closed for which the residual magnetic flux is positive is set at an electrical angle within a range of (345–195k/100) to (405–195k/100) degrees.

33. A phase control switch apparatus according to claim 3, wherein on the basis of such results of prediction performed by the residual magnetic flux predicting means for each phase of said reactive load connected in Y-connection with a neutral point not connected to the ground that the residual magnetic fluxes in said phases are zero (0%), negative (residual magnetic flux of –k %) and positive (residual magnetic flux of k %), respectively, said optimal closing time point predicting means predicts contact closing time points (electrical angles) for said phases, respectively, such that surges occurring upon closing of said phases can be suppressed to a minimum by setting the phase for which the residual magnetic flux is negative as the first phase to be closed, while setting the phase for which the residual magnetic flux is zero (first broken phase) as the second phase to be closed and setting the phase for which the residual magnetic flux is positive as the third phase to be closed, wherein the closing time point for the first phase to be closed for which the residual magnetic flux is negative is set at a same time point as the closing time point for said second phase or at a given time point preceding to the closing time point for said second phase, wherein the closing time point for the second phase to be closed for which the residual magnetic flux is zero is set at an electrical angle within a range of 300 to 240 degrees, and wherein the closing time point for the third phase to be closed for which the residual magnetic flux is positive is set at an electrical angle within a range of (345–195k/100) to (405–195k/100) degrees.

34. A phase control switch apparatus according to claim 3, wherein on the basis of such results of prediction performed by the residual magnetic flux predicting means for each phase of said reactive load connected in Y-connection with a neutral point not connected to the ground that the residual magnetic fluxes in said phases are zero, negative and positive, respectively, said optimal closing time point predicting means predicts contact closing time points (electrical angles) for said phases such that surges occurring upon closing of said phases can be suppressed to a minimum, wherein the closing time points for the first and second phases to be closed for each of which the residual magnetic flux is zero are set each at an electrical angle within a range of 240 to 300 degrees (voltage peak) or alternatively in the vicinity of an electrical angle within a range of 60 to 120 degrees (voltage peak), while the closing time points for the first and second phases to be closed for each of which the residual magnetic flux is negative are set each at an electrical angle within a range of 0 to 60 degree(s) or alternatively at an electrical angle within a range of 180 to 240 degrees, and wherein the closing time point for the third phase to be closed for which the residual magnetic flux is positive is set at a same time point as the closing time points of said first and second phases or alternatively at a later time point.

35. A phase control switch apparatus according to claim 3, wherein on the basis of such results of prediction performed by the residual magnetic flux predicting means for each phase of said reactive load connected in Y-connection with a neutral point not connected to the ground that the residual magnetic fluxes in said phases are zero, negative and positive, respectively, said optimal closing time point predicting means predicts contact closing time points (electrical angles) for said phases such that surges occurring upon closing of said phases can be suppressed to a minimum, wherein the closing time points for the first and second phases to be closed for each of which the residual magnetic flux is zero are set each in the vicinity of an electrical angle within a range of 240 to 300 degrees (voltage peak) or alternatively in the vicinity of an electrical angle within a range of 60 to 120 degrees (voltage peak), while the closing time points for the first and second phases to be closed for each of which the residual magnetic flux is positive are set each at an electrical angle within a range of 120 to 180 degrees or alternatively at an electrical angle within a range of 300 to 360 degrees, and wherein the closing time point for the third phase to be closed for which the residual magnetic flux is negative is set at a same time point as the closing time points of said first and second phases or alternatively at a later time point.

36. A phase control switch apparatus according to claim 3, wherein on the basis of such results of prediction performed by the residual magnetic flux predicting means for each phase of said reactive load connected in Y-connection with a neutral point not connected to the ground that the residual magnetic fluxes in said phases are zero, negative and positive, respectively, said optimal closing time point predicting means predicts contact closing time points (electrical angles) for said phases such that surges occurring upon closing of said phases can be suppressed to a minimum, wherein the closing time points for the first and second phases to be closed for each of which the residual magnetic flux is negative are set each at an electrical angle within a range of 0 to 60 degree(s) or alternatively at an electrical angle within a range of 180 to 240 degrees, while the closing time points for the first and second phases to be closed for each of which the residual magnetic flux is positive are set each at an electrical angle within a range of 120 to 180 degrees or alternatively at an electrical angle within a range of 300 to 360 degrees, and wherein the closing time point for the third phase to be closed for which the residual magnetic flux is zero is set at a same time point as the closing time points of said first and second phases or alternatively at a later time point.

* * * * *